United States Patent
Talebi Fard et al.

(10) Patent No.: US 11,102,828 B2
(45) Date of Patent: *Aug. 24, 2021

(54) USER PLANE FUNCTION SELECTION FOR ISOLATED NETWORK SLICE

(71) Applicant: Comcast Cable Communications, LLC, Philadelphia, PA (US)

(72) Inventors: Peyman Talebi Fard, Vienna, VA (US); Esmael Hejazi Dinan, McLean, VA (US); Kyungmin Park, Herndon, VA (US); Weihua Qiao, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,582

(22) Filed: Feb. 20, 2020

(65) Prior Publication Data
US 2020/0245381 A1 Jul. 30, 2020

Related U.S. Application Data

(63) Continuation of application No. 16/213,092, filed on Dec. 7, 2018, now Pat. No. 10,616,934.
(Continued)

(51) Int. Cl.
*H04W 76/11* (2018.01)
*H04W 24/02* (2009.01)
(Continued)

(52) U.S. Cl.
CPC ............ *H04W 76/11* (2018.02); *H04W 8/18* (2013.01); *H04W 24/02* (2013.01); *H04W 48/00* (2013.01); *H04W 72/04* (2013.01)

(58) Field of Classification Search
CPC ....... H04W 76/11; H04W 8/18; H04W 48/00; H04W 24/02; H04W 72/04; H04W 28/00;
(Continued)

(56) References Cited

U.S. PATENT DOCUMENTS 10,161,934 B2 * 12/2018 Laury-Kleintop et al. .................. H04W 76/11
2011/0202635 A1 8/2011 Yeung et al.
(Continued)

FOREIGN PATENT DOCUMENTS

CN 107846275 A 3/2018
WO 2015184708 A1 12/2015
(Continued)

OTHER PUBLICATIONS

S2-178509, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.502 §4.17.x: NRF for UPF discovery.
(Continued)

*Primary Examiner* — Meless N Zewdu
(74) *Attorney, Agent, or Firm* — Banner & Witcoff, Ltd.

(57) ABSTRACT

Systems, apparatuses, and methods are described for wireless communications. A first message indicating a request to select a user plane function (UPF) device may comprise a network slice isolation information parameter and a network slice identifier associated with a wireless device. A second message comprising an identifier of a UPF device may be received.

25 Claims, 29 Drawing Sheets

Related U.S. Application Data

(60) Provisional application No. 62/596,237, filed on Dec. 8, 2017.

(51) Int. Cl.
*H04W 48/00* (2009.01)
*H04W 8/18* (2009.01)
*H04W 72/04* (2009.01)

(58) Field of Classification Search
CPC ..... H04W 28/02; H04W 28/12; H04W 80/00; H04W 16/00; H04W 16/02; H04W 16/04; H04W 16/10; H04W 16/12; H04W 16/14; H04W 88/00; H04W 88/005; H04W 88/02; H04W 88/08; H04W 88/10; H04W 88/18; H04W 48/16; H04W 48/18; H04W 60/00; H04W 60/005; H04W 60/04; H04W 76/00; H04W 76/10; H04W 12/0013; H04W 12/0017; H04W 76/15; H04W 76/16; H04W 48/20; H04W 74/002; H04W 74/006; H04W 8/20; H04W 8/08; G06F 2209/5016; G06F 2209/5015; H04L 29/0619; H04L 29/06197; H04L 29/06319; H04L 29/06326; H04L 61/2564; H04L 61/3085; H04L 61/309; H04L 65/1003; H04L 65/1006; H04L 12/5692; H04L 12/5691
See application file for complete search history.

(56) References Cited

U.S. PATENT DOCUMENTS

| | | | |
|---|---|---|---|
| 2014/0086177 A1 | 3/2014 | Adjakple et al. | |
| 2016/0352645 A1 | 12/2016 | Senarath et al. | |
| 2016/0353268 A1 | 12/2016 | Senarath et al. | |
| 2016/0353367 A1 | 12/2016 | Vrzic et al. | |
| 2017/0054595 A1 | 2/2017 | Zhang et al. | |
| 2017/0086118 A1 | 3/2017 | Vrzic | |
| 2017/0164349 A1 | 6/2017 | Zhu et al. | |
| 2017/0289270 A1 | 10/2017 | Li et al. | |
| 2017/0311304 A1 | 10/2017 | Lu | |
| 2017/0317894 A1 | 11/2017 | Dao et al. | |
| 2017/0324652 A1 | 11/2017 | Lee et al. | |
| 2017/0332421 A1 | 11/2017 | Sternberg et al. | |
| 2017/0359749 A1 | 12/2017 | Dao | |
| 2018/0006954 A1 | 1/2018 | Arora et al. | |
| 2018/0124661 A1 | 5/2018 | Tsai | |
| 2018/0139107 A1 | 5/2018 | Senarath et al. | |
| 2018/0184415 A1 | 6/2018 | Rong et al. | |
| 2018/0199398 A1* | 7/2018 | Dao et al. | H04W 76/30 |
| 2018/0227871 A1* | 8/2018 | Singh et al. | H04W 60/04 |
| 2018/0227873 A1 | 8/2018 | Vrzic et al. | |
| 2018/0262924 A1 | 9/2018 | Dao et al. | |
| 2018/0270712 A1 | 9/2018 | Faccin | |
| 2018/0270744 A1 | 9/2018 | Griot et al. | |
| 2018/0324646 A1 | 11/2018 | Lee et al. | |
| 2018/0332523 A1 | 11/2018 | Faccin et al. | |
| 2018/0368061 A1* | 12/2018 | Yu et al. | H04W 48/18 |
| 2019/0045351 A1 | 2/2019 | Zee et al. | |
| 2019/0052580 A1 | 2/2019 | Peng et al. | |
| 2019/0075552 A1 | 3/2019 | Yu et al. | |
| 2019/0124572 A1* | 4/2019 | Park et al. | H04W 36/08 |
| 2019/0158364 A1 | 5/2019 | Zhang et al. | |
| 2019/0159107 A1 | 5/2019 | Kim et al. | |
| 2019/0174561 A1 | 6/2019 | Sivavakeesar | |
| 2019/0191348 A1 | 6/2019 | Futaki et al. | |
| 2019/0208573 A1 | 7/2019 | Yang et al. | |
| 2019/0223093 A1 | 7/2019 | Watfa et al. | |
| 2019/0238425 A1 | 8/2019 | Mladin et al. | |
| 2019/0364496 A1* | 11/2019 | Jin | H04W 48/18 |
| 2020/0015127 A1* | 1/2020 | Zhu et al. | H04W 36/0016 |
| 2020/0163134 A1* | 5/2020 | Ying et al. | H04W 76/12 |
| 2020/0305054 A1* | 9/2020 | Zee et al. | H04W 36/32 |

FOREIGN PATENT DOCUMENTS

| | | |
|---|---|---|
| WO | 2016201999 A1 | 12/2016 |
| WO | 2017074486 A1 | 5/2017 |
| WO | 2017113109 A1 | 7/2017 |
| WO | 2017171598 A1 | 10/2017 |
| WO | 2017173259 A1 | 10/2017 |
| WO | 2018017132 A1 | 1/2018 |
| WO | 2018058579 A1 | 4/2018 |
| WO | 2018093168 A1 | 5/2018 |
| WO | 2018121880 A1 | 7/2018 |
| WO | 2019011794 A1 | 1/2019 |

OTHER PUBLICATIONS

S2-178541, SA WG2 Meeting #124; Reno, USA, Nov. 27-Dec. 1, 2017; Source: Nokia, Nokia Shanghai Bell, Telecom Italia; Title: TS 23.501 OI:4f Coexistence and isolation among network slices.

S2-179779, SA WG2 Meeting #124; Reno, USA, Nov. 27-Dec. 1, 2017; Source: Nokia, Nokia Shanghai Bell; Title: 23.501/§ 6.3.3: location data SMF needs for UPF selection.

S2-178922, SA WG2 Meeting #124; Reno, USA, Nov. 27-Dec. 1, 2017; Source: Huawei, HiSilicon; Title: OI#19 TS 23.501 Proposal on Using UPF Topology for UPF Selection by SMF.

S2-179121 rev1, SA WG2 Meeting #124; Reno, USA, Nov. 27-Dec. 1, 2017; Source: Samsung, Deutsche Telekom; Title: TS 23.502: Clarification on NF Service Discovery.

S2-179325 rev4, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.502 §4.17.x: NRF for UPF discovery.

S2-179325 rev5, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.502 §4.17.x: NRF for UPF discovery.

SP-170743, SA WG2 Meeting #1223GPP; Sapporo, Japan, Sep. 13-15, 2017; Source: SA WG2; Title: New SID on Enhancing Topology of SMF and UPF in 5G Networks.

3GPP TS 23.502 V05.0 (Jan. 2017); Technical Specification; 3rd Generation Partnership Project; Technical Specification Group Services and System Aspects; Procedures for the 5G System; Stage 2 (Release 15).

3GPP TR 23.799 V14.0.0 (Dec. 2016); Technical Report; 3rd Generation Partnership Project; Technical Specification Group Services and System Aspects; Study on Architecture for the Next Generation System (Release 14).

R2-11xxxx, 3GPP TSG-RAN WG2 #73, Taipei, Taiwan, Feb. 21-25, 2011, Source: InterDigital Communications, Title: Report of Email discussion #26 on Scell Activation in LTE CA.

5G White Paper by Next Generation Mobile Networks (NGMN) Alliance, Version 1.0, Feb. 17, 2015.

S2-174201, SA WG2 Meeting #122; San Jose, Mexico, Jun. 26-30, 2017; Source: Ericsson; Title: Slice co-existence.

S2-174202, SA WG2 Meeting #122; San Jose, Mexico, Jun. 26-30, 2017; Source: Ericsson; Title: NSSF and Slice selection during the Registration procedures (revision of S2-17xxxx).

S2-174246, SA WG2 Meeting #122; San Jose, Mexico, Jun. 26-30, 2017; Source: ZTE, Telecom Italia, Oracle; Title: 23.501—Clarifications on Allowed NSSAI/S-NSSAI.

S2-174247, SA WG2 Meeting #122; San Jose, Mexico, Jun. 26-30, 2017; Source: ZTE, Oracle, China Telecom; Title: 23.501—NSIs compatibility support via organization of NSSAI.

S2-174253, SA WG2 Meeting #122; San Jose, Mexico, Jun. 26-30, 2017; Source: Telecom Italia, Nokia, Alcatel-Lucent Shanghai Bell, ZTE; Title: Network Slicing Support for Roaming.

S2-174262, SA WG2 Meeting #122; San Jose, Mexico, Jun. 26-30, 2017; Source: Motorola Mobility, Lenovo; Title: Application Function influence on slice selection (revision of S2-17xxxx).

S2-174263, SA WG2 Meeting #122; San Jose, Mexico, Jun. 26-30, 2017; Source: Motorola Mobility, Lenovo; Title: Application Function influence on slice selection (revision of S2-17xxxx).

S2-174339, SA WG2 Meeting #122; San Jose, Mexico, Jun. 26-30, 2017; Source: Huawei, HiSilicon; Title: Allowed NSSAI.

(56) References Cited

OTHER PUBLICATIONS

S2-174340, SA WG2 Meeting #122; San Jose, Mexico, Jun. 26-30, 2017; Source: Huawei, HiSilicon; Title: TS 23.501—Routing NSSAI to perform AMF selection by (R)AN (revision of S2-17xxxx).
S2-174433, 3GPP TSG SA WG2 Meeting #122; San Jose, Mexico, Jun. 26-30, 2017; Source: Huawei, HiSilicon; Title: TS 23.501—Use Application Data Repository for AF to provide policy requirements that apply to future PDU sessions.
S2-174481, SA WG2 Meeting #122; San Jose, Mexico, Jun. 26-30, 2017; Source: Huawei, HiSilicon; Title: PCF Discovery and Selection.
S2-174485, SA WG2 Meeting #122; San Jose, Mexico, Jun. 26-30, 2017; Source: Qualcomm Incorporated; Title: TS 23.501—Network Triggered change of slices for UE.
S2-174486, SA WG2 Meeting #122; San Jose, Mexico, Jun. 26-30, 2017; Source: Qualcomm Incorporated; Title: TS 23.502—Network Triggered change of slices for UE.
S2-174538; San Jose, Mexico, Jun. 26-30, 2017; Source: Nokia, Alcatel-Lucent Shanghai Bell, Sprint, T-Mobile USA, NEC; Title: Network Slice Instance selection.
S2-174653, SA WG2 Meeting #122; San Jose, Mexico, Jun. 26-30, 2017; Source: NTT DOCOMO; Title: TS 23.502 Clarification of NSSAI stored in the UE's subscription data.
S2-174709, SA WG2 Meeting #122; San Jose, Mexico, Jun. 26-30, 2017; Source: ITRI; Title: Removal of FFS in Section 5.15.1 of TS 23.501 (revision of S2-17xxxx).
S2-174842, 3GPP TSG SA WG2 Meeting #122; San Jose, Mexico, Jun. 26-30, 2017; Source: Huawei, HiSilicon; Title: TS 23.501—Use Application Data Repository for AF to provide policy requirements that apply to future PDU sessions.
S2-174902, 3GPP TSG SA Wg2 Meeting #122; San Jose, Mexico, Jun. 26-30, 2017; Source: Huawei, HiSilicon; Title: TS 23.501—Use Application Data Repository for AF to provide policy requirements that apply to future PDU sessions.
S2-175051, SA WG2 Meeting #122; San Jose, Mexico, Jun. 26-30, 2017; Source: Motorola Mobility, Lenovo, Samsung, SK Telecom; Title: Allowed NSSAI mapping information.
S2-175216, SA WG2 Meeting #122; San Jose, Mexico, Jun. 26-30, 2017; Source: Ericsson; Title: NSSF and Slice selection during the Registration procedures (revision of S2-174992).
S2-175217, SA WG2 Meeting #122; San Jose, Mexico, Jun. 26-30, 2017; Source: Huawei, HiSilicon; Title: On Multiple Network Slice instances.
S2-175218, SA WG2 Meeting #122; San Jose, Mexico, Jun. 26-30, 2017; Source: Motorola Mobility, Lenovo; Title: PDU Session maintenance during change of the set of Network Slice(s) (revision of S2-174996, S2-174713).
S2-175219, SA WG2 Meeting #122; San Jose, Mexico, Jun. 26-30, 2017; Source: Motorola Mobility, Lenovo, Samsung, SK Telecom, Telecom Italia; Title: Allowed NSSAI mapping information (revision of S2-175051, S2-174579).
S2-175271, SA WG2 Meeting #122; San Jose, Mexico, Jun. 26-30, 2017; Source: Ericsson; Title: Slice co-existence (merge of S2-174201+4535+4649+4442).
S2-175296, SA WG2 Meeting #122; San Jose, Mexico, Jun. 26-30, 2017; Source: Huawei, HiSilicon, ZTE, China Mobile, Telecom Italia, Oracle, Ericsson, ITRI, China Telecom, InterDigital, KDDI, ETRI, CATT, China Unicom, Deutsche Telekom, Verizon, Broadcom, Motorola, Lenovo, Orange, Samsung, AT&T; Title: Network Slice instance selection (revision of S2-175277, 5224, 5045, 4991.
S2-175336, SA WG2 Meeting #122bis; Sophia Antipolis, France, Aug. 21-25, 2017; Packet #92 Doc 109; LS reply to SA2 on Next Generation Roaming (revision of S2-174728).
3GPP TS 23.501 V1.5.0 (Nov. 2017), 3rd Generation Partnership Project; Technical Specification Group Services and System Aspects; System Architecture for the 5G System; Stage 2 (Release 15).
3GPP TS 23.502 V1.3.0 (Nov. 2017); Technical Specification; 3rd Generation Partnership Project; Technical Specification Group Services and System Aspects; Procedures for the 5G System; Stage 2 (Release 15).

S2-175581, SA WG2 Meeting #122bis; Sophia Antipolis, France, Aug. 21-25, 2017; Source: Samsung; Title: Pushing Slice Coexistence Information to the UE.
S2-175601, SA WG2 Meeting #122bis; Sophia Antipolis, France, Aug. 21-25, 2017; Source: Telecom Italia, KDDI, ZTE; Title: 23.501: Network Slice Isolation.
S2-175630, SA WG2 Meeting #122bis; Sophia Antipolis, France, Aug. 21-25, 2017; Source: Telecom Italia, ZTE; Title: Network Slice Coexistence.
S2-175675, SA WG2 Meeting #122bis; Sophia Antipolis, France, Aug. 21-25, 2017; Source: Ericsson; Title: Network Slice Co-Existence Considerations.
S2-175678, SA WG2 Meeting #122bis; Sophia Antipolis, France, Aug. 21-25, 2017; Source: Nokia, Alcatel-Lucent Shanghai Bell; Title: On Coexistence Rules.
S2-175757, SA WG2 Meeting #122bis; Sophia Antipolis, France, Aug. 21-25, 2017; Source: Qualcomm Incorporated; Title: TS 23.501: Support for Slice Co-Existence.
S2-175911, SA WG2 Meeting #122bis; Sophia Antipolis, France, Aug. 21-25, 2017; Source: Huawei, HiSilicon; Title: Simple Slice Coexistence.
S2-175915, SA WG2 Meeting #122bis; Sophia Antipolis, France, Aug. 21-25, 2017; Source: ZTE, Oracle; Title: 23.501: Network Slicing Clause 5.15.5—Early vs. Late Binding of UE with the Associated NSI Corresponding to Allowed S-NSSAI.
S2-177081, SA WG2 Meeting #123; Ljubljana, Slovenia, Oct. 23-27, 2017; Source: Telecom Italia; Title: OI#4a: Network Slice Isolation (23.501).
S2-177297, SA WG2 Meeting #123; Ljubljana, Slovenia, Oct. 23-27, 2017; Source: Huawei, HiSilicon; Title: TS 23.501: Support of Isolated Slice Usage in the UE.
S2-177414, SA WG2 Meeting #123; Ljubljana, Slovenia, Oct. 23-27, 2017; Source: NTT DOCOMO; Title: TS 23.501: OI#18: Update of SMF and UPF Selection Principle.
S2-177543, SA WG2 Meeting #123; Ljubljana, Slovenia, Oct. 23-27, 2017; Source: Nokia, Nokia Shanghai Bell; Title: 23.501 §6.3.3: NRF for UPF.
S2-177565, SA WG2 Meeting #123; Ljubljana, Slovenia, Oct. 23-27, 2017; Source: Huawei, HiSilicon; Title: OI#18 TS 23.501: Interaction between SMF and UPF on N4 Reference Point.
S2-177566, SA WG2 Meeting #123; Ljubljana, Slovenia, Oct. 23-27, 2017; Source: Huawei, HiSilicon; Title: TS 23.501: UPF Selection based on SMF Local Information.
S2-178097, SA WG2 Meeting #123; Ljubljana, Slovenia, Oct. 23-27, 2017; Source: Huawei, HiSilicon, Samsung, SK Telecom; Title: OI#18 TS 23.501: Interaction between SMF and UPF on N4 Reference Point.
S2-178112, SA WG2 Meeting #123; Ljubljana, Slovenia, Oct. 23-27, 2017; Source: Nokia, Nokia Shanghai Bell, Cisco; Title: 23.501 §6.3.3: NRF for UPF.
S2-178256, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.501 §6.3.3: NRF for UPF discovery.
S2-178468, SA WG2 Meeting #124; Reno, USA, Nov. 27-Dec. 1, 2017; Source: Huawei, HiSilicon; Title: TS23.502 Clarification on UPF selection in PDU session establishment.
Oct. 15, 2020, European Office Action, EP 18211009.8.
Apr. 2, 2019—Extended European Search Report—EP 18211009.8.
Huawei et al.—Oct. 17, 2017—"TS 21.501: Support of isolated slice usage in the UE".
Huawei et al.—Nov. 21, 2017—"OI#4f: Support of isolated slice usage in the UE".
Nov. 13, 2017—3rd Generation Partnership Project; Technical Specification Group Services and System Aspects; System Architecture for the 5G Systeml Stage 2 (Release 15).
S2-175766, SA WG2 Meeting #122bis; Sophia Antipolis, France, Aug. 21-25, 2017; Source: Qualcomm Incorporated; Title: TS 23.501: Network Triggered change of slices for UE.
Qian (Clara) Li et al., "An end-to-end network slicing framework for 5G wireless communication systems", Aug. 2016, Intel Corporation, USA.

(56) References Cited

OTHER PUBLICATIONS

3GPP TS 23.501 V0.4.0 (Apr. 2017), 3rd Generation Partnership Project; Technical Specification Group Services and System Aspects; System Architecture for the 5G System; Stage 2 (Release 15).
R2-1702529 3GPP TSG-RAN WG2 #97bis, Spokane, USA, Apr. 3-7, 2017, Source: Xiaomi, Title: Visibility of Slicing to UE.
R2-1702539 3GPP TSG-RAN2 #97bis, Spokane, USA, Apr. 3-7, 2017, Source: OPPO, Title: Discussion on Mobility Issues of Network Slicing.
R2-1702551 3GPP TSG-RAN WG2 #97bis, Spokane, USA, Apr. 3-7, 2017, Source: Ericsson, Title: Signalling aspects of network slicing.
R2-1702552 Tdoc 3GPP TSG-RAN WG2 #97bis, Spokane, USA, Apr. 3-7, 2017, Source: Ericsson, Title: Slice availability.
R2-1702553 Tdoc 3GPP TSG-RAN WG2 #97bis, Spokane, USA, Apr. 3-7, 2017, Source: Ericsson, Title: Access Control and Resource Isolation for Slicing.
R2-1702554 Tdoc 3GPP TSG-RAN WG2 #97bis, Spokane, USA, Apr. 3-7, 2017, Source: Ericsson, Title: Is UE AS slice agnostic or not.
R2-1702588 3GPP TSG-RAN WG2 #97bis, Spokane, USA, Apr. 3-7, 2017, Source: Huawei, HiSilicon, Title: UE Awareness of Network Slice.
R2-1702589 3GPP TSG-RAN WG2 #97bis, Spokane, USA, Apr. 3-7, 2017, Source: Huawei, HiSilicon, Title: RRC Support for Network Slicing.
R2-1702590 3GPP TSG-RAN WG2 #97bis, Spokane, USA, Apr. 3-7, 2017, Source: Huawei, HiSilicon, Title: Network Slice Selection Assistance Information over RRC.
R2-1702843 3GPP TSG-RAN WG2 #97bis, Spokane, USA, Apr. 3-7, 2017, Source: ZTE, ZTE Microelectronics, Title: Consideration on the NW slice in RAN.
R2-1702969 3GPP TSG-RAN WG2 #97bis, Spokane, USA, Apr. 3-7, 2017, Source: Coolpad, Title: Discussion on UE RRC modeling to support multiple slices per-UE.
R2-1703101 3GPP TSG-RAN WG2 #97bis, Spokane, USA, Apr. 3-7, 2017, Source: CATT, Title: Slice visibility to UE AS.
R2-1703337 3GPP TSG-RAN WG2 #97bis, Spokane, USA, Apr. 3-7, 2017, Source: Samsung, Title: Review on Network Slicing.
R2-1703343 3GPP TSG-RAN WG2 #97bis, Spokane, USA, Apr. 3-7, 2017, Source: Samsung, Title: Slice Information in RRC.
R2-1703762 3GPP TSG-RAN WG2 #97bis, Spokane, USA, Apr. 3-7, 2017, Source: SA3, Title: Reply LS on privacy of registration and slice selection information (revision of Tdoc 53170902 in Busan, Korea from Mar. 27-31, 2017).
R3-170675 3GPP TSG-RAN WG3 #95, Athens, Greece, Feb. 13-17, 2017, Source: Ericsson, Title: Clarifications on the use of NSSAI in Network Slicing.
R3-170677 3GPP TSG-RAN WG3 #95, Athens, Greece, Feb. 13-17, 2017, Source: Ericsson, Title: Mobility and Mapping of NW Slices.
R3-171012 3GPP TSG-RAN WG3 #95bis, Spokane, USA, Apr. 3-7, 2017, Source: CATT, Title: Discussion on Slice-aware mobility.
R3-171029 3GPP TSG-RAN WG3 #95bis, Spokane, USA, Apr. 3-7, 2017, Source: ZTE, Title: NW Slice Availability Handling Approaches during Mobility.
R3-171047 3GPP TSG-RAN WG3 #95bis, Spokane, USA, Apr. 3-7, 2017, Source: Samsung, Title: RAN supporting Network Slicing.
R3-171097 3GPP TSG-RAN WG3 #95bis, Spokane, USA, Apr. 3-7, 2017, Source: Qualcomm Incorporated, Title: TP for network slicing description.
R3-171115 3GPP TSG-RAN WG3 #95bis, Spokane, USA, Apr. 3-7, 2017, Source: Nokia, Alcatel-Lucent Shanghai Bell, Title: Use of slice ID and NSSAI.
R3-171116 3GPP TSG-RAN WG3 #95bis, Spokane, USA, Apr. 3-7, 2017, Source: Nokia, Alcatel-Lucent Shanghai Bell, Title: Connected mode mobility with slicing.
R3-171117 3GPP TSG-RAN WG3 #95bis, Spokane, USA, Apr. 3-7, 2017, Source: Nokia, Title: LS on slice re-mapping during connected mode mobility.
R3-171128 3GPP TSG-RAN WG3 #95bis, Spokane, USA, Apr. 3-7, 2017, Source: LG Electronics Inc., Title: Discussion on slice availability during mobility.
R3-171129 3GPP TSG-RAN WG3 #95bis, Spokane, USA, Apr. 3-7, 2017, Source: LG Electronics Inc., Title: Mobility procedure considering network slice.
R3-171139 3GPP TSG-RAN WG3 #95bis, Spokane, USA, Apr. 3-7, 2017, Source: Ericsson, Title: RAN aspects of NW slicing in Stage 2 specifications.
R3-171140 3GPP TSG-RAN WG3 #95bis, Spokane, USA, Apr. 3-7, 2017, Source: Ericsson, Title: Stage 2 aspects of CN Instance selection signalling.
R3-171141 3GPP TSG-RAN WG3 #95bis, Spokane, USA, Apr. 3-7, 2017, Source: Ericsson, Title: Signalling aspects of networking slicing.
R3-171142 3GPP TSG-RAN WG3 #95bis, Spokane, USA, Apr. 3-7, 2017, Source: Ericsson, Title: LS regarding RAN support for NW slicing.
R3-171143 3GPP TSG-RAN WG3 #95bis, Spokane, USA, Apr. 3-7, 2017, Source: Ericsson, Title: Slice re-mapping or removal during mobility.
R3-171144 3GPP TSG-RAN WG3 #95bis, Spokane, USA, Apr. 3-7, 2017, Source: Ericsson, Title: LS to SA2 on slices and mobility.
R3-171250 3GPP TSG-RAN WG3 #95bis, Spokane, USA, Apr. 3-7, 2017, Source: Huawei, Title: Slice Awareness of Availability during Mobility.
R3-171251 3GPP TSG-RAN WG3 #95bis, Spokane, USA, Apr. 3-7, 2017, Source: Huawi, Title: Further Discussion on Slice Re-mapping.
R3-171252 3GPP TSG-RAN WG3 #95bis, Spokane, USA, Apr. 3-7, 2017, Source: Huawei, Title: Dual Connectivity for Slicing.
R3-171351 3GPP TSG-RAN WG3 #95bis, Spokane, USA, Apr. 3-7, 2017, Source: LG Electronics Inc., Title: TP for exchange of NSSAI in Xn Setup Procedure.
R3-171353 3GPP TSG-RAN WG3 #95bis, Spokane, USA, Apr. 3-7, 2017, Source: Ericsson, Title: RAN aspects of NW slicing in Stage 2 specifications.
R3-171394 3GPP TSG-RAN WG3 #95bis, Spokane, USA, Apr. 3-7, 2017, Source: RAN3, Title: LS regarding RAN support for NW slicing.
R3-171395 3GPP TSG-RAN WG3 #95bis, Spokane, USA, Apr. 3-7, 2017, Source: Ericsson, Title: Stage 2 aspects of CN Instance selection signalling.
R3-171396 3GPP TSG-RAN WG3 #95bis, Spokane, USA, Apr. 3-7, 2017, Source: RAN WG3, Title: LS on slice re-mapping during connected mode mobility.
3GPP TS 36.423 V14.2.0 (Mar. 2017); 3rd Generation Partnership Project; Technical Specification Group Radio Access Network; Evolved Universal Terrestrial Radio Access Network (E-UTRAN); X2 application protocol (X2AP) (Release 14).
3GPP TS 22.261 V15.1.0 (Jun. 2017); Technical Specification; 3rd Generation Partnership Project; Technical Specification Group Services and System Aspects; Service Requirements for the 5G System; Stage 1 (Release 15).
3GPP TS 23.501 V1.2.0 (Jul. 2017); Technical Specification; 3rd Generation Partnership Project; Technical Specification Group Services and System Aspects; System Architecture for the 5G System; Stage 2 (Release 15).

* cited by examiner

_US 11,102,828 B2_

1

USER PLANE FUNCTION SELECTION FOR ISOLATED NETWORK SLICE

CROSS-REFERENCE TO RELATED APPLICATIONS

This application is a continuation of U.S. application Ser. No. 16/213,092, titled "User Plane Function Selection for Isolated Network Slice," and filed Dec. 7, 2018, which claims the benefit of U.S. Provisional Application No. 62/596,237, titled "UPF Selection For Isolated Network Slice" and filed Dec. 8, 2017, the disclosures of which are hereby incorporated by reference in their entirety.

BACKGROUND

Some wireless services may use network slices that differ from other network slices. One or more network devices that provide some services for a wireless device may not accommodate certain network slices that may be required for other services. As a result, difficulties may arise for a wireless device to obtain desired services.

SUMMARY

The following summary presents a simplified summary of certain features. The summary is not an extensive overview and is not intended to identify key or critical elements.

Systems, apparatuses, and methods are described for providing an isolated network slice for a wireless device. A wireless device may request services that may require an isolated network slice. The wireless device may send a packet data unit (PDU) session that may comprise a parameter associated with an isolated network slice. A session management function may determine that user plane function should be selected to accommodate the requested services for the wireless device. For example, some user planes may not be configured for an isolated network slice that may be required for the requested services. A user plane function may be selected to provide the requested services. The user plane function may be selected based on the parameter associated with the isolated network slice. A PDU session may be established for the wireless device using the selected user plane function to provide the requested services for the wireless device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
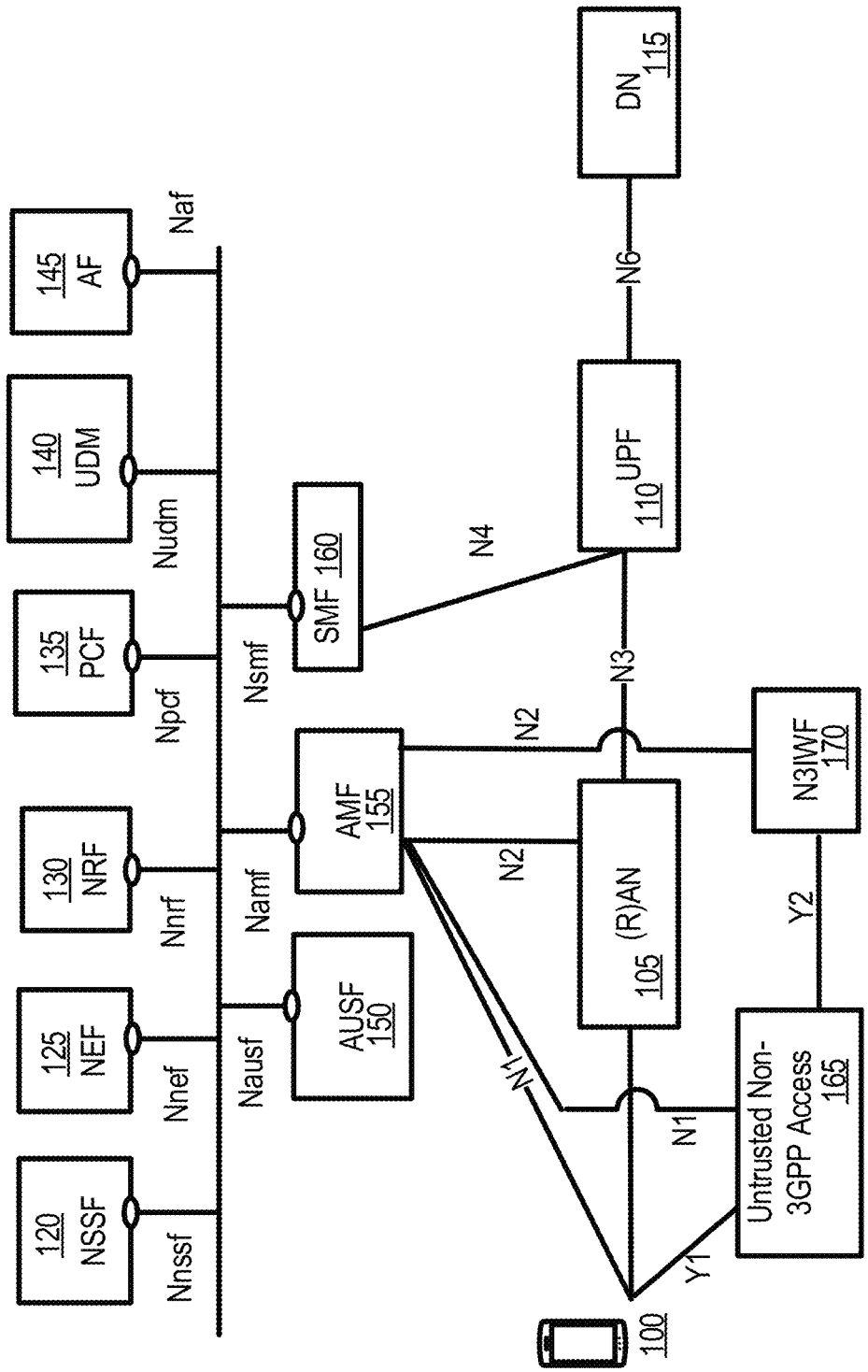
FIG. 1 shows an example 5G system architecture.

The accompanying drawings, which form a part hereof, show examples of the disclosure. It is to be understood that the examples shown in the drawings and/or discussed herein are non-exclusive and that there are other examples of how the disclosure may be practiced.

Examples of enhanced features and functionalities in networks, such as 5G networks, or other systems are provided. The technology disclosed herein may be employed in the technical field of networks, such as 5G systems, and Ethernet type PDU sessions for communication systems. More particularly, the technology disclosed herein may relate to for network slicing in communication systems such as 5GC, 5G, or other systems. The communication systems may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices.

Figure 2:
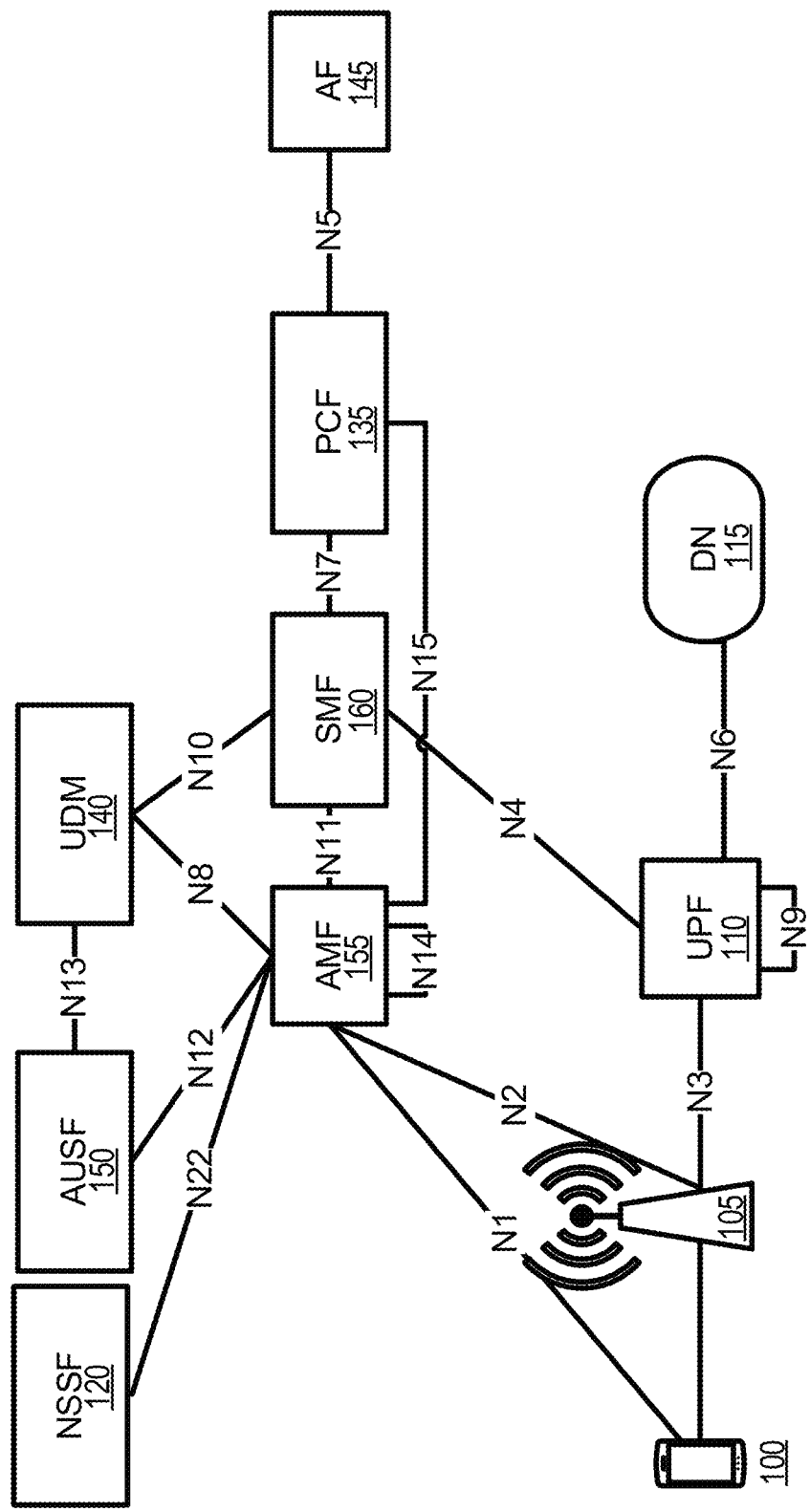
FIG. 2 shows an example 5G system architecture.

The following acronyms are used throughout the present disclosure, provided below for convenience although other acronyms may be introduced in the detailed description.
5G 5th generation mobile networks
5GC 5G Core Network
5GS 5G System
5G-AN 5G Access Network
5QI 5G QoS Indicator
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
eNB Evolved Node B
gNB Next Generation Node B or NR Node B
F-TEID Fully Qualified TEID
GPSI Generic Public Subscription Identifier
GTP GPRS Tunneling Protocol
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSSAI Network Slice Selection Assistance Information
PCF Policy Control Function
PDU Packet Data Unit
PEI Permanent Equipment Identifier
PLMN Public Land Mobile Network
(R)AN (Radio) Access Network
QFI QoS Flow Identity
RM Registration Management
S1-AP S1 Application Protocol
SBA Service Based Architecture
SEA Security Anchor Function
SCM Security Context Management
SMF Session Management Function
SMSF SMS Function
S-NSSAI Single Network Slice Selection Assistance information
SUPI Subscriber Permanent Identifier
TEID Tunnel Endpoint Identifier
UDM Unified Data Management
UE User Equipment
UL Uplink
UL CL Uplink Classifier
UPF User Plane Function
VPLMN Visited Public Land Mobile Network FIG. 1 and FIG. 2 show examples 5G system architecture. A 5G access network may comprise an access network connecting to a 5GC. An access network may comprise an AN 105 (e.g., NG-RAN such as in FIG. 1, or any access node as in FIG. 2) and/or non-3GPP AN 165 which may be an untrusted AN. An example 5GC may connect to one or more 5G access networks (e.g., a 5G AN) and/or NG-RANs. The 5GC may comprise functional elements or network functions as in example FIG. 1 and example FIG. 2, where interfaces may be employed for communication among the functional elements and/or network elements. A network function may be a processing function in a network that has a functional behavior and interfaces. A network function may be implemented as a network element on a dedicated hardware, a base station, and/or as a software instance running on a dedicated hardware, shared hardware, and/or as a virtualized function instantiated on an appropriate platform.

The access and mobility management function AMF 155 may comprise one or more of the following functionalities: termination of (R)AN CP interface (N2), termination of NAS (N1), NAS ciphering and integrity protection, registration management, connection management, reachability management, mobility management, lawful intercept (for AMF events and interface to LI system), transport for session management, SM messages between a wireless device 100 and an SMF 160, transparent proxy for routing SM messages, access authentication, access authorization, transport for short message service (SMS) messages between wireless device 100 and an SMS function (SMSF), security anchor function (SEA) interaction with the AUSF 150 and the wireless device 100, receiving an intermediate key established as a result of the wireless device 100 authentication process, security context management (SCM), and/or receiving a key from the SEA to derive access network specific keys. A variety of these functionalities may be supported in a single instance of an AMF 155 and/or in multiple instances of AMF 155 as appropriate.

The AMF 155 may support non-3GPP access networks via an N2 interface with N3IWF 170, NAS signaling with a wireless device 100 over N3IWF 170, authentication of wireless devices connected over N3IWF 170, management of mobility, authentication, and separate security context state(s) of a wireless device 100 connected via non-3GPP access 165 or connected via 3GPP access 105 and non-3GPP accesses 165 simultaneously, support of a coordinated RM context valid over 3GPP access 105 and non-3GPP access 165, and/or support of context management (CM) management contexts for the wireless device 100 for connectivity over non-3GPP access. Some functionalities described above may be supported in an instance of a network slice. An AMF 155 region may comprise of one or multiple AMF 155 sets. AMF 155 set may comprise of some AMFs 155 that serve a given area and/or network slice(s). Multiple AMF 155 sets may be per AMF 155 region and/or network slice(s). Application identifiers may be mapped to one or more specific application traffic detection rules. A configured NSSAI may be a NSSAI that has been provisioned in a wireless device 100. DN 115 access identifier (DNAI), for a DNN, may be an identifier of a user plane access to a DN 115. Initial registration may be related to a wireless device 100 registration in a RM-DEREGISTERED state. N2AP wireless device 100 association may be a logical per wireless device 100 association between a 5G AN node and an AMF 155. Wireless device 100 may comprise a N2AP wireless device-TNLA-binding, which may be a binding between a N2AP wireless device 100 association and a specific transport network layer (TNL) association for a given wireless device 100.

The session management function (SMF) 160 may comprise one or more of the following functionalities: session management (e.g., session establishment, modify and release, comprising tunnel maintain between UPF 110 and AN 105 node), wireless device IP address allocation & management (comprising optional authorization), selection and control of user plane function(s), configuration of traffic steering at UPF 110 to route traffic to its proper destination, termination of interfaces towards policy control functions, control part of policy enforcement and QoS, lawful intercept (for SM events and interface to LI system), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI system), and/or support for interaction with external DN 115 for transport of signaling for PDU session authorization/authentication by external DN 115. One or more of these functionalities may be supported in a single instance of a SMF 160. One or more of the functionalities described above may be supported in an instance of a network slice.

The user plane function (UPF) 110 may comprise one or more of the following functionalities: anchor point for Intra-/Inter-RAT mobility (if applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, and/or downlink data notification triggering. One or more of these functionalities may be supported in a single instance of a UPF 110. One or more of functionalities described above may be supported in an instance of a network slice. User plane function(s) (UPF(s) 110) may handle the user plane path of PDU sessions. A UPF 110 that provides the interface to a data network supports the functionality of a PDU session anchor.

IP address management may comprise allocation and release of the wireless device IP address as well as renewal of the allocated IP address. The wireless device 100 sets the requested PDU type during the PDU session establishment procedure based on its IP stack capabilities and configuration. The SMF 160 may select PDU type of a PDU session as follows: if the SMF 160 receives a request with PDU type set to IP, the SMF 160 may select either PDU type IPv4 or IPv6 based on DNN configuration and/or operator policies. The SMF 160 may also provide a cause value to the wireless device 100 to indicate whether the other IP version (e.g. IPv6 if IPv4 is selected and vice versa) may be supported on the DNN. If the other IP versions are supported, wireless device 100 may request another PDU session to the same DNN for the other IP version. If the SMF 160 receives a request for PDU type IPv4 or IPv6 and the requested IP version may be supported by the DNN, the SMF 160 selects the requested PDU type. The 5GC elements and wireless device 100 support the following mechanisms: during PDU session establishment procedure, the SMF 160 may send the IP address to the wireless device 100 via SM NAS signaling. The IPv4 address allocation and/or IPv4 parameter configuration via DHCPv4 may also be used if the PDU session may be established. IPv6 prefix allocation may be supported via IPv6 stateless auto configuration, if IPv6 may be supported. IPv6 parameter configuration via stateless DHCPv6 may also be supported. The 5GC may support the allocation of a static IPv4 address and/or a static IPv6 prefix based on subscription information in the UDM 140 or based on the configuration on a per-subscriber, per-DNN basis.

The policy control function PCF 135 may support unified policy framework to govern network behavior, provide policy rules to control plane function(s) to enforce them, and/or implement a front end to access subscription information relevant for policy decisions in a user data repository (UDR). The unified data management UDM 140 may comprise an application front end (FE) that comprises the UDM-FE that may be in charge of processing credentials, location management, and/or subscription management. The PCF 135 may be in charge of policy control and the user data repository (UDR) that stores data required for functionalities provided by UDM-FE, plus policy profiles required by the PCF 135. The data stored in the UDR may comprise at least user subscription data, comprising at least subscription identifiers, security credentials, access and mobility related subscription data, session related subscription data, and/or policy data.

The network exposure function NEF 125 may provide a means to securely expose the services and capabilities provided by the 3GPP network functions, translate between information exchanged with the AF 145 and information exchanged with the internal network functions, and/or receive information from other network functions.

The NF repository function NRF 130 may support a service discovery function that receives NF discovery requests from a NF instance, provides the information of the discovered NF instances to the NF instance, and/or maintains the information of available NF instances and their supported services.

The network slice selection function (NSSF) 120 may support selecting the set of network slice instances serving the wireless device 100, determining the provided NSSAI, determining the AMF 155 set to be employed to serve the wireless device 100, and/or, based on configuration, determining a list of candidate AMF(s) 155, possibly by querying the NRF 130.

The functionality of non-3GPP interworking function N3IWF 170 for non-3GPP access 165 may comprise at least one or more of the following: supporting of IPsec tunnel establishment with the wireless device, terminating the IKEv2/IPsec protocols with the wireless device 100 over NWu, relaying over N2 the information needed to authenticate the wireless device 100 and authorize its access to the 5GC, terminating of N2 and N3 interfaces to 5GC for control-plane and user-plane respectively, relaying uplink and downlink control-plane NAS (N1) signaling between the wireless device 100 and AMF 155, handling of N2 signaling from SMF 160 (which may be relayed by AMF 155) related to PDU sessions and QoS, establishing of IPsec security association (IPsec SA) to support PDU session traffic, relaying uplink and downlink user-plane packets between the wireless device 100 and UPF 110, enforcing QoS corresponding to N3 packet marking, considering QoS requirements associated to such marking received over N2, N3 user-plane packet marking in the uplink, local mobility anchor within untrusted non-3GPP access networks 165 using MOBIKE, and/or supporting AMF 155 selection.

The application function AF 145 may interact with the 3GPP core network to provide a variety of services. Based on operator deployment, AF 145 may be trusted by the operator to interact directly with relevant network functions. Application functions not provided by the operator to access directly the network functions may use the external exposure framework (via the NEF 125) to interact with relevant network functions.

The control plane interface between the (R)AN 105 and the 5GC may support connection of multiple different kinds of ANs, such as 3GPP (R)AN 105 and/or N3IWF 170, to the 5GC via a unique control plane protocol. A single N2 AP protocol may be employed for both the 3GPP access 105 and non-3GPP access 165 and/or for decoupling between AMF 155 and other functions such as SMF 160 that may need to control the services supported by AN(s) (e.g. control of the UP resources in the AN 105 for a PDU session). The 5GC may be able to provide policy information from the PCF 135 to the wireless device 100. Such policy information may comprise the following: access network discovery & selection policy, wireless device route selection policy (URSP) that groups to or more of SSC mode selection policy (SSCMSP), network slice selection policy (NSSP), DNN selection policy, and/or non-seamless offload policy. The 5GC may support the connectivity of a wireless device 100 via non-3GPP access networks 165. As shown in example FIG. 5, the registration management, RM may be employed to register or de-register a wireless device 100 with the network, and establish the user context in the network. Connection management may be employed to establish and release the signaling connection between the wireless device 100 and the AMF 155.

A wireless device 100 may need to register with the network to receive services that require registration. The wireless device 100 may update its registration with the network, e.g., periodically, after the wireless device is registered, to remain reachable (e.g. periodic registration update), on mobility (e.g. mobility registration update), and/or to update its capabilities or re-negotiate protocol parameters. An initial registration procedure, such as in the examples shown in FIG. 8A and FIG. 8B, may involve execution of network access control functions (e.g. user authentication and access authorization based on subscription profiles in UDM 140). As result of the registration procedure, the identity of the serving AMF 155 may be registered in UDM 140. The registration management (RM) procedures may be applicable over both 3GPP access 105 and non-3GPP access 165.

Figure 3:
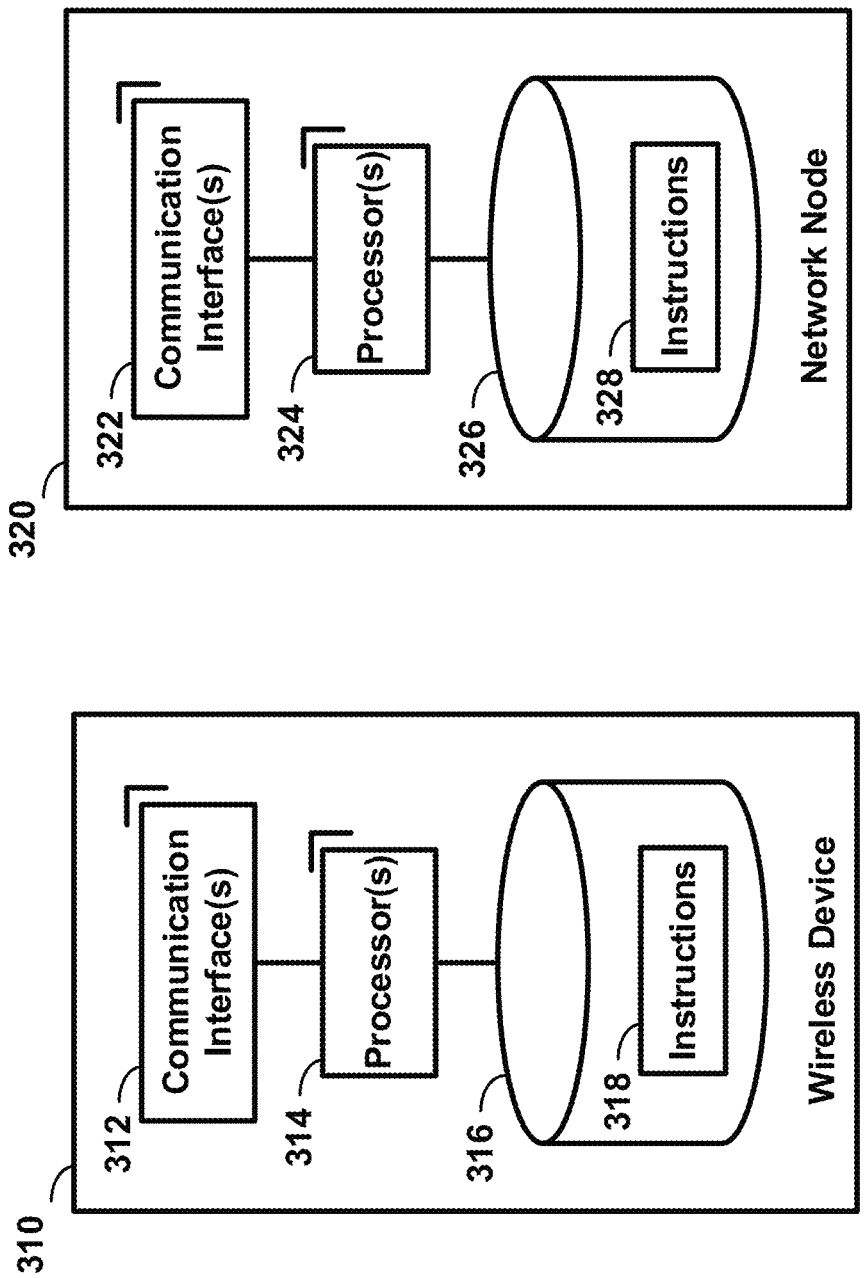
FIG. 3 shows an example of a wireless device and a network node.
Figure 4A:
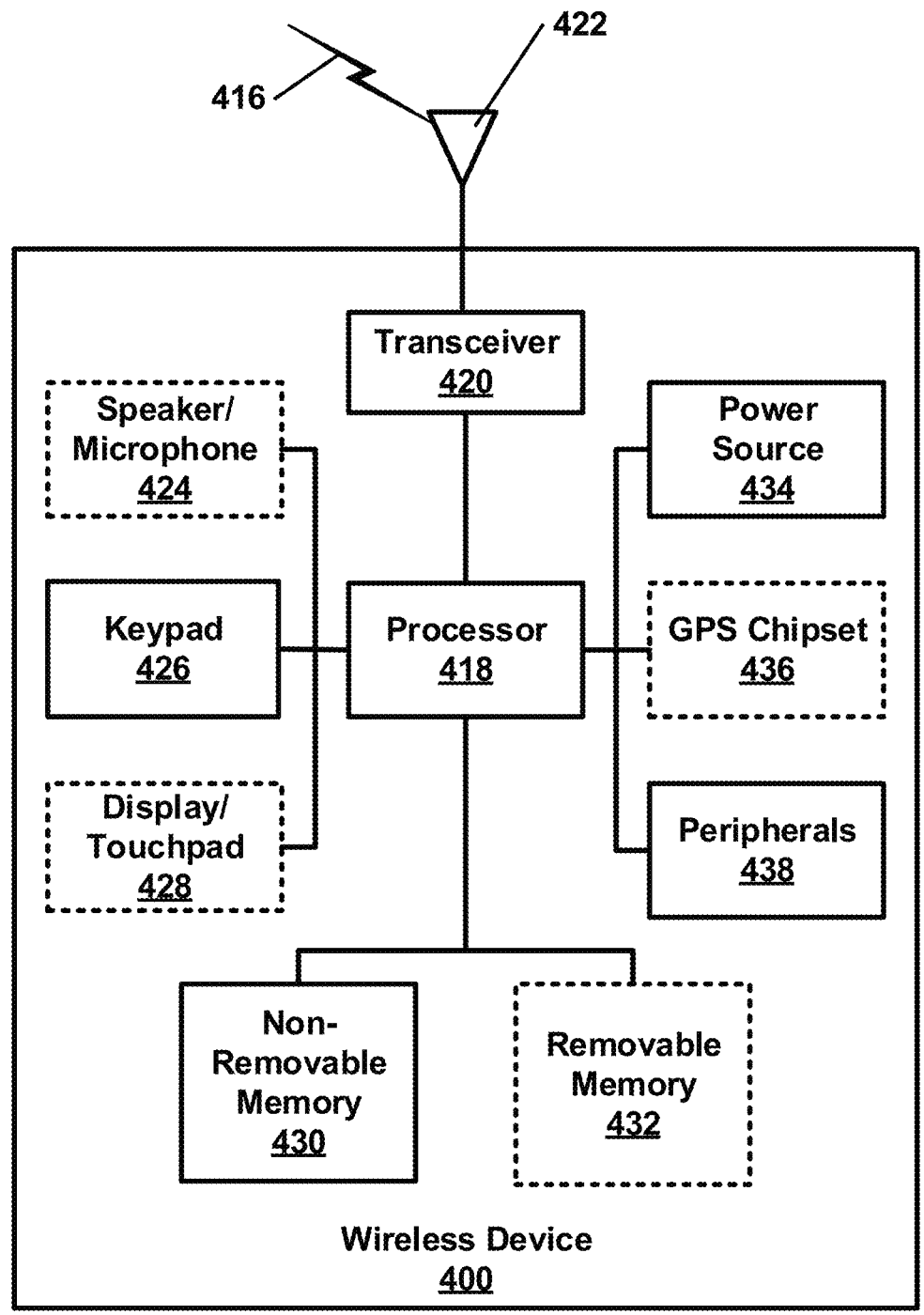
FIGS. 4A and 4B show example elements of computing devices that may be used to implement any of the various devices described herein.
Figure 4B:
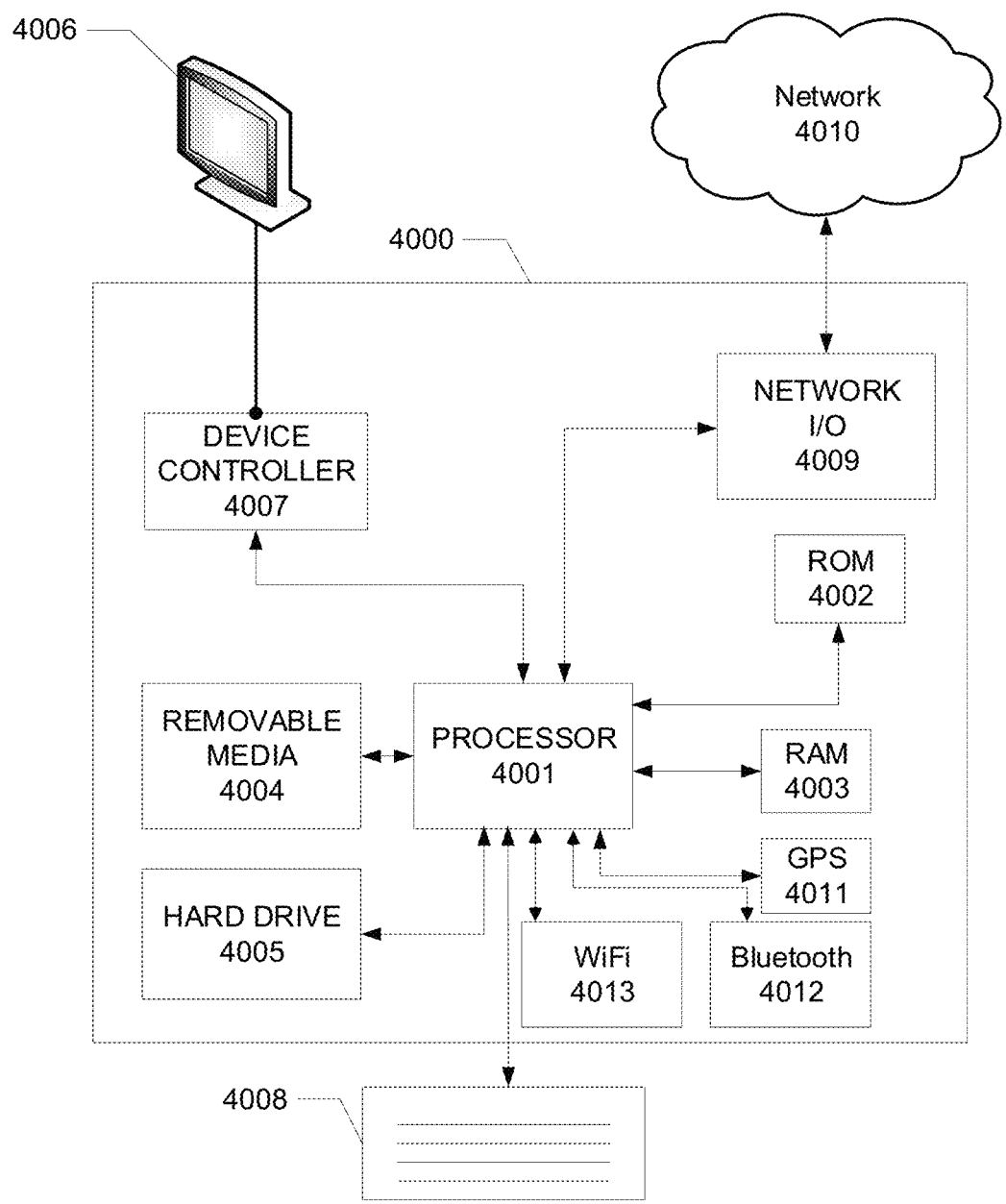

FIG. 3 shows hardware elements of a network node 320 (e.g., a base station) and a wireless device 310. A communication network may include at least one network node 320 and at least one wireless device 310. The network node 320 may include one or more communication interface 322, one or more processors 324, and one or more sets of program code instructions 328 stored in non-transitory memory 326 and executable by the one or more processors 324. The wireless device 310 may include one or more communication interface 312, one or more processors 314, and one or more sets of program code instructions 318 stored in non-transitory memory 316 and executable by the one or more processors 314. A communication interface 322 in the network node 320 may be configured to engage in communication with a communication interface 312 in the wireless device 310, such as via a communication path that includes at least one wireless link. The wireless link may be a bi-directional link. The communication interface 312 in the wireless device 310 may also be configured to engage in communication with the communication interface 322 in the network node 320. The network node 320 and the wireless device 310 may be configured to send and receive data over the wireless link using multiple frequency carriers. Network nodes, base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 312, 322 and the wireless link are shown in FIG. 3, FIGS. 4A, and 4B, and associated text. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, and/or any other device capable of sending and/or receiving signals. Any reference to one or more of these terms/devices also considers use of any other term/device mentioned above.

The communications network may comprise Radio Access Network (RAN) architecture.

The RAN architecture may comprise one or more RAN nodes that may be a next generation Node B (gNB) (e.g., 320) providing New Radio (NR) user plane and control plane protocol terminations towards a first wireless device (e.g. 310). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. The network node 320 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

FIG. 4A shows general hardware elements that may be used to implement any of the various computing devices discussed herein, including any base station, wireless device, or computing device. The computing device 400 (e.g., wireless device) may include one or more processors 418, which may execute instructions stored memory, such as non-removable memory 430, removable memory 432 (such as a Universal Serial Bus (USB) drive, compact disk (CD) or digital versatile disk (DVD), or floppy disk drive), or any other desired storage medium. Instructions may also be stored in an attached (or internal) hard drive. The computing device 400 may also include a security processor (not shown), which may execute instructions of a one or more computer programs to monitor the processes executing on the processor 418 and any process that requests access to any hardware and/or software components of the computing device 400 (e.g., the non-removable memory 430, the removable memory 432, the hard drive, a device controller (e.g., a keypad 426, a display and/or touchpad 428, a speaker and/or microphone 424, and/or one or more peripherals 438), a transceiver 420, a network interface, a GPS 436 (e.g., a GPS chipset), a Bluetooth interface, a WiFi interface, etc.). The computing device 400 may include one or more output devices, such as the display and/or touchpad 428 (e.g., a screen, a display device, a monitor, a television, etc.), and may include one or more output device controllers, such as a video processor. There may also be one or more user input devices, such as a remote control, keyboard, mouse, touch screen, microphone, etc., that may be configured, for example, as one or more of the peripherals 438. The computing device 400 may also include one or more network interfaces, such as a network interface, the may be a wired interface, a wireless interface such as the transceiver 420, or a combination of the two. The network interface may provide an interface for the computing device 400 to communicate (e.g., via communications 416) with a network (e.g., a RAN, or any other network). The network interface may include a modem (e.g., a cable modem), and the external network may include communication links, an external network, an in-home network, a provider's wireless, coaxial, fiber, or hybrid fiber/coaxial distribution system (e.g., a DOCSIS network), or any other desired network. Additionally, the computing device 400 may include a location-detecting device, such as a global positioning system (GPS) chipset or microprocessor 436, which may be configured to receive and process global positioning signals and determine, with possible assistance from an external server and antenna (e.g., antenna 422), a geographic position of the computing device 400.

FIG. 4B shows general hardware elements that may be used to implement any of the various computing devices discussed herein, including, e.g., the network node 320, the wireless device 310, or any other network node, base station, wireless device, or computing device described herein. The computing device 4000 may include one or more processors 4001, which may execute instructions stored in the random access memory (RAM) 4003, the removable media 4004 (such as a Universal Serial Bus (USB) drive, compact disk (CD) or digital versatile disk (DVD), or floppy disk drive), or any other desired storage medium. Instructions may also be stored in an attached (or internal) hard drive 4005. The computing device 4000 may also include a security processor (not shown), which may execute instructions of one or more computer programs to monitor the processes executing on the processor 4001 and any process that requests access to any hardware and/or software components of the computing device 4000 (e.g., ROM 4002, RAM 4003, the removable media 4004, the hard drive 4005, the device controller 4007, a network interface 4009, a GPS 4011, a Bluetooth interface 4012, a WiFi interface 4013, etc.). The computing device 4000 may include one or more output devices, such as the display 4006 (e.g., a screen, a display device, a monitor, a television, etc.), and may include one or more output device controllers 4007, such as a video processor. There may also be one or more user input devices 4008, such as a remote control, keyboard, mouse, touch screen, microphone, etc. The computing device 4000 may also include one or more network interfaces, such as a network interface 4009, which may be a wired interface, a wireless interface, or a combination of the two. The network interface 4009 may provide an interface for the computing device 4000 to communicate with a network 4010 (e.g., a RAN, or any other network). The network interface 4009 may include a modem (e.g., a cable modem), and the external network 4010 may include communication links, an external network, an in-home network, a provider's wireless, coaxial, fiber, or hybrid fiber/coaxial distribution system (e.g., a DOCSIS network), or any other desired network. Additionally, the computing device 4000 may include a location-detecting device, such as a global positioning system (GPS) microprocessor 4011, which may be configured to receive and process global positioning signals and determine, with possible assistance from an external server and antenna, a geographic position of the computing device 4000.

Although FIGS. 4A and 4B show example hardware configurations, one or more of the elements of the wireless device 400 and/or the computing device 4000 may be implemented as software or a combination of hardware and software. Modifications may be made to add, remove, combine, divide, etc. components of the computing device 4000. Additionally, the elements shown in FIGS. 4A and 4B may be implemented using basic computing devices and components that have been configured to perform operations such as are described herein. For example, a memory of the computing device 4000 may store computer-executable instructions that, when executed by the processor 4001 and/or one or more other processors of the computing device 4000, cause the computing device 4000 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer. Components may be implemented using basic computing devices and components, and the same components (e.g., processor 4001, ROM storage 4002, display 4006, etc.) may be used to implement any of the other computing devices and components described herein. For example, the various components described herein may be implemented using computing devices having components such as a processor executing computer-executable instructions stored on a computer-readable medium, as shown in FIG. 4B. Some or all of the entities described herein may be software based, and may co-exist in a common physical platform (e.g., a requesting entity may be a separate software process and program from a dependent entity, both of which may be executed as software on a common computing device).

Base stations, wireless devices, relay nodes, and other communication devices may comprise one or more transceivers. A transceiver may be a device that comprises both a transmitter and receiver. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment. Although one or more of the above types of devices may be referenced herein (e.g., user equipment, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., a wireless device, base station, eNB, gNB, computing device, etc.), in one or more networks, but it will be understood that one or more features and/or steps may be implemented on any device and/or in any network. As used throughout, the term "base station" may comprise one or more of: a base station, a node, a Node B, a gNB, an eNB, am ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, and/or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 5:
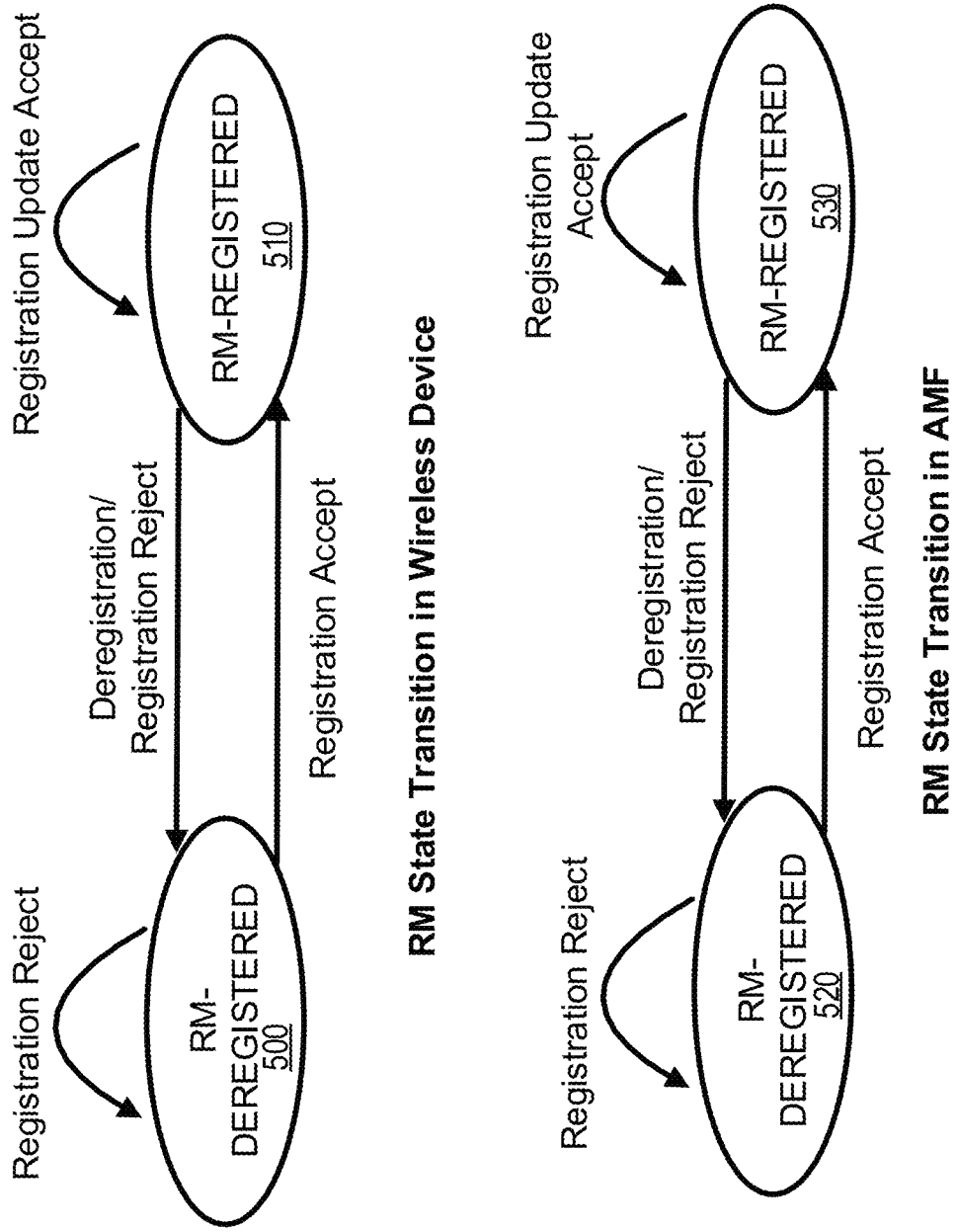
FIG. 5 shows examples of registration management state models for a wireless device and an access and mobility management function (AMF).

FIG. 5 depicts examples of the RM states of a wireless device, such as the wireless device 100, as observed by the wireless device 100 and AMF 155. The top half of FIG. 5 shows RM state transition in the wireless device. Two RM states may be used in a wireless device 100 (and possibly in the AMF 155) that may reflect the registration status of the wireless device 100 in the selected PLMN. The registration status of the wireless device 100 in the selected PLMN may be RM-DEREGISTERED 500 or RM-REGISTERED 510. In the RM DEREGISTERED state 500, the wireless device 100 may not be registered with a network. The wireless device 100 context in AMF 155 may not hold valid location or routing information for the wireless device 100 so the wireless device 100 may be not reachable by the AMF 155. Some wireless device context may still be stored in the wireless device 100 and the AMF 155. In the RM REGISTERED state 510, the wireless device 100 may be registered with the network. In the RM-REGISTERED 510 state, the wireless device 100 may receive services that require registration with the network.

The bottom half of FIG. 5 shows RM state transitions in the AMF 155. Two RM states may be used in the AMF 155 for the wireless device 100 that reflect the registration status of the wireless device 100 in the selected PLMN. The two RM states that may be used in the AMF 155 for the wireless device 100 in the selected PLMN may be RM-DEREGISTERED 520 or RM-REGISTERED 530. The state of RM-DEREGISTERED 500 in the wireless device 100 may correspond to the state of RM-DEREGISTERED 520 in the AMF 155. The state of RM-REGISTERED 510 in the wireless device 100 may correspond to the state of RM-REGISTERED 530 in the AMF 155.

Figure 6:
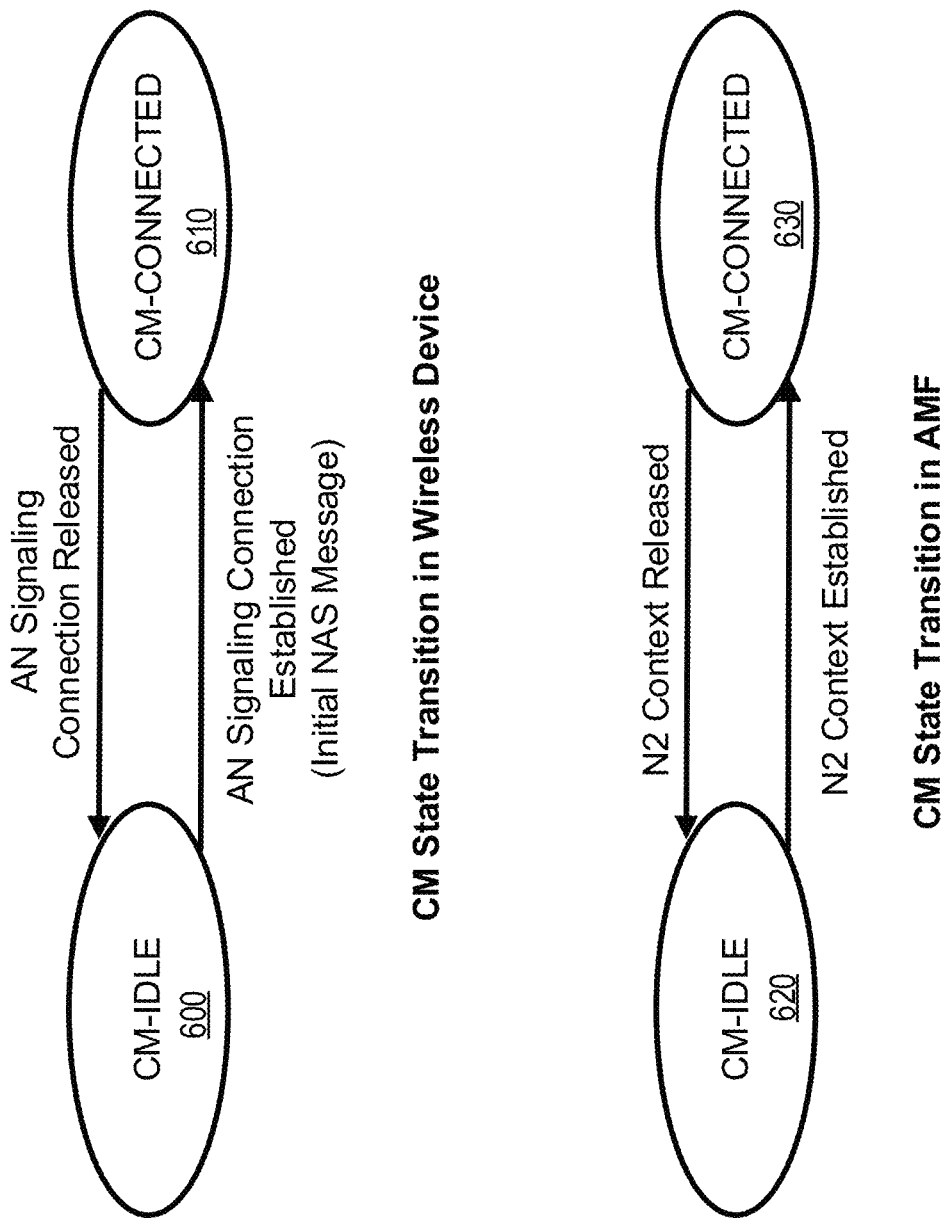
FIG. 6 shows examples of connection management state models for a wireless device and an AMF.

FIG. 6 depicts examples of CM state transitions as observed by the wireless device 100 and AMF 155. Connection management CM may comprise the functions of establishing and releasing a signaling connection between a wireless device 100 and the AMF 155 over N1. This signaling connection may be used to provide NAS signaling exchange between the wireless device 100 and a core network. The signaling connection may comprise both the AN signaling connection between the wireless device 100 and/or the (R)AN 105 (e.g. RRC connection over 3GPP access) and the N2 connection for this wireless device 100 between the AN and the AMF 155. The top half of FIG. 6 shows CM state transitions in the wireless device 100. Two CM states may be used for the NAS signaling connectivity of the wireless device 100 with the AMF 155: CM-IDLE 600 and CM-CONNECTED 610. A wireless device 100 in CM-IDLE 600 state may be in RM-REGISTERED 510 state that may have no NAS signaling connection established with the AMF 155 over N1. The wireless device 100 may perform cell selection, cell reselection, and PLMN selection. A wireless device 100 in CM-CONNECTED 610 state may have a NAS signaling connection with the AMF 155 over N1. RRC inactive state may apply to NG-RAN (e.g., it applies to NR and E-UTRA connected to 5G CN). The AMF 155 may provide (e.g., based on network configuration) assistance information to the NG (R)AN 105, for example, to assist the NG (R)AN's 105 decision as to whether the wireless device 100 may be sent to RRC inactive state. If a wireless device 100 may be CM-CONNECTED 610 with RRC inactive state, the wireless device 100 may resume the RRC connection (e.g., due to uplink data pending), may execute a mobile initiated signaling procedure (e.g., as a response to (R)AN 105 paging), and/or notify the network that it has left the (R)AN 105 notification area. NAS signaling connection management may comprise the functions of establishing and releasing a NAS signaling connection. NAS signaling connection establishment function may be provided by the wireless device 100 and the AMF 155 to establish a NAS signaling connection for a wireless device 100 in CM-IDLE 600 state. The procedure of releasing a NAS signaling connection may be initiated by the 5G (R)AN 105 node or the AMF 155.

The bottom half of FIG. 6 shows CM state transitions in the AMF 155. Two CM states may be used for a wireless device 100 at the AMF 155: CM-IDLE 620 and CM-CONNECTED 630. The state of CM-IDLE 600 in the wireless device 100 may correspond to the state of CM-IDLE 620 in the AMF 155. The state of CM-CONNECTED 610 in the wireless device 100 may correspond to the state of CM-CONNECTED 630 in the AMF 155. Reachability management of the wireless device 100 may detect whether a wireless device 100 may be reachable and/or provide the wireless device location (e.g., the access node in communication with the wireless device) for the network to reach the wireless device 100. This may be done by paging wireless device 100 and wireless device location tracking. The wireless device location tracking may comprise both wireless device registration area tracking and wireless device reachability tracking. Such functionalities may be either located at a 5GC (e.g., for a CM-IDLE 620 state) or an NG-RAN 105 (e.g., for a CM-CONNECTED 630 state).

The wireless device 100 and the AMF 155 may negotiate wireless device 100 reachability characteristics in CM-IDLE 600 and/or 620 states during registration and registration update procedures. A variety of wireless device reachability categories may be negotiated between a wireless device 100 and an AMF 155 for CM-IDLE 600 and/or 620 states, such as wireless device 100 reachability providing mobile device terminated data. The wireless device 100 may be CM-IDLE 600 mode and mobile initiated connection only (MICO) mode. The 5GC may support a PDU connectivity service that provides exchange of PDUs between a wireless device 100 and a data network identified by a DNN. The PDU connectivity service may be supported via PDU sessions that may be established, for example, after request from the wireless device 100.

A PDU session may support one or more PDU session types. PDU sessions may be established (e.g. after wireless device 100 request), modified (e.g. after wireless device 100 and 5GC request) and released (e.g., after wireless device 100 and 5GC request) using NAS SM signaling exchanged over N1 between the wireless device 100 and the SMF 160. The 5GC may be able to trigger a specific application in the wireless device 100 (e.g., after a request from an application server). If receiving that trigger message, the wireless device 100 may pass it to the identified application in the wireless device 100. The identified application in the wireless device 100 may establish a PDU session to a specific DNN.

Figure 7:
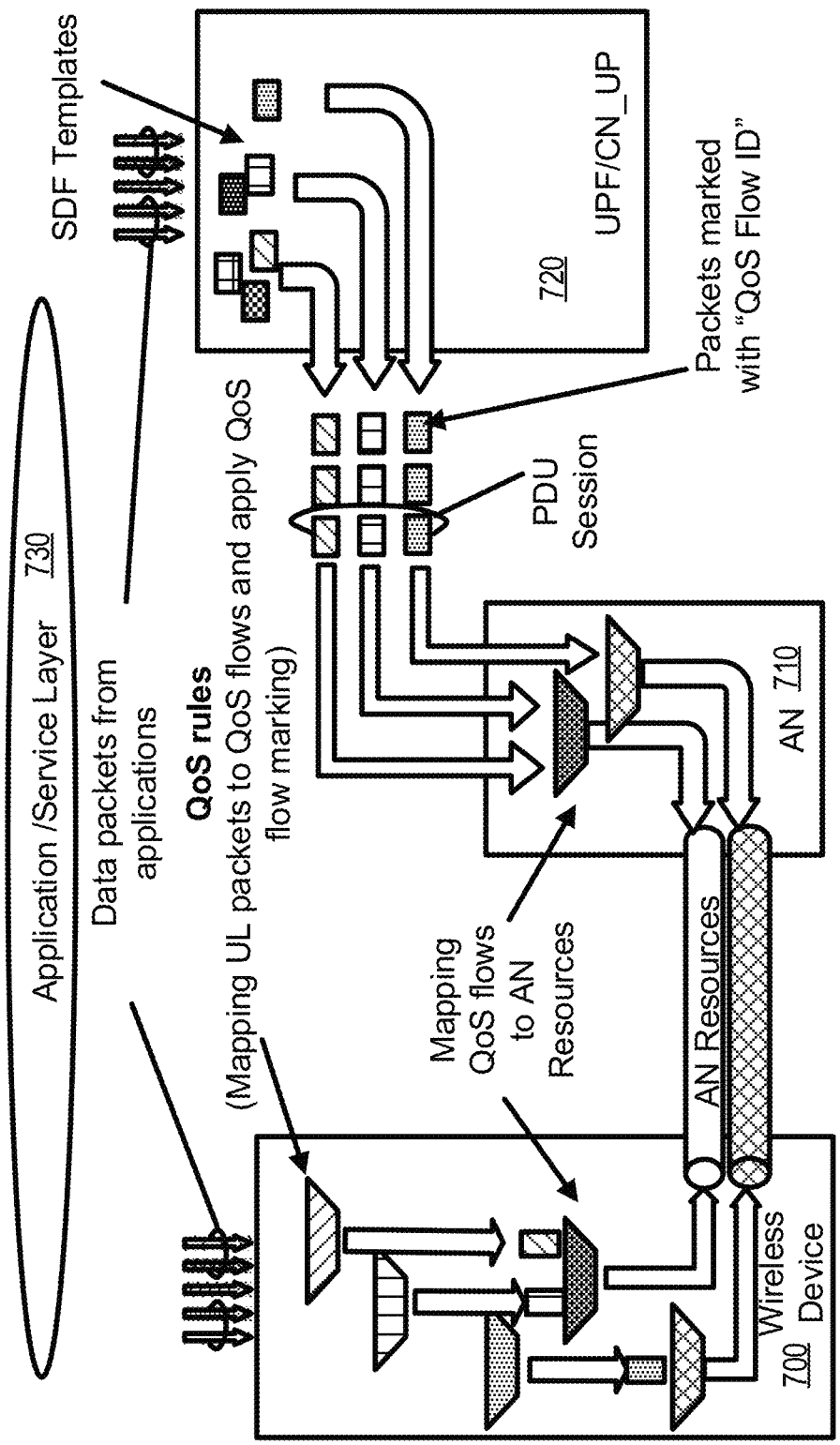
FIG. 7 shows an example for classifying and marking traffic.

FIG. 7 shows an example of a QoS flow based framework. A QoS model (e.g., a 5G QoS model) may support the QoS flow based framework. The QoS model may support both QoS flows that require a guaranteed flow bit rate and QoS flows that may not require a guaranteed flow bit rate. The QoS model may also support reflective QoS. The QoS model may comprise flow mapping or packet marking at the CN_UP 720, AN 710, and/or wireless device 700. Packets may arrive from and/or destined to the application/service layer 730 of wireless device 700, CN_UP 720, and/or an AF (e.g., the AF 145). QoS flow may be granular of QoS differentiation in a PDU session. A QoS Flow IDQFI may be used to identify a QoS flow in a 5G system. User plane traffic with the same QFI within a PDU session may receive the same traffic forwarding treatment. The QFI may be carried in an encapsulation header on N3 (and N9), for example, without any changes to an end-to-end packet header. The QFI may be used with PDUs having different types of payload. The QFI may be unique within a PDU session.

The QoS parameters of a QoS flow may be provided to the (R)AN as a QoS profile over N2 at a PDU session or at a QoS flow establishment, and an NG-RAN may be used, for example, if the user plane may be activated. A default QoS rule may be utilized for every PDU session. An SMF (e.g., SMF 160) may allocate the QFI for a QoS flow and may derive its QoS parameters from the information provided by the PCF. The SMF 160 may provide the QFI together with the QoS profile containing the QoS parameters of a QoS flow to the (R)AN 710. QoS flow may be granular for QoS forwarding treatment in a system (e.g., a 5GS). Traffic mapped to the same QoS flow may receive the same forwarding treatment (e.g., scheduling policy, queue management policy, rate shaping policy, RLC configuration, and/or the like). Providing different QoS forwarding treatment may require separate QoS flow. A QoS indicator may be used as a reference to a specific QoS forwarding behavior (e.g., packet loss rate, and/or packet delay budget) to be provided to a QoS flow. This QoS indicator may be implemented in the access network by the 5QI referencing node specific parameters that control the QoS forwarding treatment (e.g., scheduling weights, admission thresholds, queue management thresholds, link layer protocol configuration, and/or the like).

One or more devices (e.g., a 5GC) may support edge computing and may provide operators and/or third party services to be hosted close to the wireless device access point of attachment. The one or more devices (e.g., a 5GC) may select a UPF 110 close to the wireless device 100 and may execute the traffic steering from the UPF 110 to the LADN via a N6 interface. This selecting a UPF 110 close to the wireless device may be based on the wireless device subscription data, wireless device location, the information from application function AF 145, policy, and/or other related traffic rules. The one or more devices (e.g., a 5GC) may expose network information and capabilities to an edge computing application function. The functionality support for edge computing may comprise local routing where the one or more devices (e.g., a 5GC) may select UPF 110 to route the user traffic to the LADN, traffic steering where the one or more devices (e.g., a 5GC) selects the traffic to be routed to the applications in the LADN, session and service continuity to provide wireless device 100 and application mobility, user plane selection and reselection (e.g., based on input from application function), network capability exposure where the one or more devices (e.g., a 5GC) and application function may provide information to each other via NEF, QoS and charging where PCF may provide rules for QoS control and charging for the traffic routed to the LADN, and/or support of local area data network where the one or more devices (e.g., a 5GC) may provide support to connect to the LADN in a certain area where the applications are deployed.

An example system (e.g., a 5GS) may be a 3GPP system comprising of 5G access network 105, 5GC and a wireless device 100, and/or the like. Provided NSSAI may be an NSSAI provided by a serving PLMN, for example, during a registration procedure, indicating the NSSAI provided by the network for the wireless device 100 in the serving PLMN for the current registration area. A periodic registration update may be wireless device 100 re-registration at expiry of a periodic registration timer. A requested NSSAI may be a NSSAI that the wireless device 100 may provide to the network. A service-based interface may represent how a set of services may be provided/exposed by a given NF.

A PDU connectivity service may provide exchange of PDUs between a wireless device 100 and a data network. PDU session may be an association between a wireless device 100 and a data network, DN that provides a PDU connectivity service. The type of association may be IP, Ethernet, or unstructured. Service continuity may comprise an uninterrupted user experience of a service, for example, if the IP address and/or anchoring point change. Session continuity may comprise the continuity of a PDU session. For a PDU session of an IP type session, continuity may indicate that the IP address may be preserved for the lifetime of the PDU session. An uplink classifier may be a UPF functionality that aims at diverting uplink traffic, for example, based on filter rules provided by SMF, towards a data network.

The system architecture may support data connectivity and services enabling deployments to use techniques such as, but not limited to, network function virtualization and/or software defined networking. The system architecture may leverage service-based interactions between control plane (CP) network functions where identified. In system architecture, separation of the user plane (UP) functions from the control plane functions may be considered. A system may provide a network function to interact with other NF(s) directly if required. A system may reduce dependencies between the access network (AN) and the core network (CN). The architecture may comprise a converged access-agnostic core network with a common AN-CN interface that integrates different 3GPP and non-3GPP access types. A system furthermore may support a unified authentication framework, stateless NFs (e.g., where the compute resource may be decoupled from the storage resource), capability exposure, and/or concurrent access to local and centralized services. UP functions may be deployed close to the access network, for example, to support low latency services and access to LADNs.

A system may support roaming with both home routed traffic as well as local breakout traffic in the visited PLMN. An example architecture may be service-based and the interaction between network functions may be represented in a variety of ways. FIG. 1 shows an example service-based representation, where network functions within the control plane may provide other authorized network functions to access their services. This service-based representation shown in FIG. 1 may also comprise point-to-point reference points where necessary. FIG. 2 shows an example reference point representation, showing the interaction between the NF services in the network functions described by point-to-point reference point (e.g., N11) between any two network functions.

Establishment of user plane connectivity to a data network via a network slice instance(s) may comprise performing an RM procedure, for example, to select an AMF 155 that supports the required network slices, and establishing one or more PDU session(s) to the required data network via the network slice instance(s). The set of network slices for a wireless device 100 may be changed, for example, if the wireless device 100 may be registered with a network. The set of network slices for the wireless device 100 may be initiated by the network or the wireless device 100.

Figure 8A:
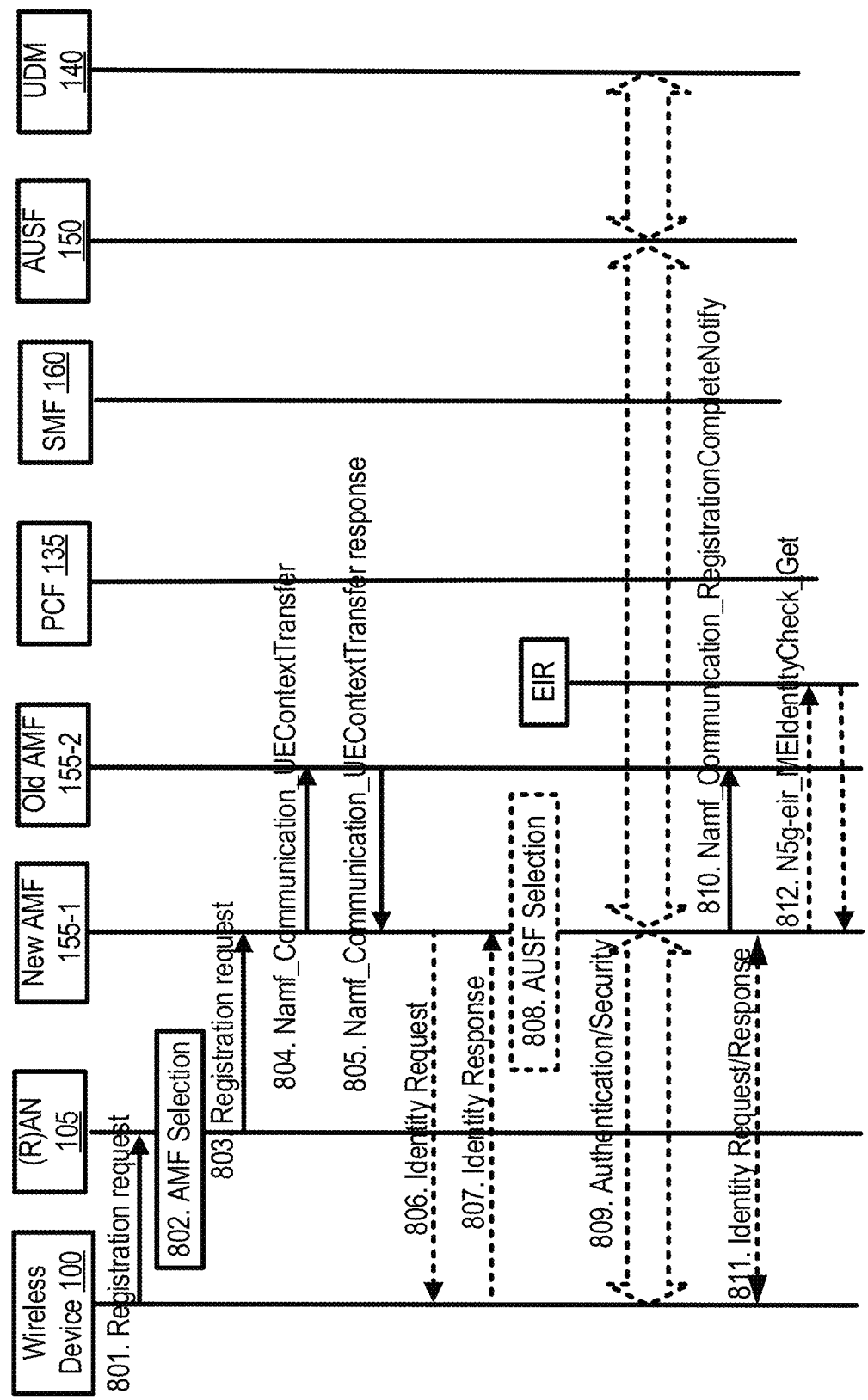
FIGS. 8A-B shows examples of registration procedures.
Figure 8B:
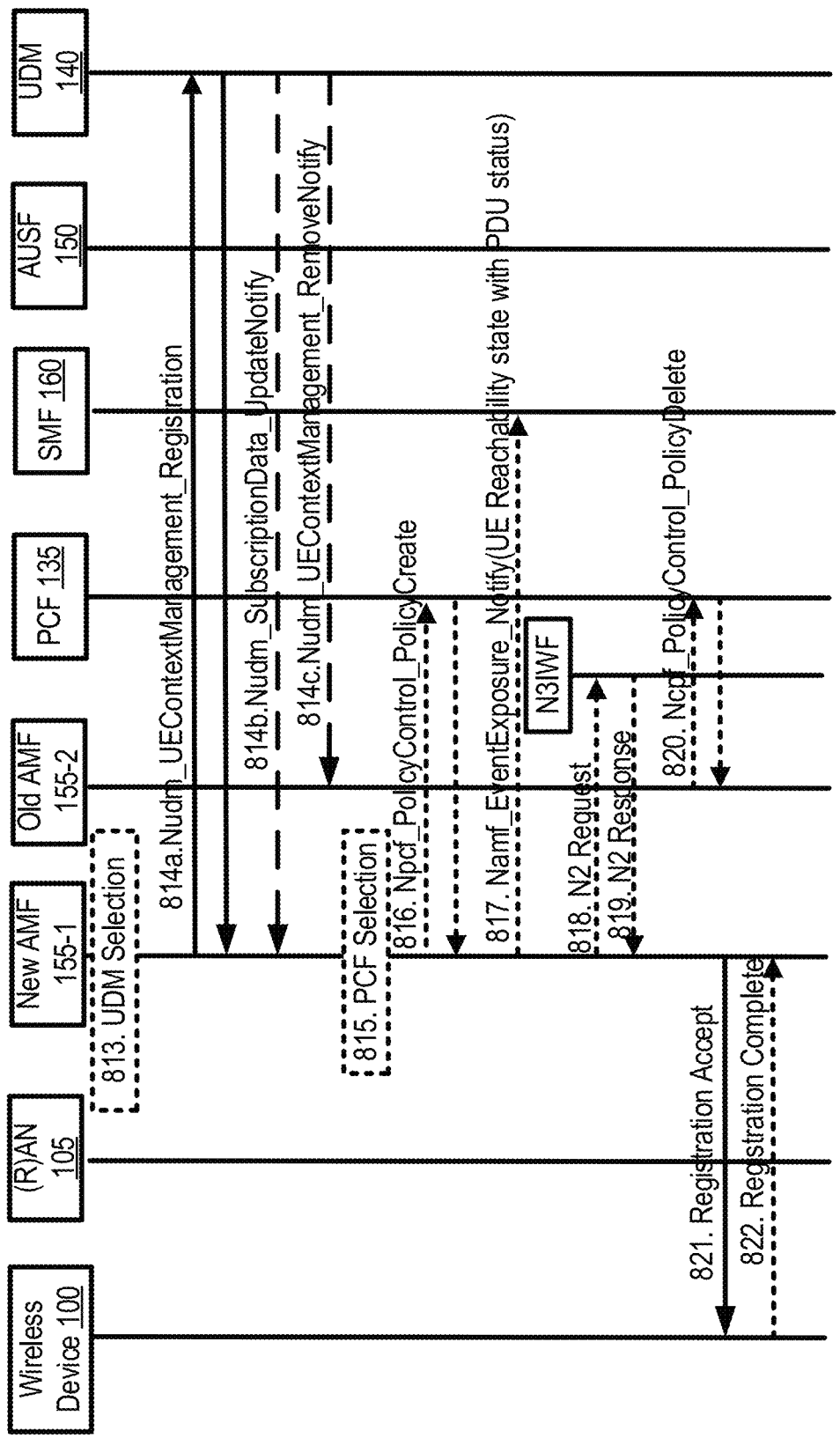

FIGS. 8A and 8B show connection, registration, and mobility management procedures.

These procedures are described, for example, in "5G; Procedures for the 5G System," ETSI TS 123 502 version 15.2.0, also 3GPP TS 23.502 version 15.2.0 Release 15, dated June 2018 and published by the European Telecommunications Standards Institute.

At step 801 (in FIG. 8A), a wireless device (e.g., wireless device 100) may send a message comprising a registration request to a (R)AN (e.g., (R)AN 105). At step 802, the (R)AN 105 may perform an AMF selection. At step 803, the (R)AN 105 may send a message comprising the registration request to a new AMF (e.g., New AMF 155-1). At step 804, the New AMF 155-1 may send, to an old AMF (e.g., Old AMF 155-2), a message comprising an indication of a context transfer (e.g., Namf_Communication_UEContextTransfer). At step 805, the Old AMF 155-2 may send, to the Old AMF 155-1, a response message comprising a context transfer response (e.g., Namf_Communication_UEContextTransfer response). At step 806, the New AMF 155-1 may send, to the wireless device 100, a message comprising an identity request. At step 807, the wireless device 100 may send, to the New AMF 155-1, a message comprising an identity response. At step 908, the New AMF 155-1 may perform an AUSF selection. At step 809, authentication and/or security procedures may be performed between the wireless device 100 and the New AMF 155-1, between the New AMF 155-1 and a AUSF (e.g., AUSF 150), and/or between the AUSF 150 and a UDM (e.g., UDM 140). At step 810, the New AMF 155-1 may send, to the Old AMF 155-2, a message comprising a registration completion notification (e.g., Namf_Communication_RegistrationCompleteNotify). At step 811, messages comprising identity requests and/or responses may be communicated between the wireless device 100 and the New AMF 155-1. At step 812, the New AMF 155-1 may send to an EIR, and/or the EIR may send to the AMF 155-1, one or more messages associated with an identity check (e.g., N5g-eir_MEIdentityCheck_Get).

At step 813 (in FIG. 8B), the New AMF 155-1 may perform a UDM selection. At step 814*a*, the New AMF 155-1 may send, to the UDM 140, a message comprising a context management registration (e.g., Nudm_UEContext-Management_Registration). The UDM 140 may send, to the New AMF 155-1, a message comprising a response to the context management registration. At step 814*b*, the UDM 140 may send, to the New AMF 155-1, a message comprising a notification for a subscription data update (e.g., Nudm-_SubscriptionDate_UpdateNotify). At step 814*c*, the UDM 140 may send, to the Old AMF 155-2, a message comprising a notification of a context management removal (e.g., Nudm_UEContextManagement_RemoveNotify). At step 815, the New AMF 155-1 may perform a PCF selection. At step 816, the New AMF 155-1 may send, to a PCF (e.g., PCF 135), a message comprising policy control or policy creation (e.g., Npcf_PolicyControl_PolicyCreate). The PCF 135 may send a response to the New AMF 155-1. At step 817, the New AMF 155-1 may send, to an SMF (e.g., SMF 160), a message comprising an event exposure notification (e.g., Namf_EventExposure_Notify(UE Reachability state with PDU status)). At step 818, the New AMF 155-1 may send, to a N3IWF, a message comprising an N2 request. At step 819, the N3IWF may send, to the New AMF 155-1, a message comprising an N2 response. At step 820, the Old AMF 155-2 may send, to the PCF 135, a message comprising a policy control and/or policy deletion (e.g., Ncpf_PolicyControl_PolicyDelete). The PCF 135 may send a response to the Old AMF 155-2. At step 821, the New AMF 155-1 may send, to the wireless device 100, a message comprising a registration acceptance (e.g., Registration Accept). At step 822, the wireless device 100 may send, to the New AMF 155-1, a message comprising a registration completion (e.g., Registration Complete). Steps indicated by dashed lines (e.g., steps 806-813, 815-820, and 821) may be optional.

Figure 9:
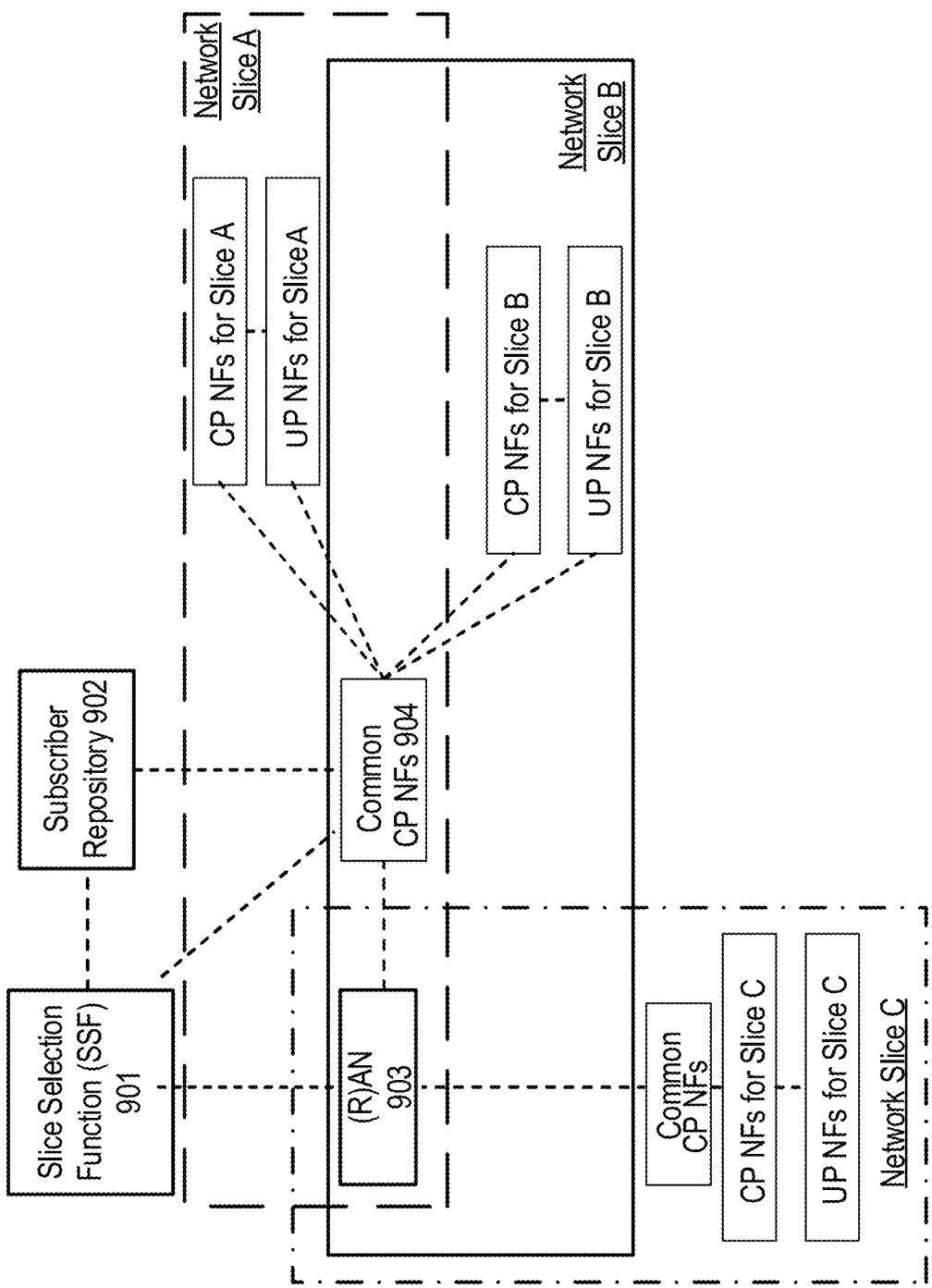
FIG. 9 shows an example of control plane interfaces for network slicing.

FIG. 9 shows an example of control plane interfaces for network slicing. Control plane network functions (CP NFs) and user plane network functions (UP NFs) are shown in FIG. 9 for slice A, slice B, and slice C. One or more (R)AN or core base stations may use a slice routing and selection function (SSF) 901 to link radio access bearer(s) of a wireless device with the corresponding core network instance(s). The subscriber repository 902 may contain subscriber profiles that may be used for authorization. The subscriber repository 902 may also include user identities and corresponding long-term credentials for authentication. The (R)AN 903 may appear as one RAT+PLMN to a wireless device and an association with network instance may be performed by the network internally. The network slices may not be visible to the wireless device. Common CP NFs 904 may be the CP entry function, which may include the mobility management function, authentication function, and/or NAS proxy function. The common CP may be shared parts among different slices. If different types of network slice perform the sharing, the required common CP function may be different for each type of network slice.

Figure 10:
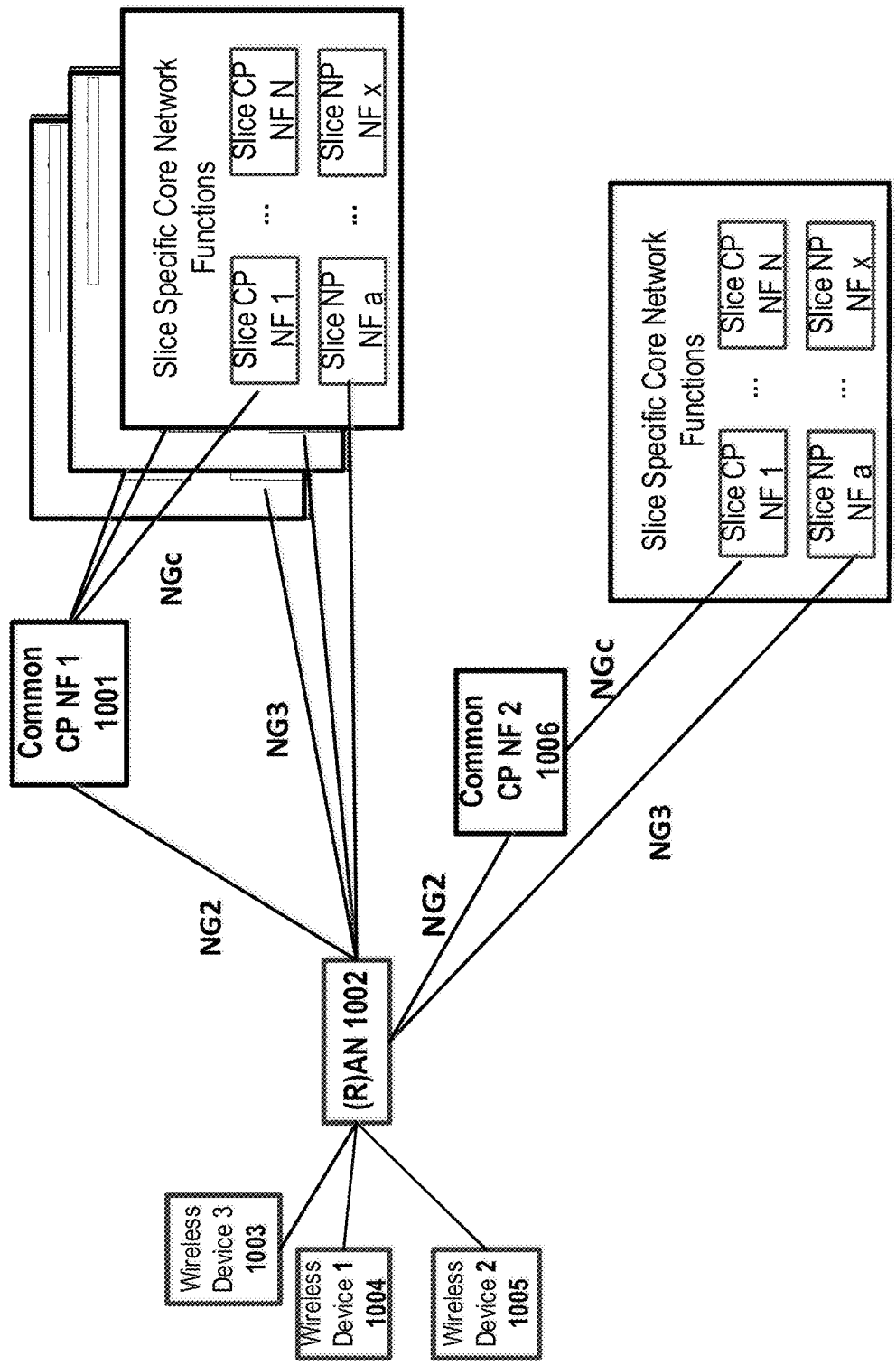
FIG. 10 shows an example of wireless devices assigned to core part of a network slice instance (NSI).

FIG. 10 shows an example depicting wireless device 1 1004, wireless device 2 1005, and wireless device 3 1003 that are assigned to a core part of network slice instances (NSI). Wireless device 1 1004, wireless device 2 1005 and wireless device 3 1003 are connected to specific core network functions via (R)AN 1002. The core network portion of the network slice may share some network functions with other core network portions of network slices that serve the same wireless device, including the NG1 and NG2 terminations, in the common control network functions (CCNF). As shown in FIG. 10, wireless device 1 1004 and wireless device 3 1003 may be assigned to common CP NF1 1001 and have three slices accessing multiple core network slice instances (NSIs) and therefore multiple slice-specific core network functions. However, it should be noted that any number of core network slice instances may be utilized. Wireless device 2 1005 may be associated with one NSI and may be assigned to different Common CP NF 2 1006 (e.g. after the wireless devices attach has occurred).

The core network instances may be set up to provide a wireless device to obtain services from multiple network slices of one network operator simultaneously. A single set of CP functions that are in common among core network instances may be shared across multiple core network instances. UP functions and other CP functions that are not in common may reside in their respective core network instances, and may be not shared with other core network instances. A slice instance ID may be an identifier of a network slice instance and may be used as an indicator by the network to select the corresponding slice for a wireless device. A CP-NF ID may be an identifier of a control plane network function instance.

Figure 11:
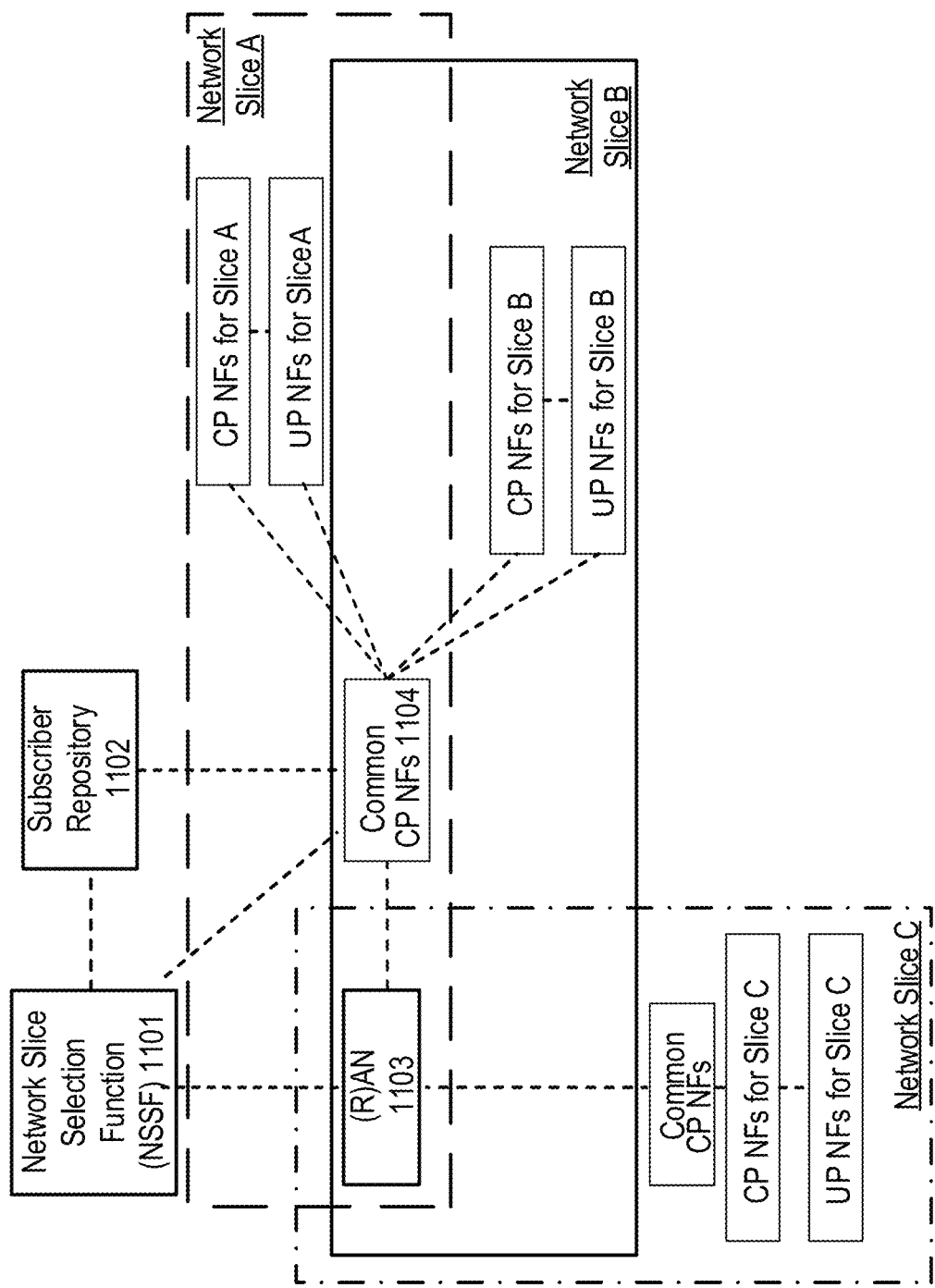
FIG. 11 shows an example of network slice architecture with two groups-common control plane (CP) network functions (NFs) and dedicated CP NFs.

FIG. 11 shows an example depicting a network slice architecture with two groups-common CP NFs and dedicated CP NFs. The NSSF 1101 may be common to network slices in the PLMN and may realize the slice selection function for both groups. The NSSF 1101 may store the mapping information between slice instance ID and NF ID (and/or NF address). The NSSF 1101 may have connection with the subscriber repository 1102 to get wireless device subscribed slice instance IDs corresponding to current PLMN. NSSF 1101 may obtain network slice selection policy information from a policy function. CP-NF ID and/or address may be determined by the NSSF 1101 based on slice instance ID, wireless device subscribed information, and/or network slice selection policy. NSSF may respond the specific CP-NF ID/address corresponding to the slice instance ID of the (R)AN 1103. The NSSF 1101 may be located in the core network, which may be useful for the interaction and mapping update between the NSSF 1101 and subscriber repository 1102. This may make the management of the mapping between Slice Instance ID and NF ID/address in a centralized way. The (R)AN 1103 may act as a routing function to link the wireless device with the appropriate CN part of network slice. The (R)AN 1103 may store the mapping between the Slice Instance ID and NF ID. The Common CP NFs 1104 may be used for multiple slices with wireless devices simultaneously connected. A wireless device may access multiple network slices at the same time. The Common CP NFs 1104 may have common set of NFs that may be flexibly expanded with additional NFs per slice requirement.

A wireless device may be slice-provided. If so, there may be one or more instances for the attach procedure as described herein. If wireless device attaches without Slice Instance ID, the wireless device may or may not take some assistant parameters (e.g. service type), the wireless device may or may not take some assistant parameters (e.g. service type). The (R)AN may forward the attach request to NSSF 1101. NSSF 1101 may check with subscription data and network slice selection policy and/or provide a response with a predefined/default Slice Instance ID to the wireless device. If a wireless device attaches with a Slice Instance ID, the (R)AN 1103 may not know the corresponding slice. The (R)AN 1103 may forward the wireless device request signaling to NSSF 1101 and NSSF 1101 may respond with specific CP-NF ID/address corresponding to the Slice Instance ID. The (R)AN 1103 may route the attach request to the specific CP-NF. If a wireless device attaches with a Slice Instance ID, the (R)AN 1103 may have the related mapping between the Slice Instance ID carried by the wireless device and CP-NF ID. The attach request may be routed to the specific CP-NF in the core network.

Figure 12:
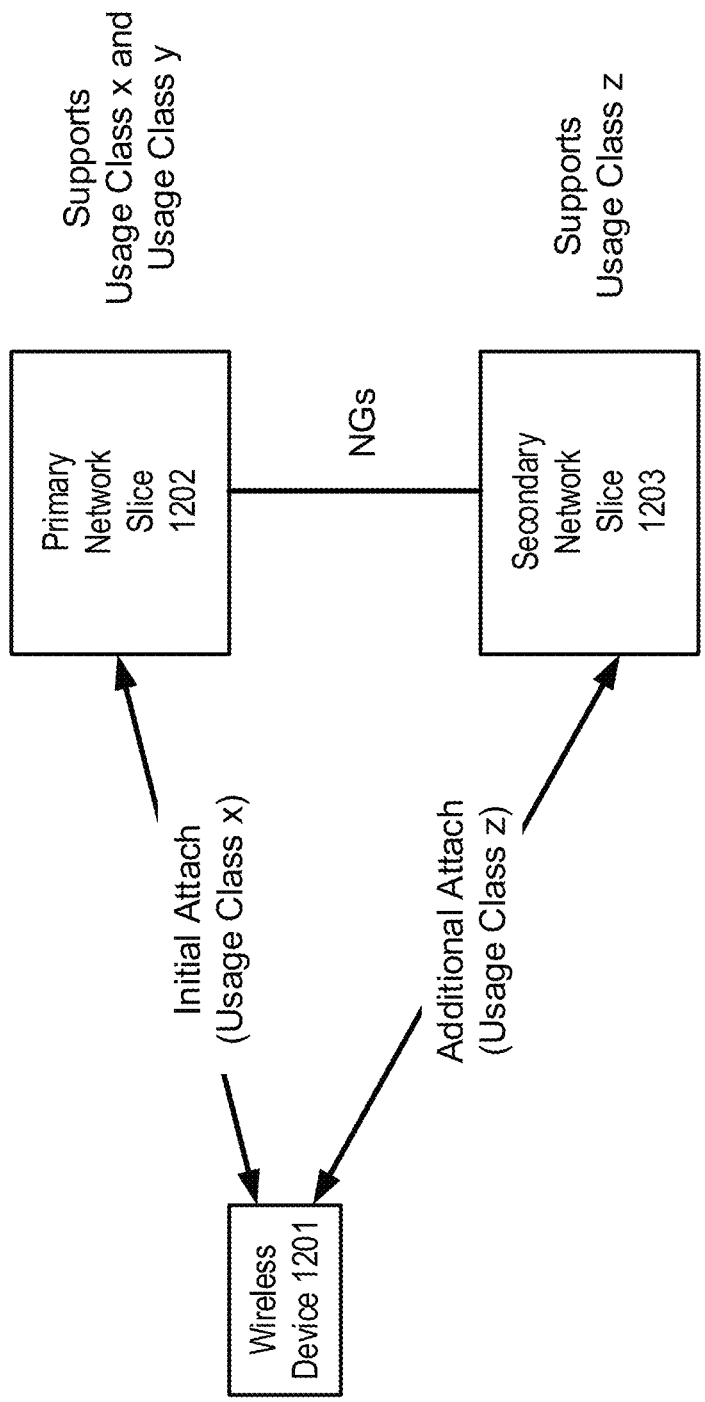
FIG. 12 shows an example of multiple network slices per wireless device.

FIG. 12 shows an example diagram depicting multiple slices per wireless device. The network slice instances may be independent and they may not share any CP or UP functions. The network slice instances may share common databases such as the subscription database and/or policy databases. Network slices instances may communicate via the NGs interface. Each network slice instance may have a unique slice identity that may be resolved to an IP address for communication via NGs. Wireless device 1201 may be simultaneously attached to multiple network slice instances. One of these slices may be the primary network slice 1202 for the wireless device and all the others may be secondary network slices 1203 for the wireless device. The first attach performed by the wireless device may be called initial attach and attaches the wireless device 1201 to the primary network slice 1202, and a subsequent attach may be called additional attach and attaches the wireless device to a secondary network slice 1203.

A Network Slice may include the Core Network CP functions, Core Network CP functions, a 5G Radio Access Network, and/or the N3IWF functions to the non-3GPP Access Network. Network slices may differ for supported features and network functions implementation. The operator may deploy multiple Network Slice instances delivering the same features but for different groups of wireless devices. The instances may deliver a different committed service and/or may be dedicated to a customer. The NSSF may store the mapping information between slice instance ID and NF ID (or NF address). A single wireless device may simultaneously be served by one or more network slice instances via a 5G-AN. A single wireless device may be served by k network slices (e.g. k=8, 16, etc.) at a time. An AMF instance serving the wireless device logically belongs to a Network Slice instances serving the wireless device. A PDU session may belong to one specific network slice instance per PLMN. Different network slice instances may not share a PDU session. Different slices may have slice-specific PDU sessions using the same DNN. An S-NSSAI (Single Network Slice Selection Assistance information) may identify a Network Slice. An S-NSSAI may be included of a slice/service type (SST) (which may refer to the expected Network Slice behavior in terms of features and services) and/or a slice differentiator (SD). A slice differentiator may be optional information that complements the slice/service type(s) to provide further differentiation for selecting a network slice instance from potentially multiple network slice instances that comply with the indicated slice/service type. This information may be referred to as SD. The same Network Slice instance may be selected employing different S-NSSAIs. The CN part of a Network Slice instance(s) serving a wireless device may be selected by CN.

Subscription data may comprise the S-NSSAI(s) of the Network Slices to which the wireless device subscribes. One or more S-NSSAIs may be marked as default S-NSSAI (e.g. k=8, 16, etc.). The wireless device may subscribe to more than eight S-NSSAI. A wireless device may be configured by the HPLMN with a configured NSSAI per PLMN. The wireless device may obtain from the AMF a Provided NSSAI for this PLMN (e.g. after successful completion of a wireless device registration procedure), which may comprise one or more S-NSSAIs. The Provided NSSAI may take precedence over the configured NSSAI for this PLMN. The wireless device may use the S-NSSAIs in the Provided NSSAI corresponding to a Network Slice for the subsequent Network Slice selection related procedures in the serving PLMN. The establishment of user plane connectivity to a data network via a network slice instance(s) may comprise performing a RM procedure to select an AMF that supports the required Network Slices and/or establishing one or more PDU session to the required Data network via the Network Slice Instance(s), If a wireless device registers with a PLMN, if the wireless device for this PLMN has a configured NSSAI or a provided NSSAI, the wireless device may provide to the network, in the Radio Resource Control (RRC) and/or NAS, a Requested NSSAI containing the S-NSSAI(s) corresponding to the slice(s) to which the wireless device attempts to register in addition to the temporary user ID, if one was assigned to the wireless device. The Requested NSSAI may be the configured-NSSAI and/or the Provided-NSSAI. If a wireless device registers with a PLMN, if for this PLMN the wireless device has no configured NSSAI or Provided NSSAI, the (R)AN may route NAS signaling from/to this wireless device to/from a default AMF.

The network, based on local policies, subscription changes, and/or wireless device mobility, may change the set of permitted Network Slice(s) to which the wireless device may be registered. The network may perform such change during a registration procedure and/or trigger a notification towards the wireless device of the change of the supported Network Slices using an RM procedure, which may trigger a registration procedure. The Network may provide the wireless device with a new Provided NSSAI and Tracking Area list. During a Registration procedure in a PLMN, if the network decides that the wireless device should be served by a different AMF based on Network Slice(s) features, the AMF that first received the Registration Request may redirect the Registration request to another AMF via the (R)AN or via direct signaling between the initial AMF and the target AMF.

The network operator may provision the wireless device with a network slice selection policy (NSSP). The NSSP may comprise one or more NSSP rules. An NSSP rule may associate an application with a certain S-NSSAI. A default rule which matches one or more applications to an S-NSSAI may also be comprised. If a wireless device application associated with a specific S-NSSAI requests data transmission, a variety of actions may be performed. If the wireless device has one or more PDU sessions established corresponding to the specific S-NSSAI, the wireless device may route the user data of this application in one of these PDU sessions, unless other conditions in the wireless device prohibit the use of these PDU sessions. If the application provides a DNN, the wireless device may consider also this DNN to determine which PDU session to use. If the wireless device does not have a PDU session established with this specific S-NSSAI, the wireless device may request a new PDU session corresponding to this S-NSSAI and with the DNN that may be provided by the application. In order for the (R)AN to select a proper resource for supporting network slicing in the (R)AN, (R)AN may be aware of the Network Slices used by the wireless device.

The AMF may select a SMF in a Network Slice instance based on S-NSSAI, DNN and other information, such as wireless device subscription and/or local operator policies, if the wireless device triggers the establishment of a PDU session. The selected SMF may establish a PDU session based on S-NSSAI and DNN. In order to support network-controlled privacy of slice information for the slices the wireless device accesses if the wireless device may be aware or configured that privacy considerations apply to NSSAI, the wireless device might not comprise NSSAI in NAS signaling unless the wireless device has a NAS security context and/or the wireless device might not comprise NSSAI in unprotected RRC signaling. For roaming scenarios, the Network Slice specific network functions in VPLMN and HPLMN may be selected based on the S-NSSAI provided by the wireless device during PDU connection establishment. If a standardized S-NSSAI may be used, selections of slice specific NF instances may be done by each PLMN based on the provided S-NSSAI. Additionally, the VPLMN may map the S-NSSAI of HPLMN to a S-NSSAI of VPLMN based on roaming agreement (comprising mapping to a default S-NSSAI of VPLMN). The selection of slice specific NF instance in VPLMN may be based on the S-NSSAI of VPLMN and/or the S-NSSAI of HPLMN.

The 5G system may provide an operator to configure the information that may associate a service to a network slice. Operators may use network slicing implementation to support multiple third parties (e.g. enterprises, service providers, content providers, etc.) that may require similar network characteristics. A business application layer may contain specific applications and services of the operator, enterprise, verticals, and/or third parties that utilize a 5G network. The interface to the end-to-end management and orchestration entity may provide dedicated network slices for an application and/or a mapping of an application to existing network slices. A 5G system may support network slicing for specific applications. Legacy solutions may not support application initiated network slicing. This may cause an interworking problem between the wireless device and the application server for different vendors that may have different implementations for a network slicing initiation. A variety of mechanisms may be provided for an application to trigger the establishment of dedicated network slices.

If a wireless device has registered to a 5G network, both the wireless device and network may initiate the PDU sessions. For the network initiated PDU session establishment procedure, the network may send a device trigger message to the application(s) on the wireless device side. The trigger payload may be comprised in device trigger request message containing the information on which application on the wireless device side may be expected to trigger the PDU session establishment request. Based on that information, the application(s) on the wireless device may trigger the PDU session establishment procedure. An application function AF may transmit the network slicing related information to the PCF. AF may transmit to PCF a request. The request may comprise at least information to identify the traffic to be routed. The traffic may be identified in the AF request by: a DNN and possibly slicing information (S-NSSAI) and/or an AF-Service-Identifier. If the AF provides an AF-Service-Identifier, such as an identifier of the service on behalf of which the AF may be issuing the request, the 5GC may map this identifier into a target DNN and slicing information (S-NSSAI). One or more of the following may be implemented to initiate and/or establish a new slice by an application: the PCF and/or NEF may receive from AF a message comprising network slicing information, the PCF and/or NEF may trigger the network slicing establishment procedure, and/or the AF may be the application function of the operator or a third party application server (e.g. vertical industrial application server). If the third party application does not support the AF, the third party application may request the AF as a sponsor, which may be transparent to the PCF and/or NEF.

The network slicing information may comprise a variety of information elements. Network slicing required information indicates the application requires a dedicated network slice. Without this indication, the operator network might not know whether to reuse the current slice or establish a new one. Required bandwidth information (e.g. minimal bandwidth) for the network slice may describe the bandwidth to support the service and/or a measure of priority for the bandwidth (e.g., the bandwidth may be guaranteed for medical applications). Provided latency information for the network slice may describe the particular service level needed to support the service (e.g., for the time sensitive application Video, VoIP etc.). Priority information for the network slice may be used to allocate priority for network resources (e.g., higher priority network slices (e.g., emergency services) may have the priority on the resource allocation) and/or preempt existing lower priority network slices if the requested resource may be limited. Third party ID and third party charging information may be used to identify a third party and/or indicate that the service may be free of charge for the wireless device but incur a charge for the third party (and vice versa). S-NSSAI or an AF-Service-Identifier information may comprise a Slice/Service type (SST) and a Slice Differentiator (SD) that may indicate expected Network Slice behavior in terms of features and services. The AF-Service-Identifier may be the identifier of the service.

If the PDU session is also required at the same time, the AF may also provide the following information to the PCF or NEF: the service data flow information may be IP 5-tuple (i.e. source IP address, destination IP address, source port number, destination port number and the protocol in use) or application identifier (e.g., Skype, video conferencing applications, etc.), the user identity may be the wireless device IPv4 address or IPv6 prefix, the wireless device NAI, etc., and/or the APN ID may be to identify a specific PDN.

There may be a variety of roaming scenarios including, e.g. if the AF may be located in the home PLMN (HPLMN) or if the AF may be located in the visited PLMN (VPLMN). One or more of the following may be implemented to initiate and/or establish a new slice by an application: the HPCF/VPCF and/or HNEF/VNEF may receive from HAF/VAF a message including network slicing information, the HPCF/VPCF and/or HNEF/VNEF may trigger the network slicing establishment procedure, and the HAF/VAF may be the application function of the operator or a third party application server (e.g. vertical industrial application server). If the third party application does not support the AF, the third party application may request the HAF/VAF as a sponsor, which may be transparent to the HPCF/VPCF and/or HNEF/VNEF. A HAF may initiate and establish a new network slice, and a network slice ID may be allocated by a VPCF.

Figure 13A:
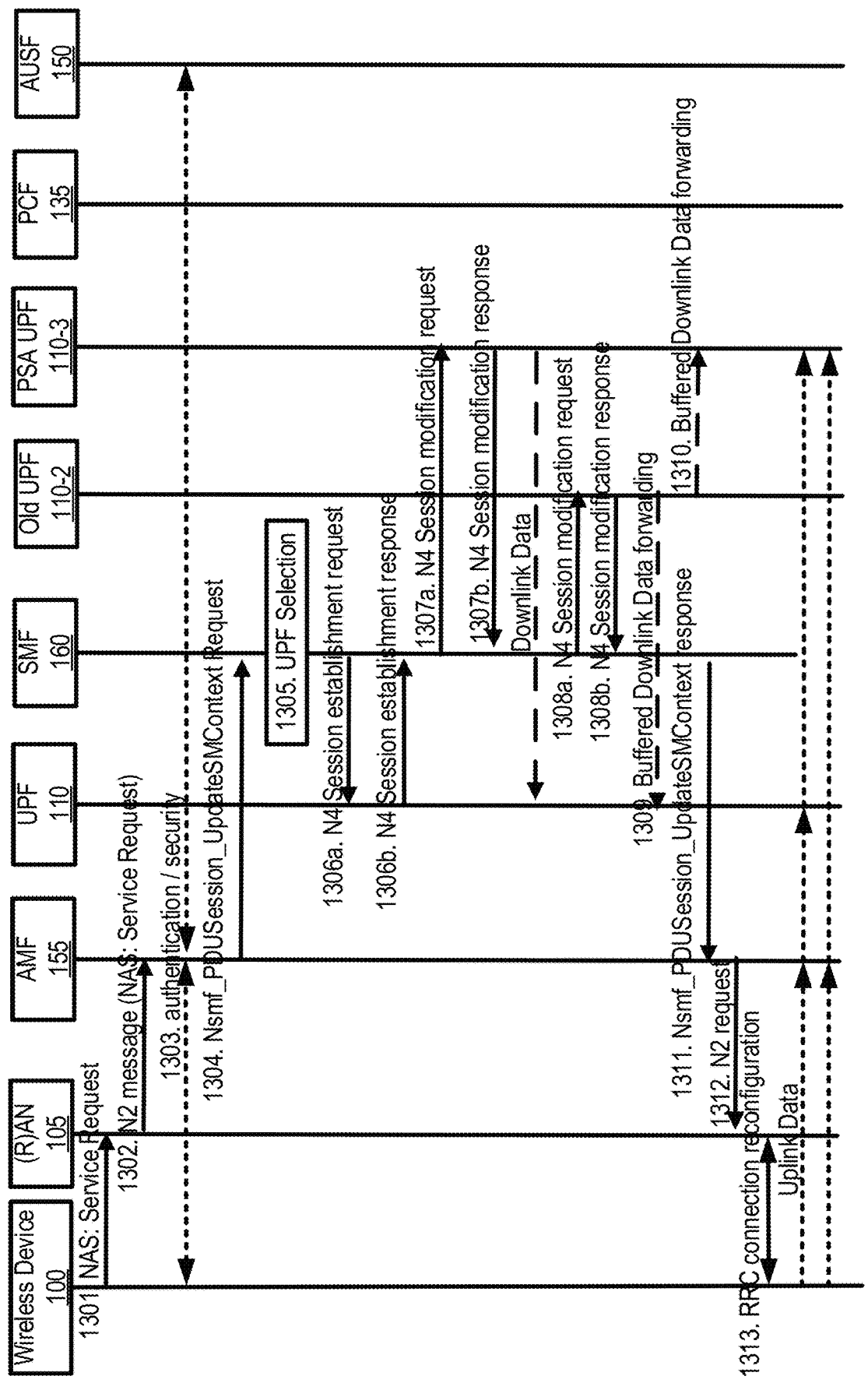
FIG. 13A and FIG. 13B shows example methods for service requests.
Figure 13B:
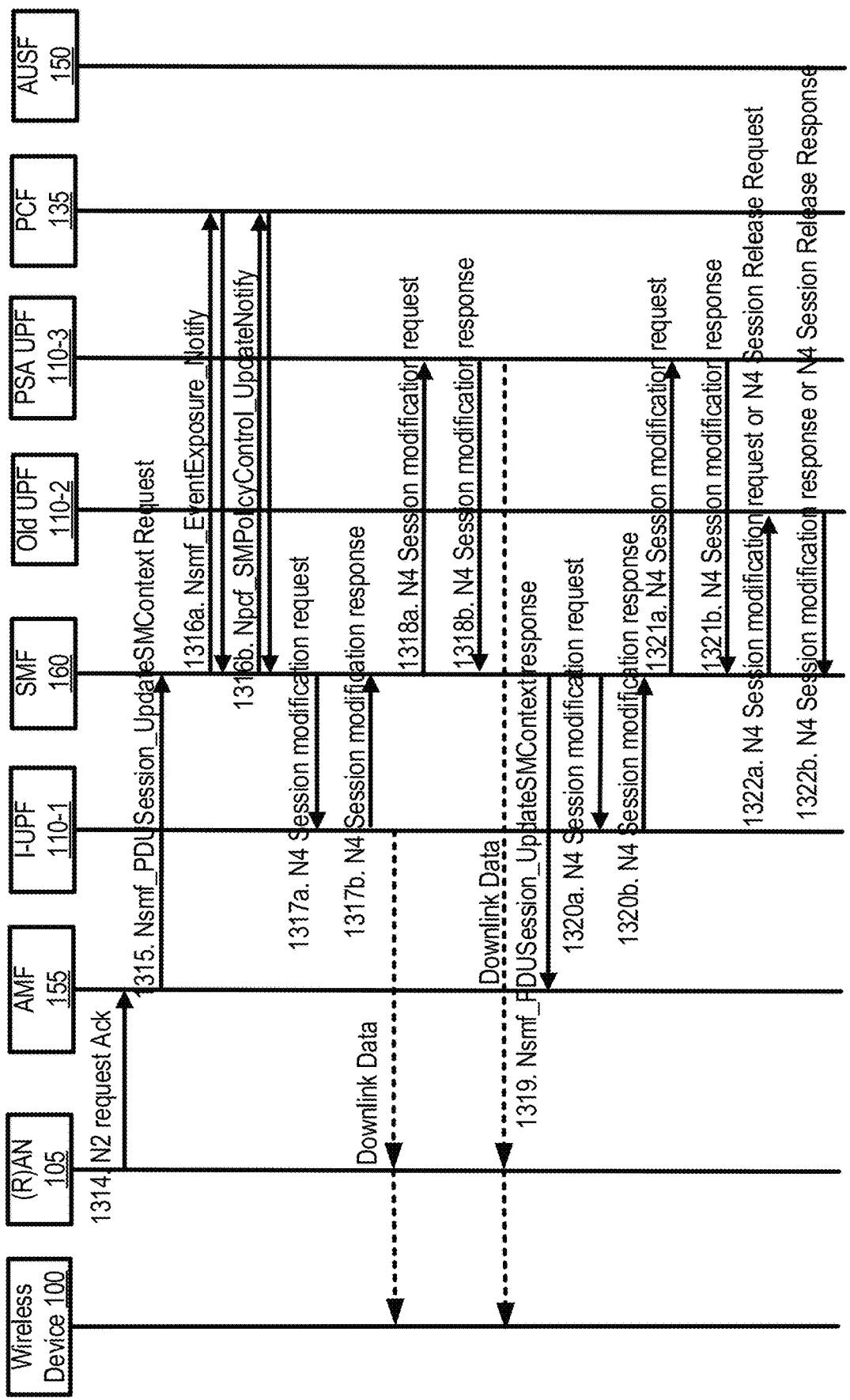

FIG. 13A and FIG. 13B show example methods for service requests. At step 1301, a wireless device may send, to a (R)AN 105, a service request. The service request may comprise a NAS service request. A service request procedure may be triggered by the wireless device 100. The service request procedure may be used by the wireless device 100 in a CM-IDLE state, for example, to request the establishment of a secure connection to an AMF 155. The service request procedure may be used to activate a user plane connection for an established PDU session. The service request procedure may be triggered by the wireless device 100 or by another device (e.g., a 5GC). The service request procedure may be used if the wireless device 100 is in CM-IDLE and/or in CM-CONNECTED. The service request procedure may allow for selectively activating user plane connections for one or more established PDU sessions.

A wireless device in CM IDLE state may initiate the service request procedure, for example, to send uplink signaling messages, for user data, as a response to a network paging request, and/or the like. At step 1302, the (R)AN 105 may send, to an AMF 155, a message. The message may comprise an N2 message. The message may comprise the service request message received from the wireless device 100 at step 1301. At step 1303, the AMF 155 may send one or more messages, for example, one or more authentication and/or security messages. The AMF 155 may perform authentication, for example, after or in response to receiving the service request message. The wireless device 100 and/or another device (e.g., in a network, such as shown in FIG. 1) may send signaling messages, for example, after or in response to the establishment of the signaling connection to the AMF 155. Signaling messages may comprise, for example, a PDU session establishment from the wireless device 100 to a SMF 160, via the AMF 155.

The AMF 155 may respond to a service request with a service accept message, for example, to synchronize PDU session status between the wireless device 100 and other devices in a network (e.g., such as shown in FIG. 1). The AMF 155 may respond, to the wireless device 100, by sending a service reject message, for example, if the service request may not be accepted by one or more devices in the network. The service reject message may include an indication and/or cause code requesting the wireless device 100 to perform a registration update procedure. One or more devices in the network may take further actions for a service request that may be due to user data, for example, if user plane connection activation may not be successful. More than one UPF (e.g., old UPF 110-2 and PDU session anchor PSA UPF 110-3, in FIG. 13A and FIG. 13B) may be used for a service request procedure.

The wireless device 100 may send, to a (R)AN 105, an AN message. The AN message may comprise AN parameters, mobility management, MM NAS Service Request (e.g., a list of PDU sessions to be activated, a list of allowed PDU sessions, security parameters, PDU session status). The list of PDU sessions to be activated may be provided by the wireless device 100, for example, if the wireless device 100 re-activates the PDU session(s). The list of allowed PDU sessions may be provided by the wireless device 100, for example, if the service request is a response to a paging or a NAS notification. The list of allowed PDU sessions may identify the PDU sessions that may be transferred and/or associated to the access on which the service request may be sent. The AN parameters may include a selected PLMN ID and/or an establishment cause, for example, for an NG-RAN. The establishment cause may provide a reason for requesting the establishment of an RRC connection. The wireless device 100 may send a NAS service request message towards the AMF 155 (e.g., at step 1301). The NAS service request message may be encapsulated in an RRC message to the RAN 105.

If the service request may be triggered for user data, the wireless device 100 may identify, using the list of PDU sessions to be activated, the PDU session(s) for which the UP connections are to be activated in the NAS service request message. If the service request may be triggered for signaling, the wireless device 100 may not identify any PDU session(s). If this procedure may be triggered for a paging response, and/or if the wireless device 100 may have at the same time user data to be transferred, the wireless device 100 may identify the PDU session(s) having UP connections that may be activated in an MM NAS service request message. The wireless device may identify the PDU session by the list of PDU sessions to be activated. The wireless device 100 may not identify any PDU session(s) in the service request message for paging response.

The NAS service request message may identify in the list of allowed PDU sessions the list of PDU sessions associated with the non-3GPP access that may be re-activated over 3GPP, for example, if the service request over 3GPP access may be triggered after or in response to a paging indicating non-3GPP access. The PDU session status may indicate the PDU sessions that may be available in the wireless device 100. For example, the wireless device 100 may not trigger the service request procedure for a PDU session corresponding to a local area data network (LADN) if the UE 100 may be outside the area of availability of the LADN. The wireless device 100 may not identify such PDU session(s) in the list of PDU sessions to be activated, for example, if the service request may be triggered for other reasons.

The (R)AN 105 may send (e.g., at step 1302), to the AMF 155, an N2 message comprising N2 parameters, MM NAS service request, and/or the like. The AMF 155 may reject the N2 message, for example, if it may not be able to handle the service request. The N2 parameters may include the 5G-GUTI, selected PLMN ID, location information, RAT type, establishment cause, and/or the like, for example, if an NG-RAN may be used. A 5G-GUTI or other device may be obtained, for example, via an RRC procedure. The (R)AN 105 may select the AMF 155 according to the 5G-GUTI or other device. The location information and RAT type may relate to the cell in which the wireless device 100 may be camping. The AMF 155 may initiate a PDU session release procedure in the network (e.g., based on the PDU session status) for the PDU sessions comprising PDU session ID(s) that may be indicated by the wireless device 100 as not being available.

At step 1303, the AMF 155 may initiate a NAS authentication and/or security procedure, for example, if the service request was not sent integrity protected and/or if integrity protection verification failed. The wireless device 100 and the network may exchange NAS signaling, for example, after or in response to a successful establishment of the signaling connection (e.g., if the wireless device 100 triggers the service request to establish a signaling connection).

At step 1304, the AMF 155 may send, to the SMF 160, a PDU session update context request (e.g., Nsmf_PDUSession_UpdateSMContext Request). The PDU session update may comprise one or more of: PDU session ID(s), cause(s), wireless device 100 location information, access type, and/or the like.

A PDU session update (e.g., Nsmf_PDUSession_UpdateSMContext Request) may be invoked by the AMF 155, for example, if the wireless device 100 identifies PDU session(s) to be activated in a service request message (e.g., the NAS service request message at step 1301). The PDU session update (e.g., Nsmf_PDUSession_UpdateSMContext Request) may be triggered by the SMF 160, for example, if the PDU session(s) identified by the wireless device 100 may correlate to PDU session ID(s) other than the PDU session triggering the procedure. The PDU session update (e.g., Nsmf_PDUSession_UpdateSMContext Request) may be triggered by the SMF 160, for example, if the current wireless device 100 location may be outside the area of validity for the N2 information provided by the SMF 160 during a network triggered service request procedure. The AMF 155 may not send the N2 information provided by the SMF 160 during the network triggered service request procedure.

The AMF 155 may determine the PDU session(s) to be activated. At step 1304, the AMF 155 may send, to the SMF 160, the PDU session update (e.g., an Nsmf_PDUSession_UpdateSMContext Request). The SMF 160 may be associated with a PDU session(s) with a parameter (e.g., a cause indication) set to indicate an establishment of user plane resources for the PDU session(s).

The AMF 155 may notify the SMF 160 that the user plane for the PDU session may not be re-activated, for example, if the service request procedure may be triggered after or in response to paging (which may indicate non-3GPP access) and/or if the list of allowed PDU sessions provided by the wireless device 100 does not include the PDU session for which the wireless device 100 was paged. The service request procedure may succeed without re-activating the user plane of any PDU sessions. The AMF 155 may notify the wireless device 100 that the service request procedure may succeed without re-activating the user plane of any PDU sessions.

The SMF 160 may determine that the wireless device 100 may be outside the area of availability of the LADN, for example, if the PDU session ID may correspond to a LADN and/or based on the wireless device 100 location reporting from the AMF 155. The SMF 160 may determine (e.g., based on one or more local policies) to keep the PDU session, for example, if the SMF 160 determines that the wireless device 100 is outside the area of availability for the LADN. The SMF 160 may reject the activation of a user plane connection for the PDU session. The SMF 160 may inform the AMF 155 about the rejection of the activation of a user plane connection for the PDU session. The SMF 160 may notify the UPF 110 that originated the data notification to discard downlink data for the PDU sessions and/or to not provide further data notification messages, for example, if the service request procedure is triggered by a network triggered service request. The SMF 160 may respond to the AMF 155 with an appropriate reject cause and the user plane activation of PDU session may be stopped. The SMF 160 may determine (e.g., based on one or more local policies) to release the PDU session for example, if the SMF 160 determines that the wireless device 100 is outside the area of availability for the LADN. The SMF 160 may locally release the PDU session. The SMF 160 may inform the AMF 155 that the PDU session may be released. The SMF 160 may respond to the AMF 155 with an appropriate reject cause and the user Plane Activation of PDU Session may be stopped.

At step 1305, the SMF 160 may check UPF 110 selection criteria, for example, if the UP activation of the PDU session may be accepted by the SMF 160. The UP activation of the PDU session may be accepted by the SMF 160 based on the location info received from the AMF 155. The UPF 110 selection criteria may comprise one or more of: slice isolation requirements, slice coexistence requirements, a UPF's dynamic load, a UPF's relative static capacity among UPFs supporting the same DNN, UPF 110 location available at the SMF 160, wireless device 100 location information, capability of the UPF 110, and/or the functionality required for the particular wireless device 100 session. An appropriate UPF 110 may be selected (e.g., at step 1305) by matching the functionality and features required for a wireless device 100, data network name (DNN), PDU session type (e.g., IPv4, IPv6, Ethernet type or unstructured type), and/or, if applicable, the static IP address/prefix, SSC mode selected for the PDU session, wireless device 100 subscription profile in UDM, and/or DNAI (e.g., included in the policy and charging control (PCC) rules, local operator policies, S-NSSAI, access technology being used by the wireless device 100, UPF logical topology, and/or the like). The UPF selected at step 1305 may determine to perform one or more of the following: continue using the current UPF(s); select a new intermediate UPF 110 (or add/remove an intermediate UPF 110); trigger re-establishment of the PDU session to perform relocation of the UPF 110 acting as a PDU session anchor. The UPF 110 may select a new intermediate UPF 110 (or add/remove an intermediate UPF 110), for example, if the wireless device 100 has moved out of the service area of the UPF 110 that was previously connecting to the AN. The UPF 110 may select a new UPF 110 while maintaining the UPF(s) acting as PDU session anchor. The UPF 110 may trigger re-establishment of the PDU session to perform relocation of the UPF 110 acting as a PDU session anchor, for example, if the wireless device 100 has moved out of the service area of the anchor UPF 110 that is connecting to the (R)AN 105.

At step 1306a, the SMF 160 may send, to the UPF 110 (e.g., new intermediate UPF 110) an N4 session establishment request. An N4 session establishment request message may be sent to the new UPF 110, which may provide packet detection, data forwarding, and/or enforcement and reporting rules to be installed on the new intermediate UPF. The SMF 160 may send the N4 session establishment request message, for example, if the SMF 160 may select a new UPF 110 to act as intermediate UPF 110-2 for the PDU session, and/or if the SMF 160 may select to insert an intermediate UPF for a PDU session that may not have an intermediate UPF 110-2. The PDU session anchor addressing information (e.g., on N9) for the PDU session may be provided to the intermediate UPF 110-2. The SMF 160 may include a data forwarding indication, for example, if a new UPF 110 is selected by the SMF 160 to replace the old (intermediate) UPF 110-2. The data forwarding indication may indicate to the UPF 110 that a second tunnel endpoint may be reserved for buffered DL data from the old I-UPF.

At step 1306b, the new UPF (intermediate) may send to SMF 160 an N4 session establishment response message. The UPF 110 may provide DL CN tunnel information for the UPF 110 acting as PDU session anchor and/or UL CN tunnel information (e.g., CN N3 tunnel information) to the SMF 160, for example, if the UPF allocates CN tunnel information. The new (intermediate) UPF 110 acting as an N3 terminating point may send DL CN tunnel information for the old (intermediate) UPF 110-2 to the SMF 160, for example, if the data forwarding indication is received. The SMF 160 may start a timer. After or in response to an expiration of the timer, the SMF may release the resource in the old intermediate UPF 110-2.

At step 1307a, the SMF 160 may send, to a PDU session anchor (e.g., PSA UPF 110-3), an N4 session modification request message, for example, if the SMF 160 selects a new intermediate UPF 110 for the PDU session and/or removes the old I-UPF 110-2. The N4 session modification request message may provide the data forwarding indication and DL tunnel information from the new intermediate UPF 110.

The (PSA) UPF 110-3 may begin to send the DL data to the new I-UPF 110 as indicated in the DL tunnel information, for example, if the new intermediate UPF 110 is added for the PDU session. The SMF 160 may include the data forwarding indication in the request, for example, if the service request is triggered by a network and the SMF 160 removes the old I-UPF 110-2 and does not replace the old I-UPF 110-2 with the new I-UPF 110. The data forwarding indication may indicate to the (PSA) UPF 110-3 that a second tunnel endpoint may be reserved for buffered DL data from the old I-UPF 110-2. The PSA UPF 110-3 may begin to buffer the DL data it may receive from the N6 interface.

At step 1307b, the PSA UPF 110-3 (PSA) may send, to the SMF 160, an N4 session modification response. The PSA UPF 110-3 may become an N3 terminating point and/or the PSA UPF 110-3 may send CN DL tunnel information for the old (intermediate) UPF 110-2 to the SMF 160, for example, if the data forwarding indication is received. The PSA UPF 110-3 may send, to the UPF 110, downlink data. The SMF 160 may start a timer. After or in response to an expiration of the timer, the SMF 160 may release the resource in old intermediate UPF 110-2 (e.g., if applicable).

At step 1308a, the SMF 160 may send, to the old UPF 110-2 (intermediate), an N4 session modification request. The N4 session modification request may comprise, for example, a new UPF 110 address, a new UPF 110 DL tunnel ID, and/or the like. The SMF 160 may send the N4 session modification request message to the old (intermediate) UPF 110-2 and/or provide the DL tunnel information for the buffered DL data, for example, if the service request is triggered by a device other than the wireless device 100 (e.g., in a network such shown in FIG. 1) and/or if the SMF 160 removes the old (intermediate) UPF 110-2. If the SMF 160 allocates a new I-UPF 110, the DL tunnel information may be from the new (intermediate) UPF 110, which may operate as an N3 terminating point. If the SMF 160 does not allocate a new I-UPF 110, the DL tunnel information may be from the new UPF (PSA) 110-3, which may operate as an N3 terminating point. The SMF 160 may start a timer. The SMF 160 may monitor the forwarding tunnel, for example, if the timer is running At step 13008b, the old (intermediate) UPF 110-2 may send, to the SMF 160, an N4 session modification response message.

At step 1309, the old (intermediate) UPF 110-2 may forward its buffered data to the new (intermediate) UPF 110 operating as an N3 terminating point, for example, if the I-UPF 110-2 is relocated and/or if a forwarding tunnel is established to the new I-UPF 110. At step 1310, the old (intermediate) UPF 110-2 may forward its buffered data to the UPF (PSA) 110-3 which may operate as an N3 terminating point, for example, if the old I-UPF 110-2 is removed and the new I-UPF is not assigned for the PDU session and/or if a forwarding tunnel is established to the UPF (PSA) 110-3.

At step 1311, the SMF 160 may send, to the AMF 155, an N11 message (e.g., a Nsmf_PDUSession_UpdateSMContext Response). The N11 message may comprise an N1 SM container (e.g., a PDU session ID and/or a PDU session re-establishment indication), N2 SM information (e.g., a PDU session ID, a QoS profile, CN N3 tunnel information, S-NSSAI), and/or cause information. The SMF may send the N11 message after or in response to receiving an Nsmf_PDUSession_UpdateSMContext Request message comprising cause information (e.g., an establishment of user plane resources). The SMF 160 may determine whether UPF 110 reallocation may be performed, for example, based on the wireless device 100 location information, UPF 110 service area, and/or operator policies.

At step 1311, the SMF 160 may determine N2 SM information, for example, for a PDU session that the SMF 160 may determine to be served by the current UPF 110 (e.g., PDU session anchor or intermediate UPF). The SMF 160 may send a message (e.g., an Nsmf_PDUSession_UpdateSMContext Response) to the AMF 155 to establish the user plane(s). The N2 SM information may comprise information that the AMF 155 may provide to the (R)AN 105. The SMF 160 may reject the activation of UP of the PDU session, for example, if the SMF 160 determines that a PDU session may require a UPF 110 relocation for a PDU session anchor UPF. The SMF 160 may reject the activation of UP of the PDU session, for example, by sending, to the wireless device 100 via the AMF 155, a message (e.g., an Nsmf_PDUSession_UpdateSMContext Response) that may comprise an N1 SM container. The N1 SM container may comprise a corresponding PDU session ID and/or PDU session re-establishment indication.

Upon or after reception of an Namf_EventExposure_Notify message, from the AMF 155 to the SMF 160, comprising an indication that the wireless device 100 is reachable (e.g., if the SMF 160 may have pending DL data), the SMF 160 may invoke an Namf_Communication_N1N2MessageTransfer service operation to the AMF 155 to establish the user plane(s) for the PDU sessions. The SMF 160 may resume sending DL data notifications to the AMF 155 (e.g., if the SMF 160 has DL data).

The SMF 160 may send to a message to the AMF 155 to reject the activation of UP of the PDU session, for example, by including a cause in the Nsmf_PDUSession_UpdateSMContext Response. The SMF 160 may send the message to reject the activation of UP of the PDU session, for example, if the PDU session corresponds to a LADN and/or if the wireless device 100 is outside the area of availability of the LADN. The SMF 160 may send the message to reject the activation of UP of the PDU session, for example, if the AMF 155 notifies the SMF 160 that the wireless device 100 may be reachable for regulatory prioritized service and/or if the PDU session to be activated may not be for a regulatory prioritized service. The SMF 160 may send the message to reject the activation of UP of the PDU session, for example, if the SMF 160 decides to perform PSA UPF 110-3 relocation for the requested PDU session.

At step 1312, the AMF 155 may send, to the (R)AN 105, an N2 request message. The N2 request message may comprise, e.g., N2 SM information received from SMF 160, security context, AMF 155 signaling connection ID, handover restriction list, MM NAS service accept, and/or a list of recommended cells, TAs, and/or NG-RAN node identifiers. The (R)AN 105 may store the security context, AMF 155 signaling connection ID, QoS information for the QoS flows of the PDU sessions that may be activated and N3 tunnel IDs in the wireless device 100 (R)AN 105 context. The MM NAS Service Accept may include PDU session status in the AMF 155. The MM NAS Service Accept may include the PDU session ID and the reason why the user plane resources may not be activated (e.g., LADN not available), for example, if the activation of UP of a PDU Session is be rejected by the SMF 160. Local PDU session release during the session request procedure may be indicated to the wireless device 100 via the session status.

In an example, if there are multiple PDU Sessions that may involve multiple SMFs, the AMF 155 may not wait for responses from all SMFs before it may send N2 SM information to the wireless device 100. The AMF 155 may wait for all responses from the SMFs before it may send MM NAS Service Accept message to the wireless device 100.

The AMF 155 may include at least one N2 SM information from the SMF 160, for example, if the service request procedure is triggered for PDU session user plane activation. The AMF 155 may send additional N2 SM information from SMFs in separate N2 message(s) (e.g., N2 tunnel setup request), if there is any. The AMF 155 may send one N2 request message to the (R)AN 105 after all Nsmf_PDUSession_UpdateSMContext response service operations from all of the SMFs associated with the wireless device 100 are received, for example, if multiple SMFs are involved in the service request procedure. The N2 request message may comprise the N2 SM information received in each of the Nsmf_PDUSession_UpdateSMContext Responses and PDU Session IDs, for example, to enable the AMF 155 to associate responses to a relevant SMF 160.

The AMF 155 may include information from a list in the N2 request, for example, if the (R)AN 105 (e.g., NG-RAN) node may provide the list of recommended cells, TAs, NG-RAN identifiers during the AN release procedure. The RAN 105 may use this information to allocate the (R)AN 105 notification area if the (R)AN 105 determines to enable an RRC inactive state for the wireless device 100. If the AMF 155 receives an indication, from the SMF 160 during a PDU session establishment procedure that the wireless device 100 may be using a PDU session related to latency sensitive services (e.g., for any of the PDU sessions established for the wireless device 100 in which the AMF 155 has received an indication from the wireless device 100 that may support the CM-CONNECTED with RRC Inactive state), then the AMF 155 may include, in the N2 request, the wireless device 100's RRC inactive assistance information. The AMF 155 may include the wireless device's 100 RRC inactive assistance information, for example, based on a network configuration.

At step 1313, the (R)AN 105 may send, to the wireless device 100, a message comprising an indication to perform an RRC connection reconfiguration. The indication to perform an RRC connection reconfiguration may be based on QoS information for one or more or all of the QoS flows of the PDU sessions in which UP connections and data radio bearers may be activated. The user plane security may be established.

The (R)AN 105 may forward an MM NAS service accept to the wireless device 100, for example, if the N2 request comprises the MM NAS service accept message. The wireless device 100 may locally delete context of PDU sessions that may not be available in a network (e.g., a 5GC).

The wireless device 100 may initiate PDU session re-establishment for the PDU session(s) that may be re-established after the service request procedure may be complete, for example, if the N1 SM information is transmitted to the wireless device 100 and indicates that some PDU session(s) may be re-established. After the user plane radio resources may be setup, the uplink data from the wireless device 100 may be forwarded to the (R)AN 105. The (R)AN 105 (e.g., NG-RAN) may send the uplink data to the UPF address and tunnel ID provided. For example, the (R)AN 105 may send the uplink data to the AMF 155, which may then send the uplink data to PSA UPF 110-3. The AMF 155 mat send the uplink data to the PSA UPF 110-3 via the UPF 110.

In FIG. 13B, at step 1314, the (R)AN 105 may send, to the AMF 155, an N2 request acknowledgement (e.g., N2 SM information). The (R)AN 105 may send the N2 request acknowledgement after or in response to receiving the N2 request (e.g., at step 1312). The N2 request acknowledgement may comprise AN tunnel information, a list of accepted QoS flows for the PDU sessions for which UP connections are activated, and/or a list of rejected QoS flows for the PDU sessions for which UP connections are activated. The N2 request message (e.g., at step 1312) may comprise N2 SM information, such as AN tunnel information. The (R)AN 105 may respond to the N2 SM information with a separate N2 message (e.g., an N2 tunnel setup response). The N2 request acknowledgement may include multiple N2 SM information and/or information to enable the AMF 155 to associate the responses to a relevant SMF 160, for example, if multiple N2 SM information is included in the N2 request message.

At step 1315, the AMF 155 may send, to the SMF 160, a request message (e.g., Nsmf_PDUSession_UpdateSMContext Request). The request message may comprise N2 SM information (e.g., AN tunnel information), RAT type) per PDU session. The AMF 155 may forward N2 SM information to the relevant SMF 160, for example, if the AMF 155 receives N2 SM information (e.g., one or multiple) from the (R)AN 105. The AMF 155 may include the wireless device 100 time zone IE in the request message (e.g., Nsmf_PDUSession_UpdateSMContext Request), for example, if the wireless device 100 time zone has changed relative to the last reported wireless device 100 time zone.

At step 1316a, the SMF 160 may initiate a notification about new location information to the PCF 135 (if subscribed) by invoking an event exposure notification operation (e.g., an Nsmf_EventExposure_Notify service operation), for example, if a dynamic PCC is deployed. At step 1316b, the PCF 135 may provide updated policies to the SMF 160 by invoking a policy control update notification message (e.g., an Npcf_SMPolicyControl_UpdateNotify operation).

At step 1317a, if the SMF 160 selects a new UPF 110 to act as intermediate UPF 110 for the PDU session, the SMF 160 may initiate an N4 session modification procedure by sending, to the new I-UPF 110-1, an N4 session modification request. The N4 session modification request may comprise AN tunnel information. At step 1317b, the new I-UPF 110-1 may respond to the N4 session modification request by sending, to the SMF 160, an N4 session modification response. The new I-UPF 110-1 may forward, to the (R)AN 105 and the wireless device 100, downlink data.

At step 1318a, the SMF 160 may send, to the PSA UPF 110-3, an N4 session modification request. At step 1318b, the PSA UPF 110-3 may send, to the SMF 160, an N4 session modification response. The PSA UPF 110-3 may send, to the (R)AN 105 and/or to the wireless device 100, downlink data. At step 1319, the SMF 160 may send, to the AMF 155, a response message (e.g., an Nsmf_PDUSession_UpdateSMContext Response).

At step 1320a, the SMF 160 may send, to the new (intermediate) I-UPF 110-1, a modification request message (e.g., an N4 session modification request), for example, if a forwarding tunnel is established to the new (intermediate) I-UPF 110-1 and/or if a timer that they SMF 160 set for the forwarding tunnel has expired. The new (intermediate) I-UPF 110-1 may operate as an N3 terminating point to release the forwarding tunnel. At step 1321a, the SMF 160 may send, to the PSA UPF 110-3, a modification request message (e.g., an N4 session modification request). At step 1321b, the PSA UPF 110-3 may send, to the SMF 160, a response message (e.g., an N4 session modification response).

At step 1322*a*, the SMF 160 may send, to the old UPF 110-2, a modification message and/or a release message (e.g., an N4 session modification request and/or an N4 session release request). The SMF 160 may send a modification message (e.g., an N4 session modification request) that may comprise AN tunnel information, for example, if the SMF 160 continues using the old UPF 110-2. The SMF 160 may initiate a resource release (e.g., if a timer expires) by sending a release message (e.g., an N4 session release request) to the old intermediate UPF 110-2, for example, if the SMF 160 selects a new UPF 110 to act as an intermediate UPF 110 and/or if the old UPF 110-2 may not be the PSA UPF 110-3. The release message may comprise release cause information.

At step 1322*b*, the old intermediate UPF 110-2 may send, to the SMF 160, a response message (e.g., an N4 session modification response and/or an N4 session release response). The old UPF 110-2 may acknowledge the message from step 1322*a*, for example, with an N4 session modification response and/or an N4 session release response message to confirm the modification and/or release of resources. The AMF 155 may invoke a service operation (e.g., Namf_EventExposure_Notify service operation) to notify the mobility related events after the service request procedure is complete. The AMF 155 may send one or more messages towards the NFs that may have subscribed for the events. The AMF 155 may invoke the Namf_EventExposure_Notify towards the SMF 160, for example: if the SMF 160 had subscribed for the wireless device 100 moving into or out of an area of interest and the wireless device's 100 current location indicates that it may be moving into or moving outside of the area of interest subscribed; if the SMF 160 had subscribed for LADN DNN and the wireless device 100 may be moving into or outside of an area where the LADN is available; if the wireless device 100 is in MICO mode and the AMF 155 notifies or previously notified an SMF 160 of the wireless device 100 being unreachable such that the SMF 160 may not send DL data notifications to the AMF 155; and/or if the SMF 160 had subscribed for wireless device 100 reachability status such that the AMF 155 may provide a notification of the wireless device 100 reachability.

If a wireless device 100 triggered service request procedure (such as shown in FIGS. 8A, 8B, 13A, and 13B) may be in progress, a current and/or new wireless device 100 triggered service request procedure may cause unnecessary data notification messages, which may increase a load of the AMF 155. Data notifications (e.g., downlink data notifications) may occur if sending uplink data by the wireless device 100 may cause arrival of data (e.g., downlink data) after or in response to the uplink data that may arrive at the UPF 110 (e.g., before arrival of an N4 session modification request indicating that the data may be sent from the UPF 110 to the (R)AN 105 and the wireless device 100). The AMF 155 may not send a paging message to the wireless device 100, for example, if the AMF 155 receives a data notification or a packet notification from the SMF 160, for example, during the wireless device triggered service request procedure and/or before the establishment of the downlink user plane (e.g., UP connectivity). The AMF 155 may monitor (e.g., across all of the wireless devices served by the AMF 155) a first rate at which data notifications may arrive. If the first rate may become significant (e.g., as configured by an operator) and/or if the load at the AMF 155 exceeds a threshold or a configured value (e.g., an operator configured value), the AMF 155 may request to delay sending data notifications (e.g., by sending a packet notification delay request, a delay downlink data notification message, a delay downlink packet notification message, and/or the like). The request may be processed at the SMF 160 and/or at the UPF 110. The AMF 155 may indicate, to the SMF 160, a request to delay data notification based on a value and/or for a time duration of a first delay duration parameter (e.g., the value of the first delay duration parameter may be given as an integer multiple of 50 milliseconds such as 100 milliseconds, 150 milliseconds, zero, or by any other value). The SMF 160 and/or the UPF 110 may use the value of the first delay duration parameter to delay in between receiving (downlink) data and sending the (downlink) data notification message. The AMF 155 may update the value of the first delay duration parameter (e.g., the first rate of data notification arrivals may be monitored every 60 seconds or other duration and the value of the first delay duration parameter may be determined by the AMF 155). The AMF 155 may use an N11 message (e.g., Nsmf_PDUSession_UpdateSMContext Request message), and/or the like, of the wireless device 100 initiated service request procedure to indicate delaying (downlink) data notification request to send the first delay duration parameter to the SMF 160.

To determine the amount of delay requested by a given AMF 155, the SMF 160 may use the last N11 message (e.g., Nsmf_PDUSession_UpdateSMContext Request message) which may be part of the service request procedure, and/or the SMF 160 may use one of the N11 messages (e.g., Nsmf_PDUSession_UpdateSMContext Request messages) of a service request received within the preceding t time units (e.g., t may be 30 seconds or any other value). The AMF 155 may determine the value for the first delay duration parameter, for example, by adaptively increasing the value if a rate of data notification arrival at the AMF 155 is high (e.g., above a threshold value) and/or decreasing the value if the rate of data notification arrival at the AMF 155 is low (e.g., below a threshold value). The AMF 155 may monitor and/or measure the average time from the reception of the unnecessary (downlink) data notification to the reception of the N11 request message or an N11 response from the SMF 160 in the same wireless device 100 triggered service request procedure. The value of the first delay duration parameter may be determined from a measured average, for example, by adding a safety margin.

The SMF 160 and/or the UPF 110 may (e.g., for wireless devices of the AMF 155) buffer the (downlink) data for a period that may be determined by a timer based on the first delay duration parameter, for example, if the SMF 160 and/or the UPF 110 determines from the last N11 message and/or N4 session modification request (which may be part of the service request procedure) that the AMF 155 may request delaying of the (downlink) data notification by the value of the first delay duration parameter. If the DL-TEID and (R)AN 105 (e.g., a gNB) address for the wireless device 100 is received before the expiry of the timer, the timer may be cancelled, and the network triggered service request procedure may be finished without sending the (downlink) data notification message to the AMF 155 (e.g., (downlink) data may be sent to the wireless device 100). If the timer expires, the (downlink) data notification message may be sent to the AMF 155 after or in response to expiry of the timer.

A wireless device may request services associated with one or more network slices. The wireless device may initiate a session request procedure to request such services. The one or more network slices may comprise an isolated network slice in addition to a network slice that may not be an isolated network slice. A session request may comprise a network slice isolation information parameter. Based on the network slice isolation information parameter, a UPF may be selected that may provide the requested services. An SMF may select the UPF, for example, based on a list of candidate UPFs. An SMF may send, to an NRF, a discovery request comprising the network slice isolation information parameter. One or more UPFs may register with the NRF. The NRF may select and identify a UPF for the SMF. The session request may be in a first network slice and the selected UPF may be in a second network slice. By including the network slice isolation information parameter in the session request and using the parameter to select a UPF, resources may be shared between network slices and isolation requirements may be satisfied and/or may not be violated.

An access and mobility management function (AMF) may send, to a session management function (SMF), a first message indicating a request to establish a packet data unit (PDU) session and comprising a network slice isolation information parameter. The first message may further comprise an identifier of the PDU session, an identifier of a wireless device associated with the PDU session, and/or a network slice identifier of the PDU session. The SMF may receive the first message. The SMF may determine whether a user plane function (UPF) may be required for the PDU session. The SMF may send, to a network repository function (NRF) and based on a determination that a UPF is required for the PDU session, a second message comprising: the network slice isolation information parameter, and/or a network slice identifier of the PDU session. The NRF may receive the second message. The NRF may select, based on the network slice isolation information parameter and/or the network slice identifier of the PDU session, a UPF (e.g., a selected UPF and/or a first UPF). The NRF may receive, from one or more UPFs (e.g., the selected UPF), a registration request message comprising a single network slice selection assistance information (S-NSSAI) associated with the one or more UPFs, and/or an identifier of the one or more UPFs. The NRF may receive, from the one or more UPFs (e.g., the selected UPF and/or the first UPF) a domain name of the one or more UPFs, a data network name, and/or an address of the one or more UPFs. Additionally or alternatively, the SMF may send, to a unified data management (UDM) or any other device, and based on a determination that a UPF is required for the PDU session, a message comprising the network slice isolation information parameter and/or a network slice identifier of the PDU session. The NRF may send, to the UDM, a message comprising the network slice information and/or the network slice identifier of the PDU session. The NRF may receive, from the UDM and based on the message to the UDM, a message comprising subscriber data (e.g., for the wireless device associated with the PDU session). The NRF may send, to the SMF and based on the second message, a third message comprising an identifier of the selected UPF. The SMF may receive the third message. The UDM or other device may send, to the SMF and based on the message from the SMF, a message comprising subscriber data (e.g., for the wireless device associated with the PDU session) and/or the network slice isolation parameter. The NRF, UDM, SMF, and/or another device may select a UPF for the PDU session. The SMF may select for the PDU session a UPF, for example, if the SMF does not receive a selected UPF from the NRF, UDM, and/or another device. The SMF may determine, based on the network slice isolation parameter, a UPF selection rule. The UPF selection rule may comprise an isolation policy comprising at least one of a logical full isolation of network slices, a physical full isolation of the network slices, and/or network functions that are allowed to be shared among the network slices. The UPF selection rule may be based on a network slice coexistence constraint. The SMF may select the UPF, for example, based on the subscriber data, the UPF selection rule, and/or a list of one or more candidate UPFs (e.g., which may be stored at the SMF and/or received in one or more messages from the NRF, UDM, or another device). The selected UPF may be associated with the network slice identifier of the PDU session. The SMF may send, to the selected UPF, a fourth message comprising a request to establish the PDU session. The fourth message may comprise an N4 PDU session establishment request. The UPF may send, to the SMF, a fifth message comprising a response to the request to establish the PDU session. The SMF may receive the fifth message. The PDU session may be established with a wireless device such that the wireless device may use resources of an isolated network slice. The wireless device may send uplink data. The wireless device may receive downlink data. A computing device may comprise: one or more processors, and memory storing instructions that, when executed, cause the computing device to perform one or more of the above steps. A system may comprise: a first computing device configured to perform one or more of the above steps, a second computing device configured to send the first message, and/or one or more additional computing devices configured to perform one or more of the above steps. A computer-readable medium may store instructions that, when executed, cause the performance of one or more of the above steps.

UPF selection procedures may be enhanced by considering the SMF, UPF connectivity, and/or topology that may allow one UPF to be shared among more than one SMFs. UPF selection criteria may be enhanced by taking into account the constraints pertaining to resource isolation, network isolation, and/or network slice coexistence and isolation. UPF discovery may be enhanced based on various aspects of resource isolation requirements such as network slice isolation. Selection of a UPF that violates a rule of isolation and/or coexistence constraints may cause service interruptions and excessive signaling.

UPF selection based on network slice isolation information parameters may provide a variety of advantages. Examples such as security, emergency, differentiated service levels, and the like may be enhanced by UPF selection based on network slice isolation information parameters. One or more users associated with a particular group (e.g., security, emergency, corporation, law enforcement, etc.) may have a first type of access within a first area (e.g., at an office, in a secure location, within a registered vehicle, etc.) and/or during a first period of time (e.g., on duty, during regular working hours, etc.). The one or more users may have a second type of access within a second area (e.g., unauthorized areas, public areas, etc.) or during a second period of time (e.g., off duty, during evening and/or weekend hours, etc.). One or more first network slices may be restricted to the first area and/or the first period of time. One or more second network slices may be restricted to the second area, allowed except in the first area, restricted to the second period of time, and/or allowed except during the first period of time. The first type of access may be limited to use by authorized persons, in an authorized location, and/or during an authorized time. If a first user requests service of the first type of access, by providing a network slice isolation information parameter that may be associated with the first type of access, network resources may be allocated to enable access by the first user. If a second user requests service of the first type of access but does not provide a network slice isolation information parameter that may be associated with the first type of access, the second user may be restricted from accessing resources associated with the first type of access. The second user may be allocated resources that are associated with the second type of access rather than the first type of access. Any number of types of access (e.g., classes) may be used. Each type of access may be associated with a particular S-NSSAI. Each type of access may be associated a particular service. As another example, a third user (e.g., security officer) that is within the first area (e.g., a secure facility) during the first period of time (e.g., on duty) may be able to access a first network slice for secure communications within the first area. If the third user exits the first area (e.g., outside of a secure facility) and/or requests services outside the first period of time (e.g., off duty), the third user may not be able to access the first network slice (e.g., may not be able to access secure communications) but may be able to access non-secure communications outside the first area and/or outside the first period of time. If network slice isolation information parameters are not used for a service request, a UPF may be selected that may violate a security requirement, privacy setting, or other rule, for example, such that a user may not be able to access a network slice for requested service and/or such that resources may be allocated in an inefficient manner. By using network slice isolation information parameters, network resources may be allocated such that network slices configured for certain types of services may be properly allocated to those services to improve efficiency of resources, increase security of certain communications, provide varied service levels, and/or the like. Isolation constraints may be based on internal regulation (e.g., of a subscriber, of an employer, of an operator, and/or the like). For an example, it might be forbidden for a wireless device to access a regular service and a set of specific services simultaneously, such that a wireless device used by a government officer or other position or group might be restricted to be either in off-duty (e.g., regular) or on-duty (e.g., specific) mode. It may be forbidden (e.g., by regulation or rule) for the wireless device to access simultaneously the off-duty services and the on-duty services. The isolation constraints may be based on one or more network capabilities. For an example, a factory device may have multiple modes of operations, such as maintenance mode (e.g., which may be used to perform updates, blueprints upload, check the status of devices, monitoring and maintenance, and/or the like) and a lower latency factory mode in which the device may receive ultra-reliable low-latency communications (URLLC) related commands to perform a particular duty. One or more network function instance used for the URLLC factory slice may be tailored specifically to a particular duty and/or may not be able to support other services such as file database access, and/or the like. A wireless device may be required to select a single mode, as opposed to a plurality of modes simultaneously, or a set or subset of a plurality of modes.

An isolated network slice, may be supported based on one or more of the following considerations: isolation and/or coexistence requirements may be set by the wireless device 100 and/or a network such as shown in FIG. 1 (e.g., based on policy and/or subscription information); implementation of an isolated network slice based on the SMF 160 and/or UPF 110 topology that may consider a certain UPF that may be shared among more than one SMFs; and/or selection of a proper UPF 110 for an isolated network slice. Enhancements for network slices may provide: improved implementations of an isolated network slice; selection of a proper UPF 110 for different types (e.g., category, level) of an isolated network slice; and/or determination of the proper UPF 110 based on one or more isolation and/or coexistence policies and/or requirements.

The wireless device 100 may request fully isolated network slice(s) and/or partially isolated network slices, for example, if performing a service request procedure, a PDU session establishment procedure, and/or the like. For a PDU session establishment procedure, the wireless device 100 may send, to the AMF 155, a NAS message (and/or an SM NAS message) comprising one or more of: a network isolation information parameter, NSSAI, S-NSSAI (e.g., requested S-NSSAI, allowed S-NSSAI, subscribed S-NSSAI, and/or the like), DNN, PDU session ID, request type, old PDU session ID, N1 SM container (e.g., PDU session establishment request), and/or the like. The wireless device 100 may establish a new PDU session, for example, by generating a new PDU session ID. If emergency service may be required and an emergency PDU session is not already be established, the wireless device 100 may initiate the wireless device requested PDU session establishment procedure with a request type indicating an emergency request (e.g., Emergency Request). In an example, the wireless device 100 may initiate the wireless device requested PDU session establishment procedure by sending the NAS message comprising a PDU session establishment request within an N1 SM container. The PDU session establishment request may comprise, for example, a PDU type, SSC mode, protocol configuration options, and/or the like. A request type may indicate an initial request, for example, if the PDU session establishment is a request to establish the new PDU session. A request type may indicate an existing PDU session, for example, if the request refers to an existing PDU session between 3GPP access and non-3GPP access, and/or if the request refers to an existing PDN connection in EPC. The request type may indicate an emergency request, for example, if the PDU session establishment is a request to establish a PDU session for emergency services. The request type may indicate an existing emergency PDU session, for example, if the request refers to an existing PDU session for emergency services between 3GPP access and non-3GPP access. The NAS message sent by the wireless device may be encapsulated by the AN in an N2 message towards the AMF that may comprise user location information and/or access technology type Information. The PDU session establishment request message may comprise an SM PDU DN request container comprising information for the PDU session authorization by an external DN. The wireless device may include the old PDU session ID (which may indicate the PDU session ID of the on-going PDU session that is to be released) in the NAS message, for example, if the procedure may be triggered for an SSC mode 3 operation. The old PDU session ID may be an optional parameter. The AMF 155 may receive, from the AN, the NAS message (e.g., NAS SM message) together with user location information (e.g., cell identifier such as for the (R)AN 105). The wireless device may not trigger a PDU session establishment for a PDU session corresponding to a LADN if the wireless device is outside the area of availability of the LADN.

The AMF 155 may determine that the NAS message or the SM NAS message may correspond to the request for the new PDU session, for example, based on a request type indicating an initial request and/or a determination that the PDU session ID may not be used for any existing PDU session(s) of the wireless device 100. If the NAS message does not contain an S-NSSAI, the AMF 155 may determine a default S-NSSAI for the requested PDU session. The AMF 155 may determine a default S-NSSAI based on the wireless device subscription (e.g., if it comprises a default S-NSSAI) and/or one or more operator policies. The AMF 155 may select an SMF 160. The AMF 155 may store an association of the S-NSSAI, the PDU session ID, and/or an SMF ID, for example, if the request type indicates an initial request and/or if the request may be due to a handover from an EPS. The AMF 155 may select the SMF 160 and may store an association of the new PDU session ID and the selected SMF ID, for example, if the request type is an initial request and/or if the old PDU session ID indicates the existing PDU session may be contained in the message (e.g., NAS message).

Figure 14:
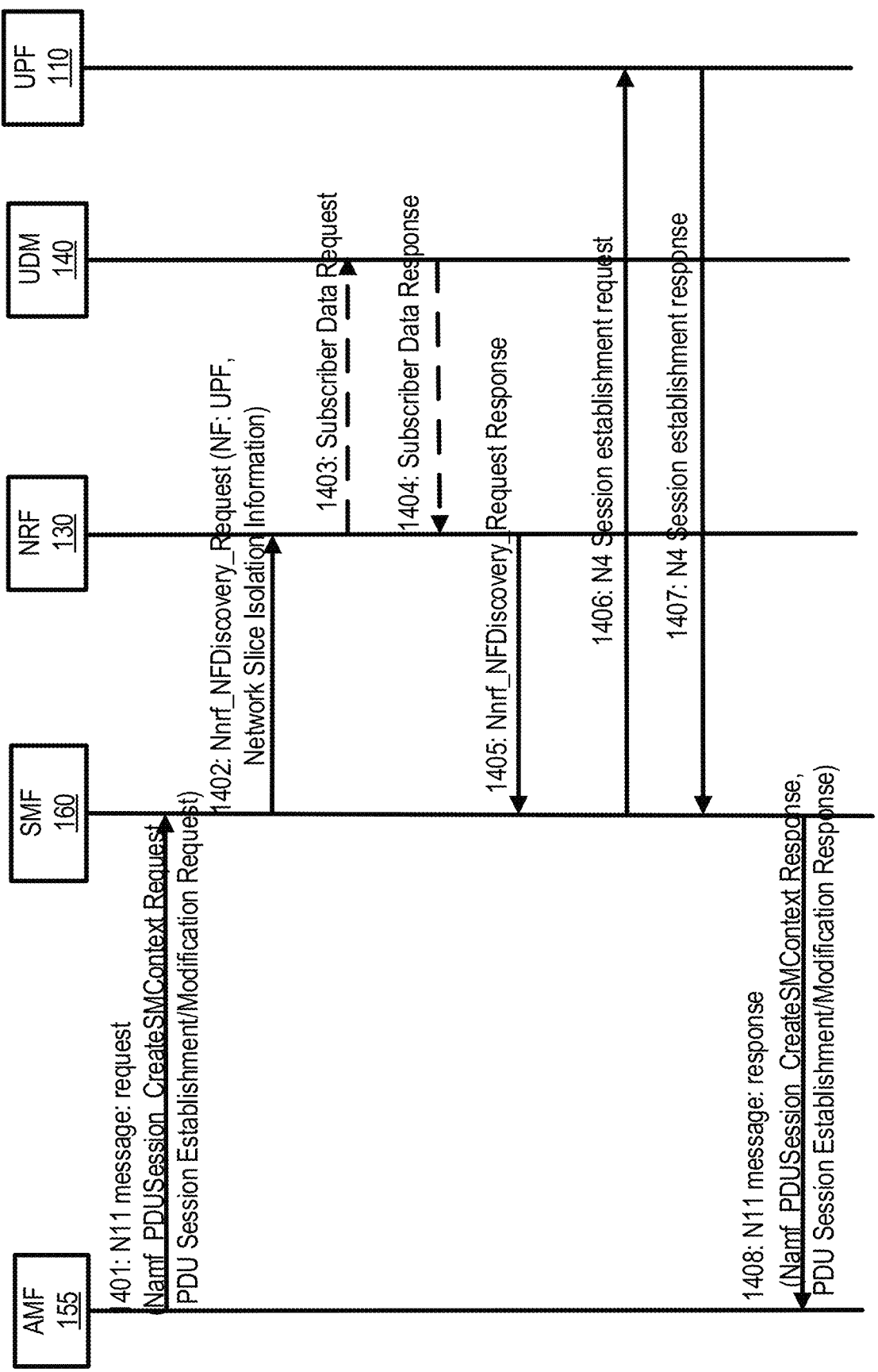
FIG. 14 shows an example method for establishing an isolated network slice.
Figure 15:
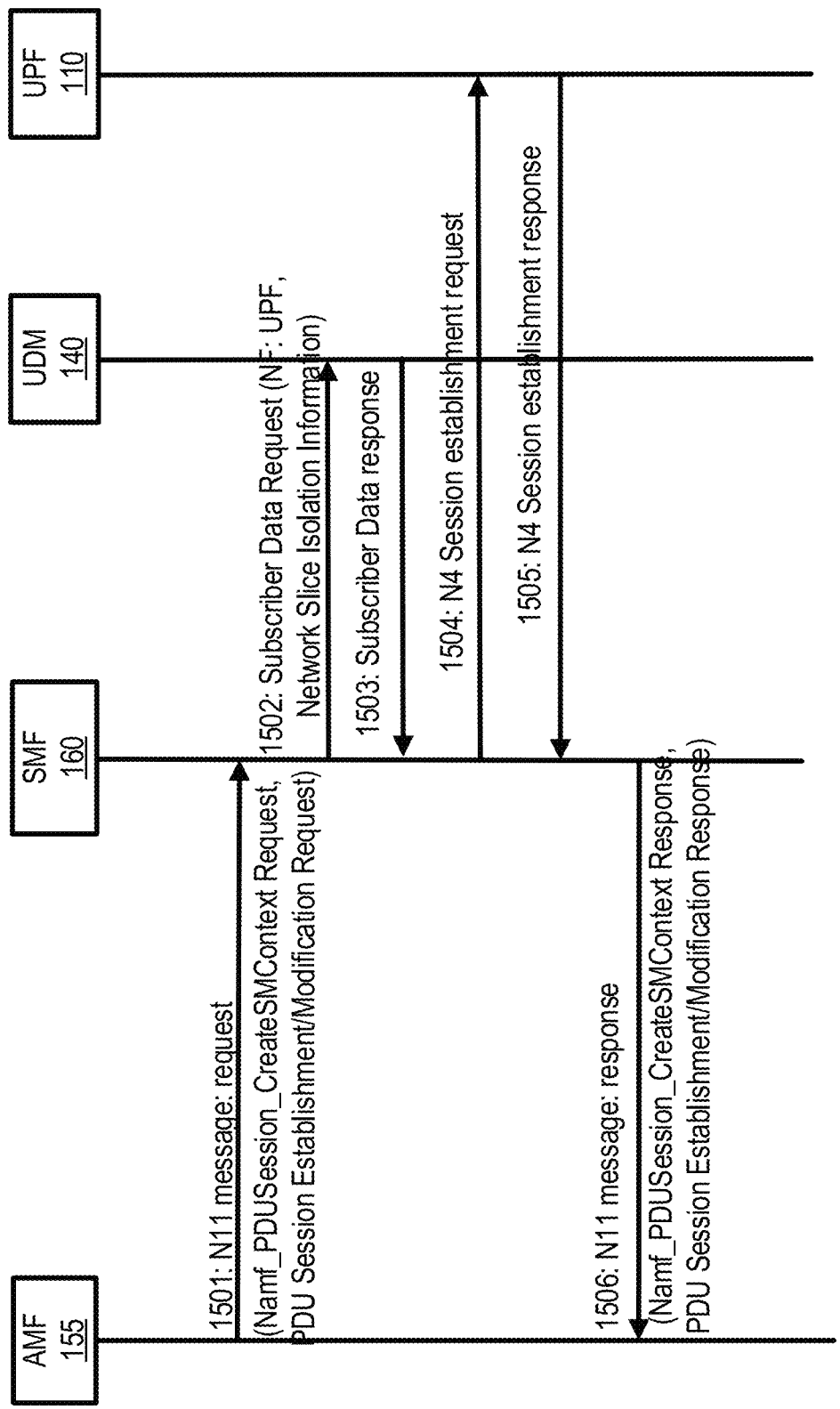
FIG. 15 shows an example method for establishing an isolated network slice.

FIG. 14 and FIG. 15 show example methods for establishing an isolated network slice. At step 1401 and at step 1501, the AMF 155 may send, to the SMF 160, a message such as an N11 message (e.g., Nsmf_PDUSession_CreateSMContext Request, Nsmf_PDUSession_UpdateSMContext Request, and/or PDU session establishment and/or modification request). The message may indicate a session creation and/or modification message. The message may comprise a network isolation information parameter, a type name of a network function, and/or the like. An N11 message such as an Nsmf_PDUSession_CreateSMContext Request message may comprise one or more of: a SUPI and/or PEI, a DNN, an S-NSSAI, a PDU session ID, an AMF ID, a request type, an N1 SM container (e.g., a PDU session establishment request), user location information, an access type, a PEI, a GPSI). An N11 message such as an Nsmf_PDUSession_UpdateSMContext Request may comprise one or more of: a SUPI, a DNN, an S-NSSAI, a PDU session ID, an AMF ID, a request type, and/or an N1 SM container (e.g., a PDU session establishment request and/or a PDU session modification request), user location information, access type, RAT type, and/or PEI). The AMF 155 may invoke the Nsmf_PDUSession_CreateSMContext Request, for example, if the AMF 155 may not have an association with the SMF 160 for the PDU session ID provided by the wireless device 100 (e.g., if request type indicates an initial request). The AMF 155 may invoke the Nsmf_PDUSession_UpdateSMContext Request, for example, if the AMF 155 already has an association with an SMF for the PDU session ID provided by the wireless device 100 (e.g., if request type indicates an existing PDU session). The AMF 155 ID may be the wireless device's 100 GUAMI which may uniquely identify the AMF 155 serving the wireless device 100. The AMF 155 may forward the PDU session ID together with the N1 SM container comprising the PDU session establishment request received from the wireless device 100. The AMF 155 may provide the PEI instead of the SUPI, for example, if the wireless device has registered for emergency services without providing the SUPI. The AMF 155 may indicate that the SUPI has not been authenticated, for example, if the wireless device 100 has registered for emergency services but has not been authenticated.

The SMF 160 may register with the UDM 140, for example, if the request type indicates neither an emergency request nor an existing emergency PDU session, and if the SMF 160 has not yet registered and subscription data may not be available. The SMF 160 may retrieve, from the UDM 140, subscription data and/or subscribers to be notified when subscription data may be modified. The SMF 160 may determine that the request may be due to a handover between 3GPP access and non-3GPP access and/or due to a handover from EPS, for example, if the request type may indicate an existing PDU session or an existing emergency PDU session. The SMF 160 may identify the existing PDU session based on the PDU session ID. The SMF 160 may not create a new SM context. The SMF 160 may update the existing SM context. The SMF 160 may provide the representation of the updated SM context to the AMF 155, for example, in a response to the request. The SMF 160 may determine and/or identify an existing PDU session to be released based on an old PDU session ID, for example, if the request type indicates an initial request and/or if the old PDU session ID is to be included in the request (e.g., Nsmf_PDUSession_CreateSMContext Request).

At step 1408 and at step 1506, the SMF 160 may send, to the AMF 155, an N11 message response (e.g., Nsmf_PDUSession_CreateSMContext Response, Nsmf_PDUSession_UpdateSMContext Response, and/or PDU session establishment and/or modification response). An N11 message such as an Nsmf_PDUSession_CreateSMContext Response may comprise one or more of: an indication of a cause, an SM context ID, and/or an N1 SM container (e.g., a PDU session reject (which may comprise an indication of a cause).

The SMF 160 may select a UPF 110 and/or trigger a PDU session establishment authentication and/or authorization, for example, if the SMF 160 is required to perform secondary authorization and/or authentication during the establishment of the PDU session by a DN-AAA server. The SMF 160 may select an SSC mode for the PDU session, for example, if the request type indicates an initial request. The SMF 160 may select one or more UPFs as needed. The SMF 160 may allocate an IP address and/or prefix for the PDU session, for example, if the PDU type is IPv4 and/or IPv6. The SMF 160 may allocate an interface identifier to the wireless device 100 for the wireless device 100 to build its link-local address, for example if the PDU type is IPv6. The SMF 160 may allocate an IPv6 prefix for the PDU session and an N6 point-to-point tunneling (based on UDP/IPv6), for example, if the PDU type is an unstructured PDU type.

Selection of the UPF 110 may be performed locally by the SMF (such as shown in FIG. 15), or assisted by the NRF 130 (such as shown in FIG. 14). The selection of a proper UPF 110 may require consideration of isolation and/or coexistence requirements requested by the wireless device 100 and/or determined by a network such as shown in FIG. 1 (e.g., determined by the AMF 155 based on one or more of subscription information, an operator policy, and/or the like).

The isolation may comprise one or more of a topological isolation (e.g., logical, or physical), a functional isolation, a physical resource isolation, and/or a transactional isolation. A degree of isolation may be determined based on one or more of a logical and/or physical full isolation and/or a partial isolation, and/or a number and/or a type of network functions that may be allowed to be shared among network slices. The degree of isolation may be part of a selection rule for selecting the proper UPF 110.

At step 1401 in FIG. 14, the SMF 160 may receive, from the AMF 155, the message (e.g., N11 message) such as described above. The message may comprise an indication indicating a first session creation request (or a session modification request) message for the wireless device 100. After or in response to receiving the first session creation request (or the session modification request) message by the SMF 160, from the AMF 155, the SMF 160 may send, at step 1402, to the NRF 130, a first message indicating that discovery of a network function may be required. The network function may be a user plane network function (e.g., the UPF 110, a user plane function for CIoT, a user plane function for vehicular applications, NB-IoT, and/or the like), the UPF 110, and/or the like. The first message may comprise the network isolation information parameter, a type name of the network function, a name (e.g., identifier) of the network function, a name (e.g., identifier) of the SMF 160, at least one S-NSSAI associated with at least one network slice, a user identity associated with the wireless device 100, an identifier associated with the wireless device 100, at least one DNN, a PLMN identifier (of the network function), and/or the like. The first message may comprise an Nnrf_NFDiscovery_Request message. The Nnrf_NFDiscovery_Request message may be part of an NRF service discovery service such as an Nnrf_NFDiscovery service. The NRF service discovery service may enable the SMF 160 to discover a set of network functions, NF instances (e.g., with specific NF service), or a target NF type (e.g., the user plane function, the UPF 110, and/or the like), and/or enable the SMF 160 to discover a specific NF service. The Nnrf_NFDiscovery_Request message may comprise a target NF service name, NF type of the target NF, NF type of the NF service user (e.g., the SMF 160), and/or the like.

The NRF 130 may select a user plane function (e.g., the UPF 110) based on one or more elements of the first message and/or a network isolation information parameter. The network isolation information parameter may be used to determine a selection rule for the user plane function (e.g., the UPF 110). The selection rule may comprise the degree of isolation, type of isolation, and/or the like.

The NRF 130 may query the UDM 140 for a selection of the UPF. At step 1403, the NRF 130 may send, to the UDM 140, a subscriber data request message. The UDM 140 may determine information for a selection of the UPF. At step 1404, the UDM 140 may send, to the NRF 130, a subscriber data response message. The subscriber data response message may comprise an indication for the selection of the UPF, an identifier of the UPF, subscriber policy information to determine a selection rule that may be based on, for example, location, existing PDU sessions of the wireless device 100, network slices associated with the wireless device 100, and/or the like. The UDM 140 may support storing data in a unified data layer that may comprise user subscription data, policy data (e.g., per wireless device related policy data, and/or per application related policy data), network data (e.g., wireless device traffic reports from UP NFs, and/or the NF topology information in user plane for UP NF discovery and selection), service information (e.g., the user location information and/or UP anchor information used for handover between different access networks), and/or the like. The NF topology information may comprise network nodes hosting UP NFs (e.g., the UPF 110), and/or logical links connecting network nodes. Attributes of network nodes may comprise resources reserved for UP NFs, such as input and output ports, and/or processing capabilities (e.g., throughput and/or number of supported wireless devices and/or PDU sessions). Attributes of logical links may comprise, for example, link capacity limit(s). The UPF 110 topology may comprise attributes of logical links connecting network nodes such as link capacity limit, attributes of connected network nodes such as input and/or output ports and processing capabilities, and/or the like. UPF 110 topology may be used for UPF 110 selection and/or reselection based on constraints of the network isolation information parameter. The constraints may be associated with a subscription based policy, a topological isolation (logical, or physical) constraint, a functional isolation, a physical resource isolation, a transactional isolation constraint, and/or the like. A degree of isolation may be determined based on one or more of a logical and/or physical full isolation and/or partial isolation, and/or a number and/or type of network functions that may be allowed to be shared among network slices.

At step 1405, the SMF 160 may receive, from the NRF 130, a second message. The second message may comprise a network function identifier and/or an IP address of the UPF 110, and/or the like. The network function identifier may be a fully qualified domain name (FQDN) of the user plane function (e.g., the UPF 110). The second message may comprise an Nnrf_NFDiscovery_Response message. The Nnrf_NFDiscovery_Response message may comprise part of a NRF service discovery service (e.g., an Nnrf_NFDiscovery service). The NRF service discovery service may enable the SMF 160 to discover a set of network functions, NF instances with specific NF service, and/or a target NF type (e.g., the user plane function, the UPF 110, and/or the like), and/or may enable the SMF 160 to discover a specific NF service. The Nnrf_NFDiscovery_Response message may comprise FQDN and/or IP address(es) for the target service name (e.g., the UPF 110). FQDN and IP addresses may belong to a set of requested target NF instance(s), or NF service instance(s).

UPF 110 selection by the SMF 160 may utilize the NRF 130 to discover the UPF instance(s). The SMF 160 may send a discovery request (e.g., at step 1402) that may include the network isolation information parameter, DNN, S-NSSAI, DNAI, connectivity requirements (e.g., N3 and/or intra or inter PLMN N9 and/or N6). After or in response to receiving the discovery request, the NRF 130 may respond to the SMF 160 with the IP address and/or the FQDN of corresponding UPF 110 instance(s) (e.g., at step 1405). The NRF 130 may provide the SMF 160 with information to assist UPF 110 selection (e.g., including UPF 110 location, UPF 110 capacity, and UPF 110 optional functionalities and capabilities, and/or the like). The SMF 160 may select the UPF 110 based on the network isolation information parameter. The SMF 160 may determine a network function identifier and/or the IP address(es) of the UPF 110.

At step 1406, after or in response to receiving the second message and/or selecting/determining the UPF 110 by the SMF 160, the SMF 160 may send, to the UPF 110 as the selected user plane network function, a session establishment and/or modification message (e.g., an N4 session establishment and/or modification). The SMF 160 may send an N4 session establishment and/or modification request based on a network function identifier and/or IP address(es) of the UPF 110. The network isolation information parameter may be a factor used to determine a selection rule based on a degree of isolation. The session establishment and/or modification may be part of N4 session management procedures that may be used to control the functionality of the UPF 110. The SMF 160 may create, update, and/or remove an N4 session context in the UPF 110. The N4 session establishment procedure may be used to create the initial N4 session context for a PDU session at the UPF 110. The SMF 160 may assign a new N4 session ID and may provide the new N4 session ID to the UPF 110. The N4 session ID may be stored by both entities and/or may be used to identify the N4 session context during their interaction. The SMF 160 may store the relation between the N4 session ID and PDU session for the wireless device 100.

The N4 session modification procedure may be used to update the N4 session context of an existing PDU session at the UPF 110, which may be executed between the SMF 160 and the UPF 110 if PDU session related parameters are modified. As part of the service request procedure and/or PDU session establishment, if the SMF 160 selects the UPF 110 (e.g., to act as intermediate UPF) for the PDU session, and/or if the SMF 160 determines to insert an intermediate UPF 110 for a PDU session which did not have an intermediate UPF, the N4 session establishment request message may be sent to the UPF 110 (e.g., at step 1406). The N4 session establishment request may comprise one or more of: packet detection, data forwarding, and/or enforcement and/or reporting rules for the UPF 110.

At step 1407, the UPF 110 may send, to the SMF 160, a response message (e.g., an N4 session establishment response message). If UPF 110 allocates CN tunnel information, the UPF 110 may provide DL CN tunnel information for the UPF 110 that may operate as a PDU session anchor and UL CN tunnel information (e.g., CN N3 tunnel information) to the SMF 160. At step 1408, the SMF 160 may send, to the AMF 155, an N11 message response such as described above.

The network slice isolation information parameter may be used to evaluate UPF 110 candidates, for example, based on the at least one S-NSSAI of at least one network slice. The network slice isolation information parameter may comprise one or more constraints for S-NSSAIs. The one or more constraints for S-NSSAIs may be associated with one or more classes of S-NSSAIs (e.g., mutual exclusion class information). Each S-NSSAI may be associated with a class. The S-NSSAI of the at least one S-NSSAI may be one of the requested S-NSSAI, the subscription S-NSSAI, and/or allowed S-NSSAI. An allowed NSSAI may comprise one or more S-NSSAIs corresponding to one or more network slices and/or network slice instances to which the wireless device 100 may be allowed to access. The requested NSSAI may comprise one or more S-NSSAIs corresponding to one or more network slices or network slice instances to which the wireless device 100 may register. The S-NSSAI may be one of the allowed S-NSSAIs. The wireless device 100 may comprise network slice isolation information applied to the S-NSSAI. Subscribed NSSAI and/or subscribed NSSAI related network slice instance(s) may comprise one or more S-NSSAIs corresponding to one or more network slices and/or network slice instances to which the wireless device 100 may be subscribed. Subscribed network slice isolation information may comprise one or more network slice isolation type and/or level applied to the subscribed NSSAI and/or the subscribed NSSAI related network slice instance(s).

FIG. 15 shows an example method in which the SMF 160 may interact with the UDM 140 for selection of the UPF 110. The selection and/or reselection of the UPF 110 may be performed by the UDM 140. The UDM 140 may consider UPF 110 deployment scenarios such as slice isolation constraints, slice coexistence constraints, logical topology, physical topology, UPF location (e.g., centrally located UPF 110 and distributed UPF 110 located close to or at the access network site), and/or the like. At step 1501, the SMF may receive, from the AMF 155 the N11 message such as described above. The N11 message may comprise an indication indicating a first session creation request (or the session modification request) message for the wireless device 100.

At step 1502, after or in response to receiving the first session creation request (or the session modification request) message by the SMF 160, from the AMF 155, the SMF 160 may send, to the UDM 140, a discovery request and/or a subscriber data request. The request may comprise an indication indicating that discovery of a network function may be required. The network function may be a user plane network function (e.g., the UPF, a user plane function for CIoT, a user plane function for vehicular applications, NB-IoT, and/or the like), the UPF 110, and/or the like. The discovery request and/or subscriber data request may comprise the network isolation information parameter, the type name of the network function, the name (e.g., identifier) of the network function, at least one S-NSSAI associated with of at least one network slice, the user identity associated with the wireless device 100, an identifier associated with the wireless device 100, at least one DNN, the PLMN identifier (e.g., of the network function), and/or the like. The UDM 140 may select a user plane function (e.g., the UPF 110) based on the network isolation information parameter, the selection rule, and/or the like.

At step 1503, the UDM 140 may send, to the SMF 160, a subscriber data response message. The subscriber data response message may comprise an indication for the selection of the UPF (e.g., based on one or more network isolation information parameters, slice isolation parameters, and/or the like). The network isolation information parameter, the selection rule, and/or the like may be provided by the UDM 140 (e.g., at step 1503 such as in the subscriber data response message). The SMF 160 may locally select the UPF 110 based on the network isolation information parameter and/or the selection rule received from the UDM 140. The UDM 140 may notify the SMF 160 if the selection rule (or the network isolation information parameter) may change (e.g., upon instantiation of a new UPF 110, isolation policy change, and/or the like).

The SMF 160 may determine the UPF 110, for example, based on the prior information received from the NRF 130, the UDM 140, and or the like. The SMF 160 may determine the UPF 110 based on information in the N11 message (e.g., received at step 1501). The SMF 160 may determine the UPF 110 based on information received in the subscriber data response message (e.g., received at step 1503). The SMF 160 may select the UPF 110 based on local information at the SMF 160. The selection and/or reselection of UPF 110 may require the network isolation information parameter, topology information of one or more (e.g., all) of the UPFs controlled by the SMF 160 that may be known by the SMF 160 if the UPF 110 is available and/or instantiated. UPF topology may be used by the SMF 160 to determine whether the isolation requirements provided and/or derived based on the network isolation information parameter may be met if the UPF 110 is selected. The SMF 160 may evaluate any available information on logical topology, physical topology (e.g., a graph of the UPF/SMF connectivity), and/or the like to evaluate the suitability of each candidate UPF, for example, if selection/reselection of the UPF 110 is triggered. UPF topology may have multiple parameters such as added latency on the links (e.g., N3, N9, and/or N6), added jitter on the links, link capacity and remaining capacity, actual monetary costs (e.g., if resources are rented from a third party), UPF capacity and/or availability, the DNAI(s) to be used in priority (e.g., if several choices are available). UPF 110 selection and/or reselection may occur regularly and/or frequently (e.g., on a periodic or aperiodic basis) by the SMF 160, for example, to determine whether a relocation and/or reallocation of the UPF 110 may be required. The UPF 110 may update the SMF 160, for example, if there may be any change in topology parameters (e.g., logical or physical topology, and/or the like). The SMF 160 may evaluate the UPF 110 to ensure that the isolation requirements are satisfied.

At step 1504, after the SMF 160 selects and/or determines the UPF 110, the SMF 160 may send, to the selected user plane network function (e.g., UPF 110) a second session creation message. The second session creation message may comprise, for example, a session establishment and/or modification message, an N4 session establishment and/or modification, and/or the like. The second session creation message (e.g., the session establishment and/or modification) may be part of the N4 session management procedures that may be used to control the functionality of the UPF 110. The SMF 160 may create, update, and/or remove the N4 session context in the UPF 110. The N4 session establishment procedure may be used to create the initial N4 session context for the PDU session at the UPF 110. The SMF 160 may assign a new N4 session ID. The SMF 160 may provide the new N4 session ID to the UPF 110. The N4 session ID may be stored by the SMF 160 and/or the UPF 110. The N4 session ID may be used to identify the N4 session context during an interaction between the SMF 160 and the UPF 110. The SMF 160 may store the relation between the N4 session ID and the PDU session for the wireless device 100.

The N4 session modification procedure may be used to update the N4 session context of an existing PDU session at the UPF 110. The N4 session modification procedure may be performed (and/or re-performed) between the SMF 160 and the UPF 110 if the PDU session related parameters are modified. The N4 session establishment request message may be sent to the UPF 110 as part of the service request procedure or PDU session establishment, for example, if the SMF 160 selects the UPF 110 (e.g., to act as intermediate UPF) for the PDU session and/or if the SMF 160 determines to insert an intermediate UPF for a PDU session that did not have an intermediate UPF. The N4 session establishment request may comprise packet detection, data forwarding, and/or enforcement and/or reporting rules for the UPF 110.

At step 1505, the UPF 110 may send, to the SMF 160, a response message (e.g., an N4 session establishment and/or modification response). The UPF 110 may provide, to the SMF 160, DL CN tunnel information for the UPF 110 that may operate as a PDU session anchor and UL CN tunnel information (e.g., CN N3 tunnel information), for example, if the UPF 110 allocates CN tunnel Information. At step 1506, the SMF 160 may send, to the AMF 155, an N11 message response such as described above.

The network isolation information parameter, the selection rule, and/or the like may be provided by the NRF 130. The SMF 160 may locally select the UPF 110 based on the network isolation information parameter and/or the selection rule. The NRF 130 may receive the network isolation information parameter from the UDM 140. The NRF 140 may notify the SMF 160 if the selection rule changes or may change (e.g., upon instantiation of a new UPF 110, isolation policy change, and/or the like). If the new UPF 110 (instance) is instantiated, the new UPF 110, may send a notification to the NRF(s) or the SMF(s) that it may access (e.g., those permitted within the same PLMN and/or the like). The NRF 130 may notify the SMF 160 of any change in the status of the UPF 110 (e.g., topology changes).

The UPF 110 (e.g., a new UPF instance) may configure itself to the NRF 130. The UPF 110 may issue a registration management request operation (e.g., an Nnrf_NFManagement_NFRegister Request operation) to the NRF 130 (that may be provided by the OAM). The registration management request operation may provide the UPF 110's NF type, the FQDN of the UPF 110, endpoint addresses, the IP address(es) to be used for N4 interactions, the list of S-NSSAI and/or DNN that the UPF 110 may support, and/or the like. The NRF 130 may determine the proper UPF 110 candidate base on the information received via the Nnrf_NF-Management_NFRegister Request. The NRF 130 may evaluate the information based on the network isolation information parameter.

The network isolation information parameter may comprise a vector of elements with dimension k, wherein k may be an integer. The elements of the vector may be indicators for the degree of isolation, the selection rule, an isolation constraint type, a utility function for a multi-attribute selection function, isolation constraints, coexistence constraints, and/or the like. The network isolation information parameter may comprise one or more indication parameters indicating at least one of the degree of isolation, the selection rule, an isolation constraint type, a utility function for a multi-attribute selection function, isolation constraints, coexistence constraints, and/or the like.

The degree of isolation may be the number of network functions that are allowed to be shared among two or more network slices (or network slice instances). As an example, a degree of isolation being 1 may suggest that one network function may be shared among two or more network slices (or network slice instances).

The wireless device 100 may include the network isolation information parameter during the registration request procedure. The network isolation information parameter may comprise one or more of network slice isolation type and/or level for each of the requested S-NSSAIs for network slices and/or network slice instances. Slice isolation types and levels may be associated with a fully isolated network slice, a partly isolated network slice with a shared (R)AN, a partly isolated network slice with a shared (R)AN and a shared AMF, and/or the like. The network isolation information parameter may be included in the S-NSSAI with an added (e.g., optional) element indicating the slice (or slice instance) isolation type (e.g., a 2-bit element, or any other size element, wherein the combination may comprise any number of combinations of fully isolated network slice, partly isolated network slice with shared (R)AN, partly isolated network slice with shared (R)AN and shared AMF, and/or the like). A separate information element may be used that may comprise, for example, the isolation type wherein the combination may comprise any number of combinations of fully isolated network slice, partly isolated network slice with shared (R)AN, partly isolated network slice with shared (R)AN and shared AMF, and/or the like.

Figure 16:
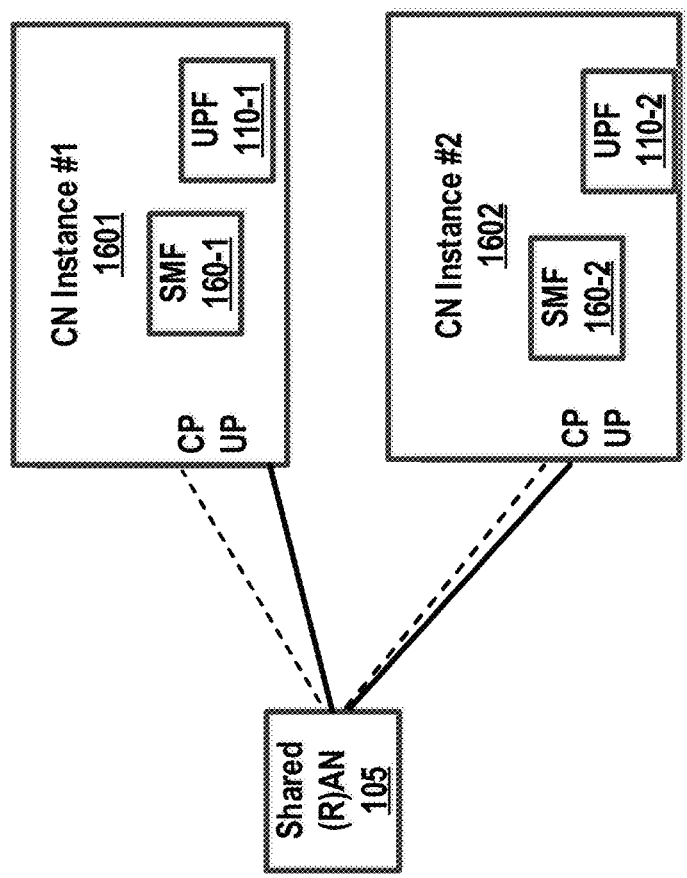
FIG. 16 shows an example of a partially isolated network slice with a shared (radio) access network ((R)AN).

FIG. 16 shows an example of a partially isolated network slice with a shared (R)AN 105.

The shared (R)AN 105 may be shared between two CN network slices or slice instances 1601 and 1602. The first CN slice instance 1601 may comprise a first SMF 160-1 and a first UPF 110-1. The second CN slice instance 1602 may comprise a second SMF 160-2 and a second UPF 110-2. Each of the first CN slice instance 1601 and the second CN slice instance 1602 may communicate with the shared (R)AN 105 via a control plane (CP) and a user plane (UP).

Figure 17:
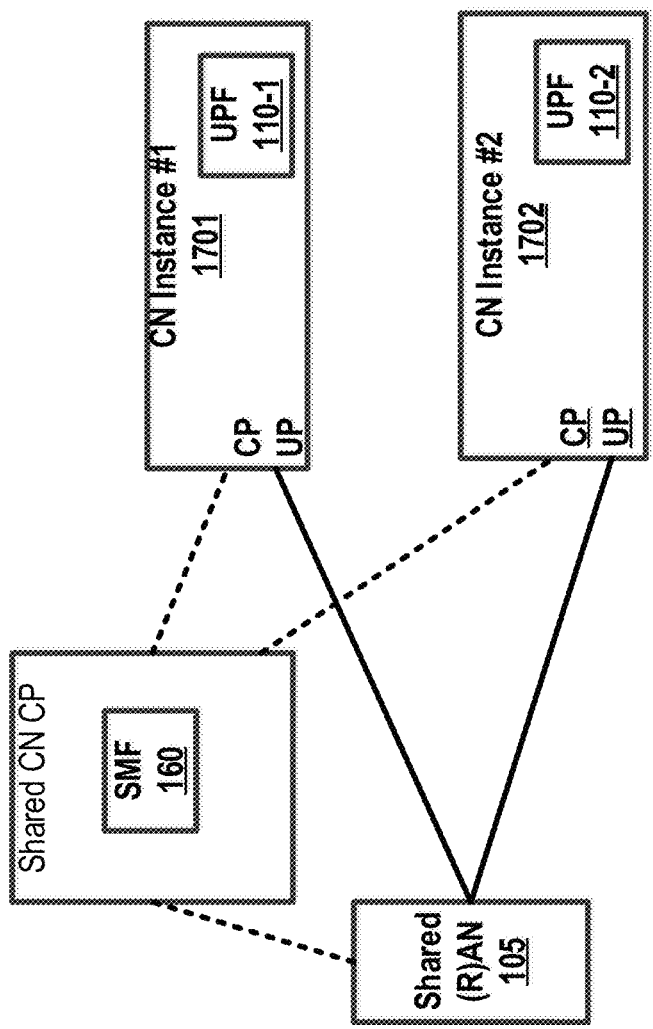
FIG. 17 shows an example of a partially isolated network slice with a shared (R)AN and a shared session management function (SMF).

FIG. 17 shows an example of a partially isolated network slice with a shared (R)AN 105 and a shared SMF 160. The first CN slice instance 1701 may comprise a first UPF 110-1. The second CN slice instance 1702 may comprise a second UPF 110-2. Each of the first CN slice instance 1701 and the second CN slice instance 1702 may communicate with the shared (R)AN 105 via a user plane (UP). Each of the first CN slice instance 1701 and the second CN slice instance 1702 may communicate with the shared SMF 160 via a control plane (CP). The SMF 160 may communicate with the share (R)AN 105 via the control plane.

Figure 18:
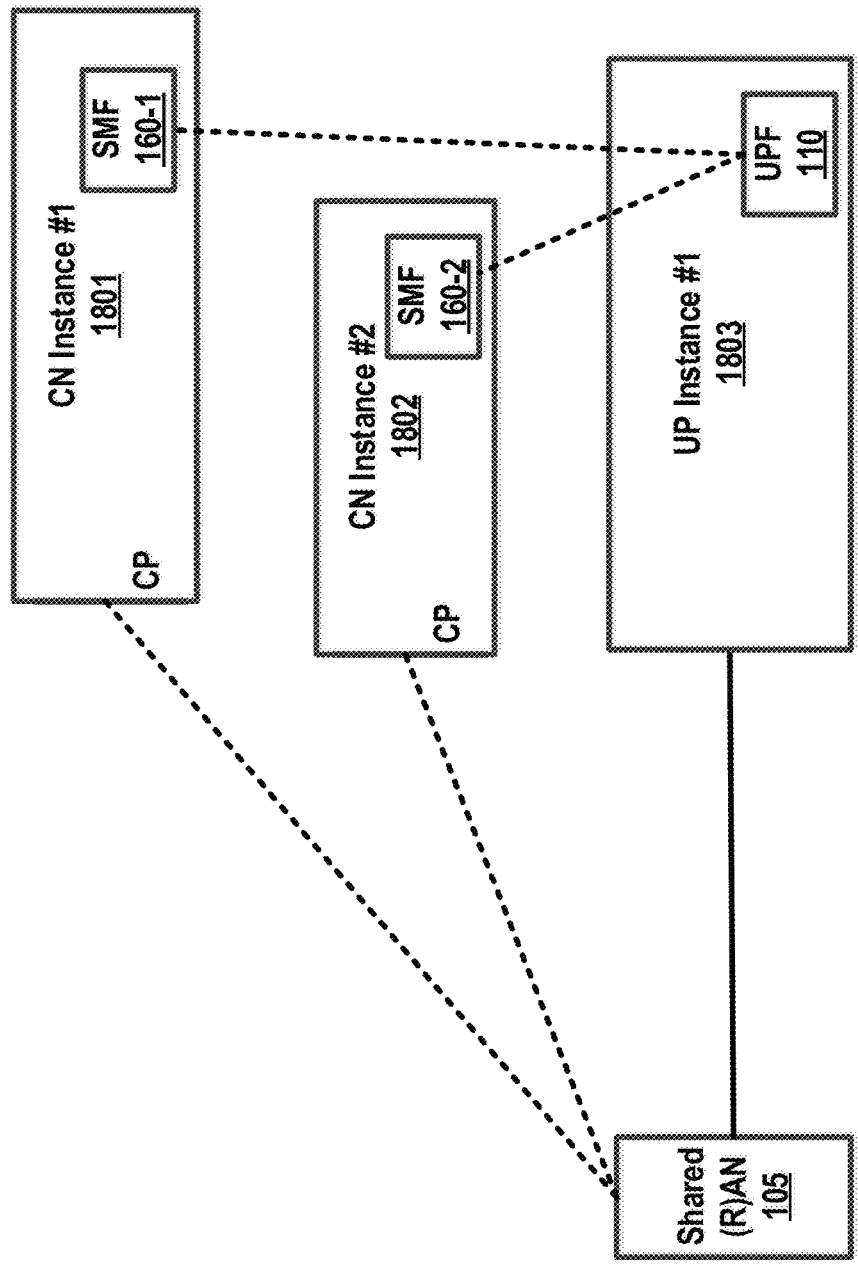
FIG. 18 shows an example of a first user plane instance controlled by multiple SMFs.

FIG. 18 shows an example of a first UP instance 1803 comprising the UPF 110 controlled by two SMFs (e.g., SMF 160-1 associated with a first CN slice instance 1801, and SMF 60-2 associated with a second CN slice instance 1802) that may belong to two CN slices.

Figure 19:
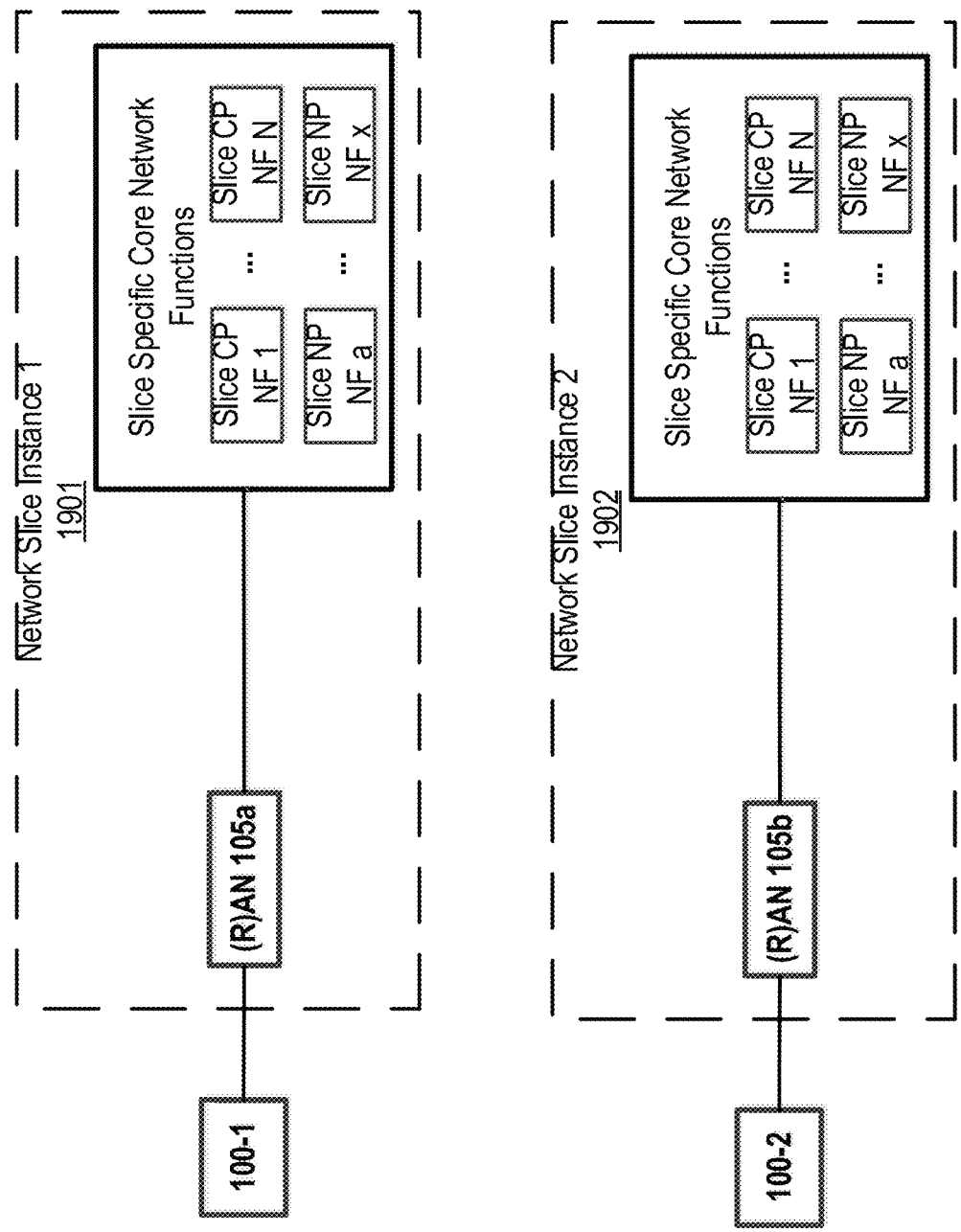
FIG. 19 shows an example of two fully isolated network slices.

FIG. 19 shows an example of two fully isolated network slices such that the two network slices (or network slice instances) may share neither the core network functions nor the user plane functions with any other network slice or network slice instance. A first network slice instance 1901 may comprise one or more slice specific core network functions (e.g., slice CP NF 1 to slice CP NF N, and/or slice NP NF to slice NP NF x). The first network slice instance 1901 may be controlled by a first RAN 105a in communication with a first wireless device 100-1. A second network slice instance 1902 may comprise one or more slice specific core network functions (e.g., slice CP NF 1 to slice CP NF N, and/or slice NP NF to slice NP NF x). The second network slice instance 1902 may be controlled by a second RAN 105b in communication with a second wireless device 100-2. The first network slice instance 1901 and the second network slice instance 1902 may be two fully isolated network slices, wherein no network functions may be shared by the first network slice instance 1901 and the second network slice instance 1902.

Figure 20:
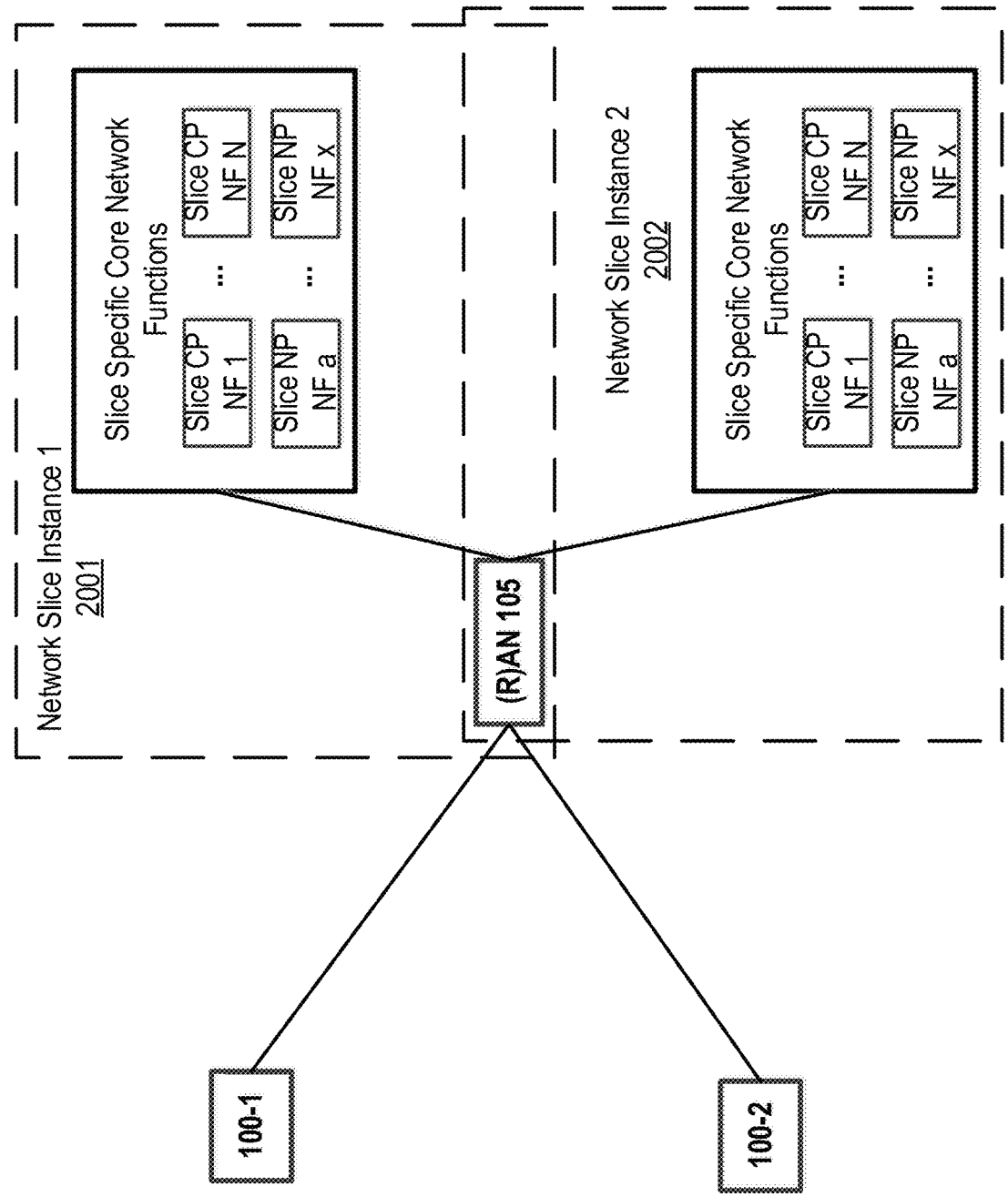
FIG. 20 shows an example of a partially isolated network slice with a shared (R)AN.

FIG. 20 shows an example of a partially isolated network slice sharing the (R)AN 105. The (R)AN 105 may be visible from outside the network slice instances (e.g., from the PLMN level NRF 130). The (R)AN 105 may be in communication with the first wireless device 100-1 and the second wireless device 100-2. A first network slice instance 2001 and a second network slice instance 2002 may be two partly isolated network slices wherein the (R)AN 105 may be shared by the first network slice instance 2001 and the second network slice instance 2002. The first network slice instance 2001 and the second network slice instance 2002 may each comprise slice specific core network functions such as described above regarding the first network slice instance 1901 and the second network slice instance 1902 shown in FIG. 19.

Figure 21:
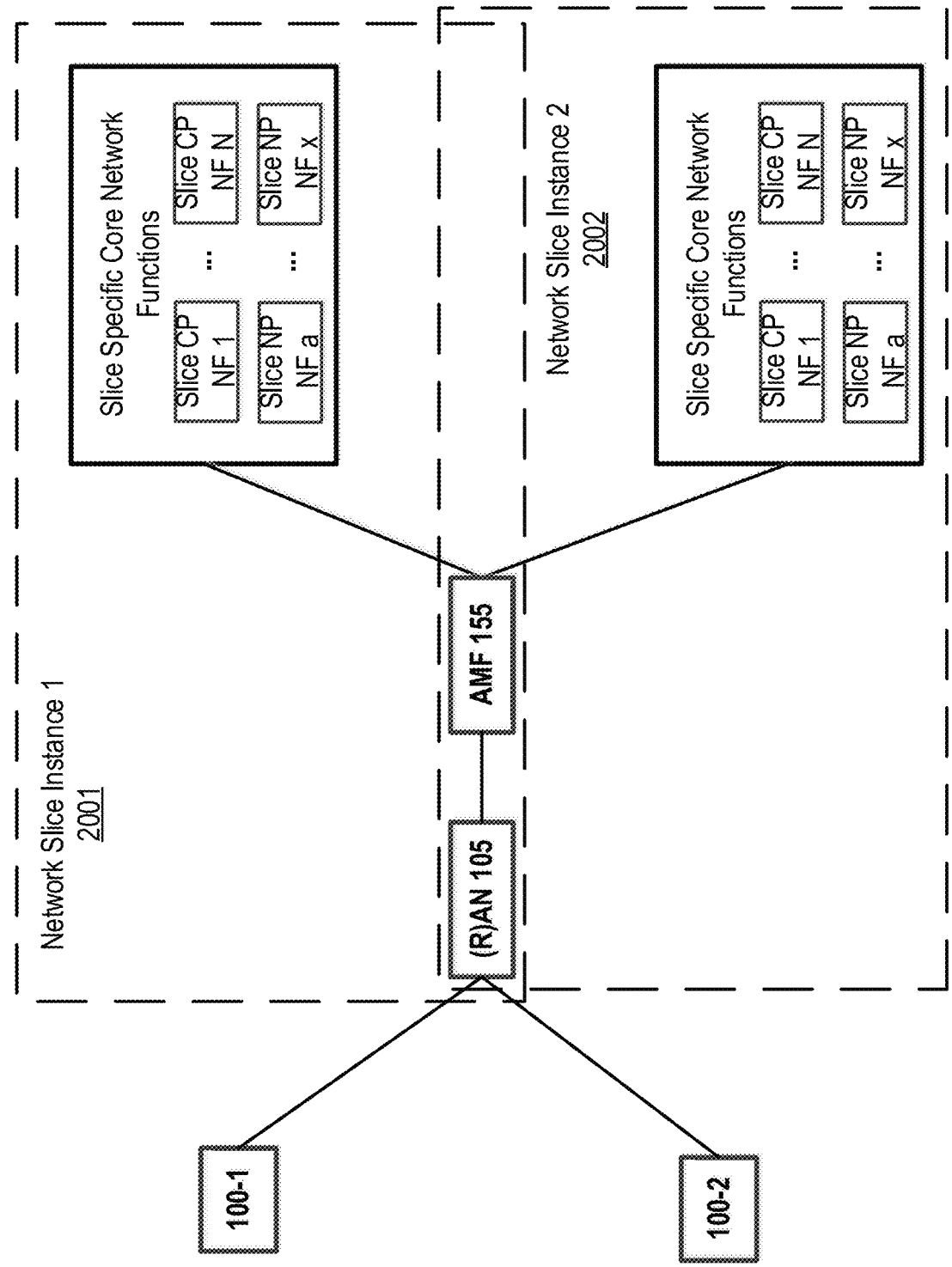
FIG. 21 shows an example of a partial isolation of two network slices with a shared (R)AN and a shared access and mobility management function (AMF).

FIG. 21 shows an example of a partial isolation of two network slices with a shared (R)AN 105 and a shared AMF 155. Both the (R)AN 105 and the AMF 155 may be visible from outside the network slice instance(s). The (R)AN 105 may be in communication with the first wireless device 100-1 and the second wireless device 100-2. A first network slice instance 2101 and a second network slice instance 2102 may be two partly isolated network slices wherein the (R)AN 105 and the AMF 155 may both be shared by the first network slice instance 2101 and the second network slice instance 2102. The first network slice instance 2101 and the second network slice instance 2102 may each comprise slice specific core network functions such as described above regarding the first network slice instance 1901 and the second network slice instance 1902 shown in FIG. 19.

Figure 22:
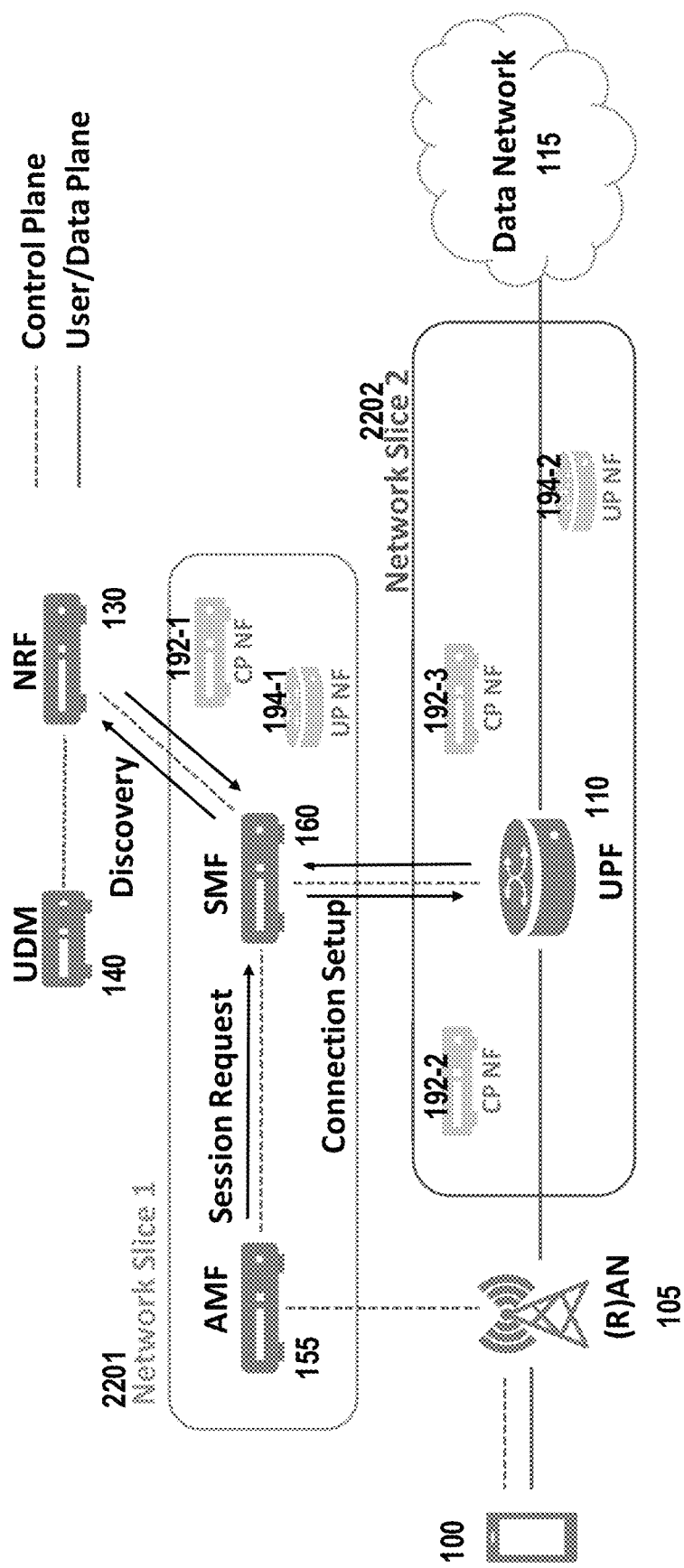
FIG. 22 shows an example method for providing an isolated network slice.

FIG. 22 shows an example method for providing an isolated network slice. A wireless device 100 may request services associated with one or more network slices. The wireless device 100 may initiate a PDU session establishment procedure, a service request procedure, and/or the like, to request such services. The one or more network slices may comprise an isolated network slice, which may be in addition to a network slice that may not be an isolated network slice. The wireless device may send, to the (R)AN 105, one or more messages as part of a PDU session establishment procedure, a service request procedure, and/or the like. The (R)AN 105 may send, to the AMF 155, one or more messages as part of the PDU session establishment procedure, the service request procedure, and/or the like.

The AMF 155 may be in a first network slice 2201. The AMF 155 may send, to the SMF 160, one or more messages as part of the PDU session establishment procedure, the service request procedure, and/or the like, in the first network slice 2201. The SMF 160 may receive, from the AMF 155, an N11 message (e.g., the N11 message from the AMF 155 to the SMF 160 as part of the PDU session establishment procedure, the N11 message from the AMF 155 to the SMF 160 as part of the service request procedure, and/or the like) indicating a first session creation request (or a session modification request message). The first session creation request may be part of the service request procedure, the PDU session establishment, and/or the like of the wireless device 100. The AMF 155 and the SMF 160 may perform a session request procedure such as described above regarding FIG. 14 and/or FIG. 15. The session request procedure may be to establish a first PDU session for a first network slice 2201.

The SMF 160 may determine, for example, after receiving a session request from the AMF 155, that a UPF is required to provide one or more services associated with the request from the wireless device 100. The session request may comprise a network slice isolation information parameter. The SMF 160 may apply one or more isolation rules to determine, based on the network slice isolation information parameter, a UPF that may provide the one or more requested services. For example, the SMF 160 may determine UPF 110 in a second network slice 2202 may provide the one or more requested services. The SMF 160 may send a discovery message to the NRF 130, for example, prior to determining the UPF 110. The discovery message may comprise the network slice isolation information parameter. The NRF 130 may send a response to the SMF 160 comprising an identifier of a selected UPF and/or a list of UPFs from which the SMF 160 may select. The NRF 130 may obtain, from a UDM 140, information associated with one or more UPFs which the NRF 130 may use to select a UPF and/or provide a list of UPFs to the SMF 160. One or more UPFs may register with the NRF 130. The NRF 130 may select a UPF from the one or more UPFs that may have registered with the NRF 130. The SMF 160 may perform a connection setup procedure with a selected UPF (e.g., UPF 110) that may be in the second network slice 2202. A selected UPF may comprise a plurality of UPFs, for example, one or more intermediate UPFs (e.g., cascaded and/or in different topologies) that may comprise one or more uplink classifiers to divert traffic to different data networks. The one or more UPFs may comprise CP NF 192-2, CP NF 192-3, and/or UP NF 194-2.

The first session creation and/or modification request may comprise one or more of the network isolation information parameter, NSSAI, S-NSSAI (e.g., requested S-NSSAI, allowed S-NSSAI, subscribed S-NSSAI, and/or the like), DNN, PDU session ID, request type, old PDU session ID, N1 SM container (e.g., PDU session establishment request), and/or the like. If the SMF 160 determines that a new UPF (e.g., the UPF 110) may be selected (e.g., based on an initial request indication, an indication for selecting a new intermediate UPF 110, and/or the like), the SMF 160 may select the new UPF (e.g., the UPF 110) based on one or more of the following: the network isolation information parameter, dynamic load of one or more UPFs, UPF's relative static capacity among UPFs supporting the same DNN, UPF 110 location available at the SMF 160, wireless device 100 location information, capability of the UPF 110, and/or the functionality required for the particular wireless device 100 session. An appropriate UPF 110 may be selected by matching the functionality and features required for the wireless device 100, data network name (DNN), PDU session type (e.g., IPv4, IPv6, Ethernet type or unstructured type) and, if applicable, the static IP address and/or prefix, SSC mode selected for the PDU session, wireless device 100 subscription profile in UDM 140, DNAI as included in one or more PCC rules, one or more local operator policies, S-NSSAI, access technology being used by the wireless device 100, UPF logical topology, and/or the like. The SMF 160 may perform a discovery procedure with the NRF 130, such as described above regarding FIG. 14. The SMF 160 may perform subscriber data request/response procedure with the UDM 140, such as described above regarding FIG. 15. The SMF may perform a connection setup procedure with the selected UPF (e.g., UPF 110), such as described above regarding FIG. 14 and FIG. 15. The discovery procedure and/or the connection setup procedure may be to determine and setup a connection with a UPF for an isolated network slice 2202 that may be associated with the data network 115.

Figure 23:
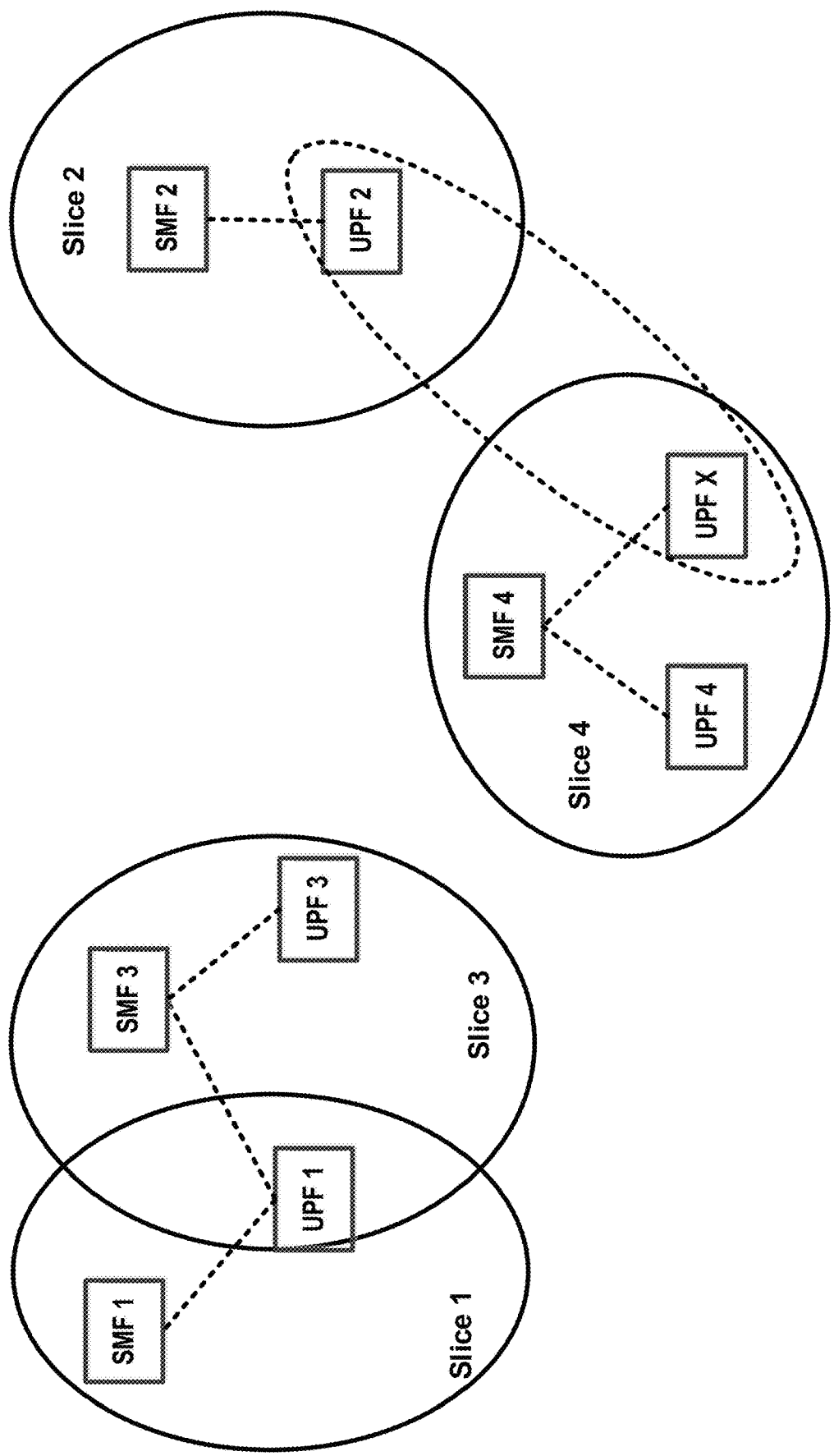
FIG. 23 shows an example of a user plane selection based on an isolation constraint.

FIG. 23 shows an example for UPF selection based on an isolation constraint. The network isolation information parameter may be used to evaluate alternatives from a set of available UPFs, such as UPF 1, UPF 2, UPF 3, UPF 4, or UPF X. The UPF selection procedure may be performed locally at the SMF 160, by the NRF 130, by the UDM 140, or by any combination of devices. A set of elements associated with each UPF (e.g., an affinity group) may be evaluated. UPF 1 may be associated with a set {SMF 1, SMF 3}. UPF_2 may be associated with a set {SMF 2}. UPF 3 may be associated with a set {SMF3}. UPF 4 may be associated with a set {SMF4}. UPF 1, and SMF 1 belong to Slice 1. UPF 2, and SMF 2 belong to Slice 2. UPF 3, and SMF 3 belong to Slice 3. UPF 4, and SMF 4 belong to Slice 4. An isolation constraint may require that Slice 4 and Slice 1 may not coexist. Slice 4 may initially have one UPF (e.g., UPF 4) and may require a new UPF (e.g., UPF X). In order to select a new UPF (in addition to UPF 4) for SMF 4 that belongs to Slice 4, the only candidate may be UPF 2 among the set of {UPF 1, UPF 2, UPF 3}. As shown above, UPF 1 may not be a suitable candidate because Slice 1 and Slice 4 may not coexist. UPF 3 belongs to Slice 3 that is not be isolated from Slice 1, therefore, UPF 3 may not be a suitable candidate.

The degree of isolation may indicate a level of isolation. As an example, a level of isolation greater than 1 may indicate that, although UPF 3 is not isolated from Slice 1, UPF 3 may be a suitable candidate because it may yield the coexistence of Slice 1 and Slice 4 as implicit or indirect (e.g., coexistence via Slice 3).

Figure 24:
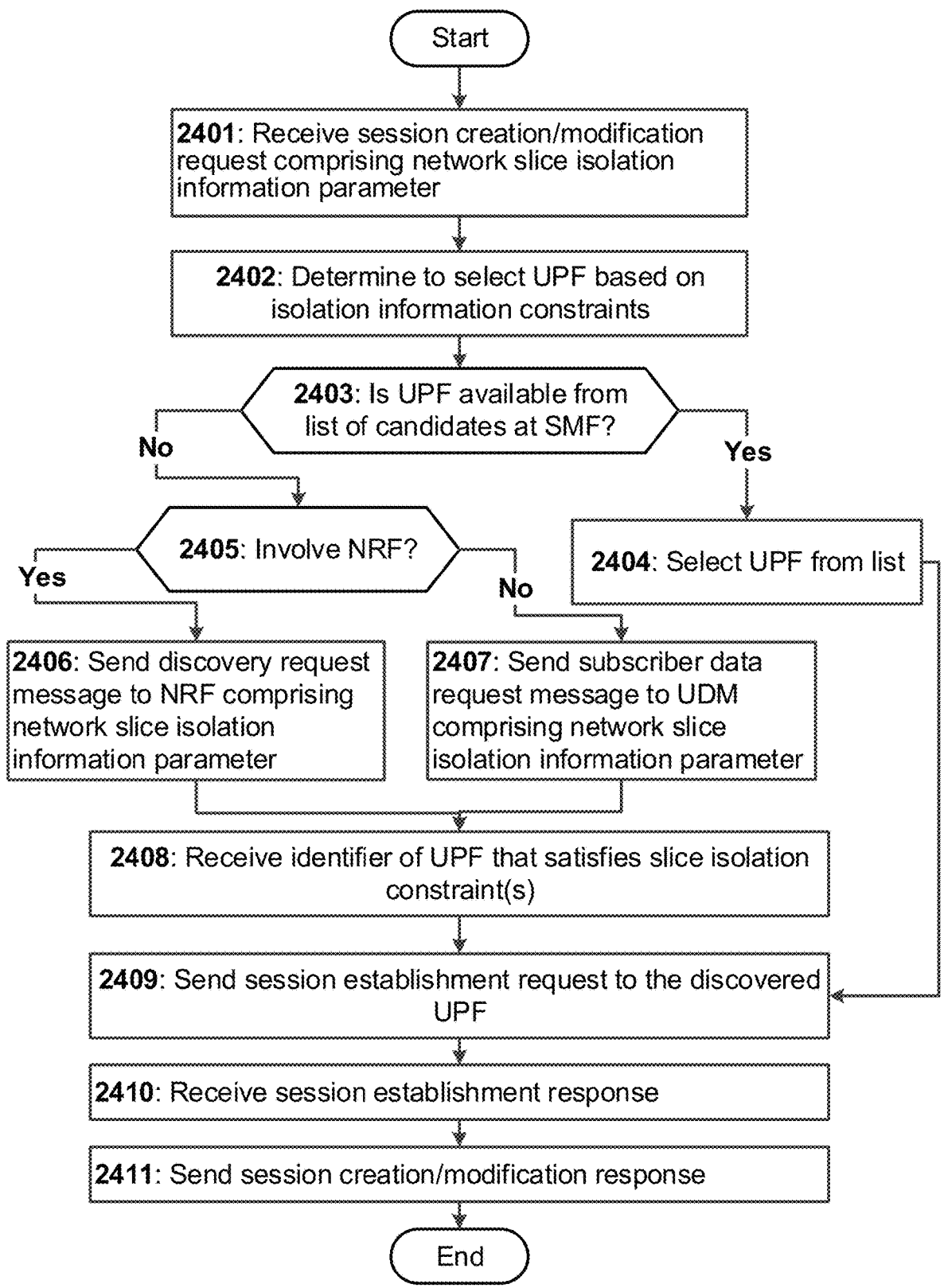
FIG. 24 shows an example method that may be performed by an SMF to provide an isolated network slice.

FIG. 24 shows an example method that may be performed by an SMF, such as the SMF 160, to provide an isolated network slice. At step 2401, the SMF 160 may receive a session creation and/or modification request comprising a network slice isolation parameter. The request may be received from the AMF 155. The request may comprise an N11 message indicating a first session creation and/or modification request, such as described regarding step 1401 of FIG. 14 and/or step 1501 of FIG. 15. At step 2402, the SMF 160 may determine to select a UPF based on one or more isolation information constraints and/or the network slice isolation parameter. UPF selection may be performed, for example, to accommodate one or more isolated network slices for the wireless device 100. The request may comprise a PDU session request. The PDU session may comprise a network slice identifier. The network slice identifier may comprise an information element comprising the network slice isolation information parameter. The network slice information parameter may comprise a tuple of at least one information element, wherein the at least one information element may comprise an isolation type descriptor, a degree of isolation, a selection rule, and/or an isolation constraint type. At step 2403 the SMF 160 may determine whether a UPF is available from a list of candidates at the SMF. Additionally or alternatively, one or more UPF candidates may be identified by another device, such as the NRF 130 and/or the UDM 140. If a UPF is available from a list of candidates, the method may continue to step 2404. If a UPF is not available from the list of candidates, the method may continue to step 2405.

At step 2404, the SMF 160 may select a UPF from a list of candidate UPFs. The UPF selection may be based on one or more isolation information constraints and/or the network slice isolation parameter. After step 2404, the SMF 160 may send, at step 2409, a session establishment request to the discovered UPF, such as described regarding step 1408 of FIG. 14 and step 1506 of FIG. 15.

At step 2405, the SMF 160 may determine whether to involve an NRF, such as the NRF 130. If the SMF 160 determines to involve the NRF 130, for example, to obtain information associated with one or more UPF candidates, the method may continue to step 2406. If the SMF 160 does not determine to involve the NRF 130, the method may continue to step 2407.

At step 2406, the SMF 160 may send, to the NRF 130, a discovery request message comprising the network slice isolation parameter. Step 2406 may correspond to step 1402 described above regarding FIG. 14. The SMF 160 may send the discovery request message after or in response to receiving an N11 message. The discovery request message may comprise a first message indicating that discovery of a network function may be required. The first message may comprise the network slice isolation parameter, the type name of the network function, one or more parameters comprising information associated with an isolated network slice, and/or the like. The NRF 130 may select a network function, for example, based on the network isolation information parameter. The NRF 130 may perform steps 2501-2504 described below regarding FIG. 25, for example, after or in response to the SMF 160 sending the discovery request message.

At step 2407, the SMF 160 may send, to the UDM 140, a subscriber data request message comprising the network slice isolation parameter. Step 2407 may correspond to step 1502 described above regarding FIG. 15. The SMF 160 may send the subscriber data request message after or in response to receiving an N11 message. The subscriber data request message may comprise a second message indicating that subscriber data is required for determining a network function. The second message may comprise the network slice isolation parameter, information associated with a subscriber and/or a wireless device, one or more parameters comprising information associated with an isolated network slice, and/or the like. Additionally or alternatively, the NRF 130 may perform step 2407, for example, after receiving a discovery request message (e.g., after step 2406).

At step 2408, the SMF 160 may receive an identifier of a UPF (e.g., UPF 110) or other network function that satisfies one or more slice isolation constraints. Step 2408 may correspond to step 1405 described above regarding FIG. 14 and/or step 1503 described above regarding FIG. 15. The SMF 160 may receive the identifier, for example, from the NRF 130 (e.g., after step 2406) and/or from the UDM 140 (e.g., after step 2407). The SMF 160 may receive a response message comprising the identifier of the UPF 110. The response message may be in response to the discovery request message (e.g., from step 2406) and/or in response to the subscriber data request message (e.g., from step 2407). The response message may comprise a network function identifier, one or more IP address(es), and/or the like, that may be associated with a network function (e.g., UPF). The network function may be selected (e.g., by the SMF 160, NRF 130, and/or UDM 140) based on the type name of the network function. The network function may comprise a user plane function, for example, the UPF 110. The network function identifier may be a fully qualified domain name (FQDN) of the network function.

At step 2409, the SMF 160 may send, to the discovered network function (e.g., the UPF 110), a session establishment request. Step 2409 may correspond to step 1406 described above regarding FIG. 14 and/or step 1504 described above regarding FIG. 15. The session establishment message may comprise, for example, an N4 session modification, an N4 session establishment, and/or the like. The session establishment request may be based on at least one of the network function identifier and/or IP address(es).

At step 2410, the SMF 160 may receive a session establishment response. Step 2410 may correspond to step 1407 described above regarding FIG. 14 and/or step 1505 described above regarding FIG. 15. The SMF 160 may receive the session establishment response from the discovered UPF. The session establishment response may be in response to the session establishment request (e.g., from step 2409).

At step 2411, the SMF 160 may send a session creation and/or modification response. Step 2411 may correspond to step 1408 described above regarding FIG. 14 and/or step 1506 described above regarding FIG. 15. The SMF 160 may send the session creation and/or modification response to the AMF 155. The session creation and/or modification response may be in response to the session creation and/or modification request (e.g., from step 2401). The method may end, for example, after step 2411. After step 2411, the SMF 160 may send and/or receive uplink data and/or downlink data.

Figure 25:
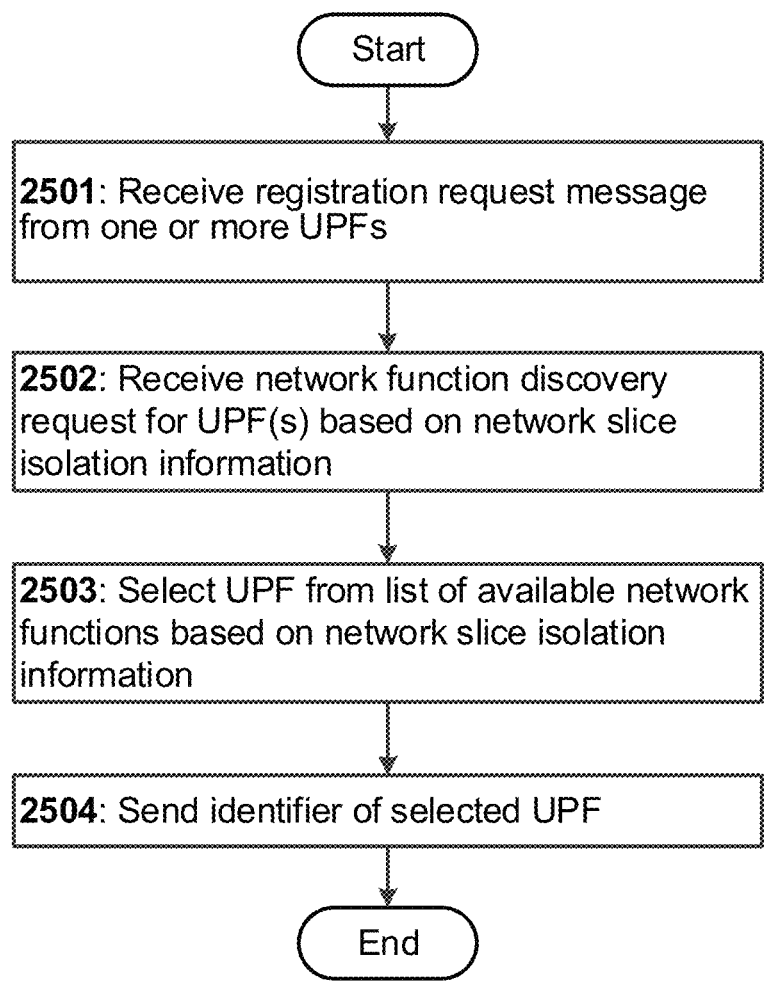
FIG. 25 shows an example method that may be performed by a network repository function (NRF) to provide an isolated network slice.

FIG. 25 shows an example method that may be performed by an NRF such as the NRF 130, to provide an isolated network slice. Additionally or alternatively, the method may be performed by a UDM, such as UDM 140, or another network function. At step 2501, the NRF 130 may receive a registration request message from one or more UPFs or other network functions. The NRF 130 may store information relating to the one or more UPFs or other network functions. At step 2502, the NRF 130 may receive a network function discovery request for one or more UPFs, or for other network functions, based on network slice isolation information. The network slice information may comprise one or more network isolation information parameters. Step 2502 may correspond to step 1402 described above regarding FIG. 14. The one or more network isolation information parameters may be a factor used to determine a selection rule based on a degree of isolation. At step 2503, the NRF 130 may select a UPF (or other network function), such as UPF 110, from a list of available network functions. The NRF 130 may select the UPF 110 based on the network slice isolation information. The NRF 130 may select the UPF 110 based on the selection rule. The degree of isolation may be determined based on at least one isolation policy of a logical full isolation of network slices, a physical full isolation of network slices, a partial logical isolation of network slices, a partial physical isolation of network slices, a number of network functions that may be allowed to be shared among network slices, a type of network functions that are allowed to be shared among network slices, and/or the like. The network slice may be the network slice instance. The method may end, for example, after step 2504.

The degree of isolation may be a level of isolation. The level of isolation may be determined based on the type of network functions that may be shared among a set of network slices. The level of isolation may be based on distance, for example, in terms of constrained isolation distance. For example, if elements A and C may not coexist and elements B and C may coexist, then based on a constrained isolation distance of 1, elements A and B may coexist, but based on a constrained isolation of distance 2, elements A and B may not coexist. Isolation may be one or more of a topological isolation (e.g., logical, or physical), a functional isolation, a physical resource isolation, and/or a transactional isolation. Topological isolation may be a constraint that may prevent a UPF from being controlled by an SMF of Slice A and an SMF of Slice B. Functional isolation may be a constraint indicating that different types of network functions may coexist if they are not of the same type. As an example, an AMF from Slice A and a SMF from Slice B may coexist but the SMF of Slice A may not coexist with the SMF of Slice B. A physical resource isolation may be a constraint that may prevent a network function (e.g., virtualized network function) of Slice A from being deployed on the same physical resources (e.g., hardware) that may be used by a network function of Slice B. The transactional isolation may be a constraint that may prevent concurrent and/or simultaneous access by the network function of Slice A and the network function of Slice B.

Figure 26:
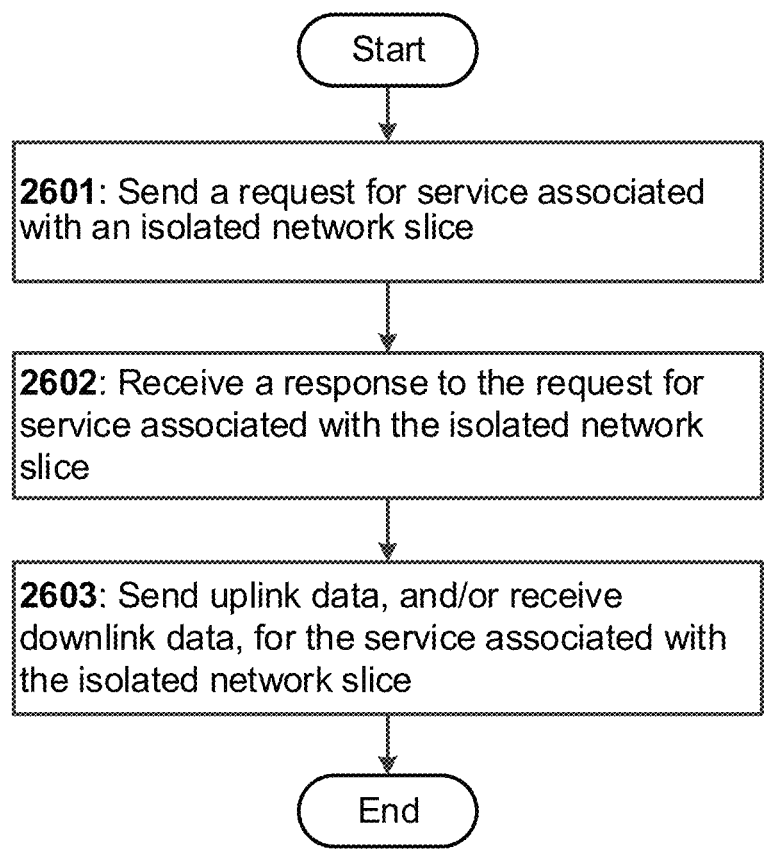
FIG. 26 shows an example method that may be performed by a wireless device and/or a base station for an isolated network slice.

FIG. 26 shows an example method that may be performed by a wireless device, such as the wireless device 100, and/or that may be performed by a base station, such as the (R)AN 105, to provide an isolated network slice. At step 2601, the wireless device and/or the base station may send a request for service associated with an isolated network slice. The request for service may comprise, for example, a NAS request such as described regarding step 1301 of FIG. 13A and/or an N11 message such as described regarding step 1401 in FIG. 14. At step 2602, the wireless device and/or the base station may receive a response to the request for service associated with the isolated network slice. The response may comprise, for example, RRC information such as described regarding step 1313 of FIG. 13A and/or an N11 message such as described regarding step 1408 in FIG. 14. At step 2603, the wireless device and/or the base station may send uplink data, and/or receive downlink data, for the service associated with the isolated network slice. The method may end, for example, after step 2603.

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
    sending, by a session management function (SMF) device, a first message indicating a request for flail user plane function (UPF) device information for sending data associated with a wireless device, wherein the first message comprises:
        a network slice isolation information parameter, and
        a network slice identifier associated with the wireless device; and
    receiving, by the SMF device and based on the first message, a second message comprising an identifier of a UPF device, wherein the UPF device is associated with the network slice identifier.

2. The method of claim 1, wherein the UPF device is associated with a packet data unit (PDU) session for sending the data.

3. The method of claim 1, wherein the sending the first message comprises sending the first message to a network repository function (NRF) device.

4. The method of claim 1, further comprising receiving, from an access mobility management function (AMF) device, a request to establish a session for sending the data, wherein the request comprises the network slice isolation information parameter.

5. The method of claim 1, further comprising receiving, from the wireless device, a non-access stratum (NAS) message comprising the network slice isolation information parameter.

6. The method of claim 1, further comprising sending, to the UPF device, a third message indicating a request to establish a session for sending the data.

7. The method of claim 1, wherein the network slice isolation information parameter comprises at least one of:
    a network slice coexistence rule;
    a network slice isolation type descriptor; or
    a degree of network slice isolation.

8. The method of claim 1, wherein the UPF device information comprises one or more of an Internet Protocol (IP) address or a fully qualified domain name (FQDN) of the UPF device.

9. A method comprising:
    receiving, by a first network function device from a second network function device, a first message for user plane function (UPF) device information for sending data associated with a wireless device, wherein the first message comprises:
        a network slice isolation information parameter, and
        a network slice identifier associated with a wireless device;
    selecting, by the first network function device and based on the first message, a UPF device associated with the network slice identifier; and
    sending, by the first network function device to the second network function device, a second message comprising an identifier of the selected UPF device.

10. The method of claim 9, wherein the first network function device comprises a unified data management (UDM) device, and wherein the second network function device comprises a session management function (SMF) device.

11. The method of claim 9, wherein the second message further comprises at least one of:
the network slice isolation information parameter, or
a UPF device selection rule.

12. The method of claim 9, further comprising sending, by the first network function device to the second network function device, a third message indicating a change in at least one of:
the network slice isolation information parameter, or
a UPF device selection rule.

13. The method of claim 9, wherein the network slice isolation information parameter comprises at least one of:
a network slice coexistence rule;
a network slice isolation type descriptor; or
a degree of network slice isolation.

14. An apparatus comprising:
one or more processors; and
memory storing instructions that, when executed by the one or more processors, cause the apparatus to:
send a first message indicating a request for flail user plane function (UPF) device information for sending data associated with a wireless device, wherein the first message comprises:
a network slice isolation information parameter, and
a network slice identifier associated with the wireless device; and
receive, based on the first message, a second message comprising an identifier of a UPF device, wherein the UPF device is associated with the network slice identifier.

15. The apparatus of claim 14, wherein the UPF device is associated with a packet data unit (PDU) session for sending the data.

16. The apparatus of claim 14, wherein the apparatus comprises a session management function (SMF) device, and wherein the instructions, when executed by the one or more processors, cause the SMF device to send the first message to a network repository function (NRF) device.

17. The apparatus of claim 14, wherein the instructions, when executed by the one or more processors, cause the apparatus to receive, from an access mobility management function (AMF) device, a request to establish a session for sending the data, wherein the request comprises the network slice isolation information parameter.

18. The apparatus of claim 14, wherein the instructions, when executed by the one or more processors, cause the apparatus to receive, from the wireless device, a non-access stratum (NAS) message comprising the network slice isolation information parameter.

19. The apparatus of claim 14, wherein the instructions, when executed by the one or more processors, cause the apparatus to send, to the UPF device, a third message indicating a request to establish a session for sending the data.

20. The apparatus of claim 14, wherein the network slice isolation information parameter comprises at least one of:
a network slice coexistence rule;
a network slice isolation type descriptor; or
a degree of network slice isolation.

21. An apparatus comprising:
one or more processors; and
memory storing instructions that, when executed by the one or more processors, cause the apparatus to:
receive a first message for user plane function (UPF) device information for sending data associated with a wireless device, wherein the first message comprises:
a network slice isolation information parameter, and
a network slice identifier associated with a wireless device;
select, based on the first message, a UPF device associated with the network slice identifier; and
send a second message comprising an identifier of the selected UPF device.

22. The apparatus of claim 21, wherein the apparatus comprises a unified data management (UDM) device, and wherein the instructions, when executed by the one or more processors, cause the UDM device to receive the first message from a session management function (SMF) device and to send the second message to the SMF device.

23. The apparatus of claim 21, wherein the second message further comprises at least one of:
the network slice isolation information parameter, or
a UPF device selection rule.

24. The apparatus of claim 21, wherein the instructions, when executed by the one or more processors, cause the apparatus to send a third message indicating a change in at least one of:
the network slice isolation information parameter, or
a UPF device selection rule.

25. The apparatus of claim 21, wherein the network slice isolation information parameter comprises at least one of:
a network slice coexistence rule;
a network slice isolation type descriptor; or
a degree of network slice isolation.

* * * * *

UNITED STATES PATENT AND TRADEMARK OFFICE
CERTIFICATE OF CORRECTION

Page 1 of 2

PATENT NO. : 11,102,828 B2
APPLICATION NO. : 16/796582
DATED : August 24, 2021
INVENTOR(S) : Fard et al.

It is certified that error appears in the above-identified patent and that said Letters Patent is hereby corrected as shown below:

On the Title Page

Page 3, Column 2, Item (56) Other Publications, Line 65:
Delete "Systeml" and insert --System;-- therefor In the Specification Column 8, Detailed Description, Line 49:
After "architecture.", delete "¶"

Column 9, Detailed Description, Line 52:
After "selection", insert --.--

Column 16, Detailed Description, Line 36:
After "procedures.", delete "¶"

Column 16, Detailed Description, Line 52:
Delete "Old" and insert --New-- therefor Column 17, Detailed Description, Line 5:
Delete "N5g-eir_MEldentityCheck_Get)." and insert --N5g-eir_MEIdentityCheck_Get).-- therefor Column 20, Detailed Description, Line 16:
Delete "Instance(s)," and insert --Instance(s).-- therefor Column 24, Detailed Description, Line 28:
After "comprising", delete "¶"

Column 27, Detailed Description, Line 40:
After "running", insert --.--

Signed and Sealed this
Twenty-fifth Day of April, 2023

Katherine Kelly Vidal
*Director of the United States Patent and Trademark Office*

CERTIFICATE OF CORRECTION (continued)
U.S. Pat. No. 11,102,828 B2

Column 27, Detailed Description, Line 40:
Delete "13008*b*," and insert --1308*b*,-- therefor Column 29, Detailed Description, Line 19:
After "the", delete "¶"

Column 30, Detailed Description, Line 16:
After "(e.g.,", delete "¶"

Column 43, Detailed Description, Line 48:
Delete "140" and insert --130-- therefor Column 44, Detailed Description, Line 46:
After "105.", delete "¶"

Column 45, Detailed Description, Line 2:
Delete "60-2" and insert --160-2-- therefor Column 45, Detailed Description, Line 25:
After "The", delete "¶"

Column 51, Detailed Description, Lines 65-66:
After "manner", insert --.--

In the Claims

Column 52, Claim 1, Line 10:
Before "user", delete "flail"

Column 53, Claim 14, Line 20:
Before "user", delete "flail"